(12) United States Patent
Wang et al.

(10) Patent No.: US 12,348,779 B2
(45) Date of Patent: Jul. 1, 2025

(54) USING SUBPICTURES AND TILES IN VIDEO CODING

(71) Applicant: Bytedance Inc., Los Angeles, CA (US)

(72) Inventors: Ye-kui Wang, San Diego, CA (US); Li Zhang, San Diego, CA (US); Jizheng Xu, San Diego, CA (US); Kai Zhang, San Diego, CA (US)

(73) Assignee: BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/994,748

(22) Filed: Nov. 28, 2022

(65) Prior Publication Data

US 2023/0128511 A1 Apr. 27, 2023

Related U.S. Application Data

(63) Continuation of application No. PCT/US2021/034259, filed on May 26, 2021.
(Continued)

(51) Int. Cl.
*H04N 19/70* (2014.01)
*H04N 19/105* (2014.01)
(Continued)

(52) U.S. Cl.
CPC .......... *H04N 19/70* (2014.11); *H04N 19/105* (2014.11); *H04N 19/172* (2014.11); *H04N 19/186* (2014.11)

(58) Field of Classification Search
CPC .... H04N 19/172; H04N 19/119; H04N 19/70; H04N 19/174; H04N 19/96
See application file for complete search history.

(56) References Cited

U.S. PATENT DOCUMENTS

2016/0301931 A1 10/2016 Wen et al.
2017/0324981 A1 11/2017 Deshpande
(Continued)

FOREIGN PATENT DOCUMENTS

CN 107623853 A 1/2018
CN 108718414 A 10/2018
(Continued)

OTHER PUBLICATIONS

"Overview of HEVC High-Level Syntax and Reference Picture Management"—Sjöberg et al., IEEE Transactions on Circuits and Systems for Video Technology, vol. 22, No. 12, Dec. 2012. (Year: 2012).*
(Continued)

*Primary Examiner* — Mainul Hasan
(74) *Attorney, Agent, or Firm* — Conley Rose, P.C.

(57) ABSTRACT

Embodiments for video encoding and video decoding are described. One example method includes performing a conversion between a video and a bitstream of the video according to a rule, wherein the rule specifies that only one of two conditions is true when a number of subpictures minus 1 indicated by a first syntax element in a sequence parameter set is greater than zero and when a current subpicture with a subpicture index subpicIdx of a first video picture of the video has a second syntax element in the sequence parameter set indicates that a subpicture with the subpicture index subpicIdx of each video picture of the video in a coded layer video sequence is treated as a video picture in a decoding process that excludes an in-loop filtering operation.

16 Claims, 15 Drawing Sheets

Related U.S. Application Data

(60) Provisional application No. 63/030,726, filed on May 27, 2020.

(51) Int. Cl.
  *H04N 19/172* (2014.01)
  *H04N 19/186* (2014.01)

(56) References Cited

U.S. PATENT DOCUMENTS

| | | | |
|---|---|---|---|
| 2018/0124462 | A1 | 5/2018 | Lim et al. |
| 2020/0077107 | A1 | 3/2020 | Deshpande |
| 2020/0154101 | A1 | 5/2020 | Li et al. |
| 2021/0044838 | A1* | 2/2021 | Chen ............... H04N 19/96 |
| 2021/0092388 | A1 | 3/2021 | Sarwer |
| 2021/0266548 | A1 | 8/2021 | Sarwer |
| 2022/0353536 | A1* | 11/2022 | Samuelsson ......... H04N 19/174 |
| 2022/0353537 | A1* | 11/2022 | Deshpande .......... H04N 19/174 |
| 2022/0408095 | A1 | 12/2022 | Choi |
| 2023/0030970 | A1 | 2/2023 | Choi |
| 2023/0068704 | A1* | 3/2023 | Hendry ............... H04N 19/70 |

FOREIGN PATENT DOCUMENTS

| | | |
|---|---|---|
| WO | 2014053428 A1 | 4/2014 |
| WO | 2019145262 A1 | 8/2019 |
| WO | 2020057662 A1 | 3/2020 |

OTHER PUBLICATIONS

Document: JVET-Q2001-vC, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 508 pages.
Retrieved from the internet: https://vcgit.hhi.fraunhofer.de/jvet/VVCSoftware_VTM/-/archive/VTM-8.0/VVCSoftware_VTM-VTM-8.0.zip, Accessed Nov. 16, 2022.
"Series H: Audiovisual and Multimedia Systems Infrastructure of audiovisual services—Coding of moving video High efficiency video coding," Recommendation ITU-T H.265, Feb. 2018, 692 pages.
Document: JVET-G1001-v1, Chen J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Retrieved from the internet: https://vcgit.hhi.fraunhofer.de/jvet/VVCSoftware_VTM.git, VTM software, Accessed Nov. 16, 2022, 3 pages.
Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
Document: JVET-S0071-v5, Katsumata, M., et al., "AHG12: Cleanup of subpicture layout signalling," Joint Video Experts Team (JVET) of ITU-T SG 16 WP 3 and ISO/IEC JTC 1/SC 29/WG 11 19th Meeting: by teleconference, Jun. 22-Jul. 1, 2020, 11 pages.
Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.
Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.
Document: JVET-Q0186-v1, Lin, Z-Y., et al., "CE3-related: TB-level residual coding selection for lossless coding," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.
Document: JVET-Q0398, Sanchez, Y., et al., "AHG9: Sub-layer wise dependency in multi-layer," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.
Document: JVET-R0107-v2, Deshpande, S., et al., "AHG8/ AHG9: On Temporal Sublayers Information," Joint Video Experts Team (JVET) of ITU-T SG 16 WP 3 and ISO/IEC JTC 1/SC 29/WG 11 18th Meeting: by teleconference, Apr. 15-24, 2020, 8 pages.
Foreign Communication From A Related Counterpart Application, International Application No. PCT/CN2021/087382, English Translation of International Search Report dated Jul. 15, 2021, 12 pages.
Foreign Communication From A Related Counterpart Application, International Application No. PCT/US2021/034259, International Search Report dated Aug. 31, 2021, 16 pages.
Foreign Communication From A Related Counterpart Application, International Application No. PCT/CN2021/078010, English Translation of International Search Report dated May 10, 2021, 15 pages.
Document: JVET-Software Manual, Bossen, F., et al., "VTM Software Manual," Joint Video Experts Team (JVET) of ITU-T SG16 WP3 and ISO/IEC JTC1/SC29/WG11, Feb. 22, 2020, 43 pages.
Non-Final Office Action dated Mar. 14, 2023, 18 pages, U.S. Appl. No. 17/896,532, filed Aug. 26, 2022.
Document: JVET-S2001-v8, "Versatile Video Coding (Draft 10)," Joint Video Experts Team (JVET) of ITU-T SG 16 WP 3 and ISO/IEC JTC 1/SC 29/WG 11 19th Meeting: by teleconference, Jun. 22-Jul. 1, 2020, 544 pages.
Foreign Communication From A Related Counterpart Application, European Application No. 21813265.2 dated Jul. 20, 2023, 11 pages.
Document: JVET-S0125, Seregin, V., et al., "AHG9: On sub-picture constraints," Joint Video Experts Team (JVET) of ITU-T SG 16 WP 3 and ISO/IEC JTC 1/SC 29/WG 11 19th Meeting: by teleconference, Jun. 22-Jul. 1, 2020, 5 pages.

\* cited by examiner

1002 — Performing a conversion between a video and a bitstream of the video according to a rule, wherein the rule specifies that one of the following two conditions is true when a number of subpictures minus 1 indicated in a sequence parameter set is greater than zero and when a syntax element in the sequence parameter set indicates that an i-th subpicture of a first video picture of the video in a coded layer video sequence is treated as a second video picture of the video in a decoding process that excludes an in-loop filtering operation: (1) the second video picture referred to by each active entry in a first reference picture list or a second reference picture list of the first video picture and the first video picture have a same value for each of the following: a picture width in units of luma samples, a picture height in units of luma samples, the number of subpictures minus 1, and a horizontal position of a top-left coding tree unit of the i-th subpicture, a vertical position of the top-left CTU of the i-th subpicture, a width of the i-th subpicture, a height of the i-th subpicture minus 1, the syntax element for the i-th subpicture, respectively, for each value of i in a range of 0 to the number of subpictures minus 1, inclusive; and (2) the second video picture referred to by each active entry in the first reference picture list or the second reference picture list is an inter-layer reference picture for which a value of the number of subpictures minus 1 is equal to zero

USING SUBPICTURES AND TILES IN VIDEO CODING

CROSS-REFERENCE TO RELATED APPLICATIONS

This application is a continuation of International Patent Application No. PCT/US2021/034259 filed on May 26, 2021, which claims priority to and the benefits of U.S. Provisional Patent Application No. 63/030,726 filed on May 27, 2020. All the aforementioned patent applications are hereby incorporated by reference in their entireties.

TECHNICAL FIELD

The present disclosure relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present disclosure discloses embodiments that can be used by video encoders and decoders for processing a coded representation of video using control information useful for decoding of the coded representation.

In one example aspect, a video processing method is disclosed. The method includes performing a conversion between a video and a bitstream of the video according to a rule, wherein the rule specifies that a quantization parameter table used in the conversion is included in a sequence parameter set, and wherein the rule specifies whether or how a first syntax element indicating a number of points in the quantization parameter table is included in the sequence parameter set is controlled according to a second syntax element in the sequence parameter set.

In another example aspect, a video processing method is disclosed. The method includes performing a conversion between a video and a bitstream of the video according to a rule, wherein the rule specifies that one of the following two conditions is true when a number of subpictures minus 1 indicated in a sequence parameter set is greater than zero and when a syntax element in the sequence parameter set indicates that an i-th subpicture of a first video picture of the video in a coded layer video sequence is treated as a second video picture of the video in a decoding process that excludes an in-loop filtering operation: (1) the second video picture referred to by each active entry in a first reference picture list or a second reference picture list of the first video picture and the first video picture have a same value for each of the following: a picture width in units of luma samples, a picture height in units of luma samples, the number of subpictures minus 1, and a horizontal position of a top-left coding tree unit of the i-th subpicture, a vertical position of the top-left coding tree unit (CTU) of the i-th subpicture, a width of the i-th subpicture minus 1, a height of the i-th subpicture minus 1, the syntax element for the i-th subpicture, respectively, for each value of i in a range of 0 to the number of subpictures minus 1, inclusive; and (2) the second video picture referred to by each active entry in the first reference picture list or the second reference picture list is an inter-layer reference picture for which a value of the number of subpictures minus 1 is equal to zero.

In another example aspect, a video processing method is disclosed. The method includes performing a conversion between a video comprising a video block and a bitstream of the video according to a rule, wherein the rule specifies that a maximum number of subblock merge candidates is disallowed from being a number N when affine coding tool is enabled and subblock based temporal motion vector prediction coding tool is disabled.

In another example aspect, a video processing method is disclosed. The method includes performing a conversion between a video comprising one or more video pictures and a bitstream of the video, wherein the bitstream conforms to a format rule, and wherein the format rule specifies whether a syntax element that indicates whether affine merge mode is enabled is in the bitstream.

In another example aspect, a video processing method is disclosed. The method includes performing a conversion between a video comprising one or more video pictures comprising one or more subpictures and a bitstream of the video according to a rule, wherein the rule specifies to indicate or omit one or more of the following subpicture related syntax elements from a sequence parameter set: a first syntax element indicating whether all subpictures referring to a same sequence parameter set have a same dimension, a second syntax element that indicates a common width and a common height of all subpictures having the same dimension, or one or more syntax elements according to a second rule are omitted when all subpictures do not have the same dimension.

In another example aspect, a video processing method is disclosed. The method includes determining, for a conversion between a video comprising one or more video pictures and a bitstream of the video, that a first syntax element in a picture parameter set that indicates a width of an i-th tile column in units of coding tree blocks minus 1 is equal to a width of a video picture in units of coding tree blocks minus 1 in response to a width of each video picture referring to the picture parameter set in units of luma samples being less than or equal to the luma coding tree block size; and performing the conversion based on the determining.

In another example aspect, a video processing method is disclosed. The method includes determining, for a conversion between a video comprising one or more video pictures and a bitstream of the video, that a first syntax element in a picture parameter set that indicates a height of an i-th tile row in units of coding tree blocks minus 1 is equal to a height of a video picture in units of coding tree blocks minus 1 in response to a height of each video picture referring to the picture parameter set in units of luma samples being less than or equal to a luma coding tree block size; and performing the conversion based on the determining.

In another example aspect, a video processing method is disclosed. The method includes performing a conversion between a video comprising video pictures and a coded representation of the video, wherein the coded representation conforms to a format rule, wherein the format rule specifies whether and where one or more syntax elements indicative of one or more initial quantization parameter (QP) values used during the conversion are included in the coded representation. In yet another example aspect, a video encoder apparatus is disclosed. The video encoder comprises a processor configured to implement above-described methods.

In another example aspect, another video processing method is disclosed. The method includes determining to use, for a conversion between a video block of a video and a coded representation of the video, an initial quantization parameter (QP) value; and performing a conversion based on the determining, wherein a syntax element in the coded representation is indicative of the initial QP value using a offset relationship comprising an offset value K that is (a) between 1 and 25, or (b) greater than 26, or (c) a function of maximum allowed QP value for the conversion, or (d) a function of bit depth used for the conversion.

In another example aspect, another video processing method is disclosed. The method includes determining, for a conversion between a chroma block of a video and a coded representation of the video, one or more quantization parameter (QP) tables based on a type of a picture or a slice that contains the chroma block according to a rule; and performing the conversion based on the determining.

In another example aspect, another video processing method is disclosed. The method includes determining, for a conversion between a chroma block of a video and a coded representation of the video, one or more quantization parameter (QP) tables; and performing the conversion based on the determining; wherein the conversion conforms to a first rule that specifies one or more syntax elements corresponding to the one or more QP tables or a second rule that specifies a relationship between the one or more QP tables and a coding characteristic of the chroma block.

In another example aspect, another video processing method is disclosed. The method includes performing a conversion between a chroma block of a video and a coded representation of the video; wherein the coded representation conforms to a format rule, wherein the format rule specifies a characteristic of a syntax element associated with one or more chroma quantization parameter (QP) tables used for the conversion.

In another example aspect, another video processing method is disclosed. The method includes determining, a signalling scheme used for signalling a quantization parameter table in a coded representation of a video based on a format rule related to one or more syntax elements in the coded representation, and performing, based on the determining, a conversion between the video and the coded representation.

In another example aspect, another video processing method is disclosed. The method includes performing a conversion between a video block of a video and a coded representation of the video according to a rule, wherein the rule specifies a number N that, in case that use of affine coding is enabled and use of subblock based temporal motion vector prediction disabled, is used to limit a maximum number of subblock merge candidates.

In another example aspect, another video processing method is disclosed. The method includes performing a conversion between a video comprising one or more video pictures comprising one or more video subpictures and a coded representation of the video, wherein the coded representation conforms to a format rule, wherein the format rule specifies to include or omit one or more of the following subpicture related syntax elements: a first syntax element indicating whether all subpictures referring to a same sequence parameter set have a same dimension, a second syntax element that signals a common width and a common height of all subpictures having the same dimension, or a third syntax element according to a second format rule.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

These, and other, features are described throughout the present disclosure.

BRIEF DESCRIPTION OF DRAWINGS

FIGS. 9 to 15 are flowcharts for example methods of video processing.

DETAILED DESCRIPTION

Figure 1:
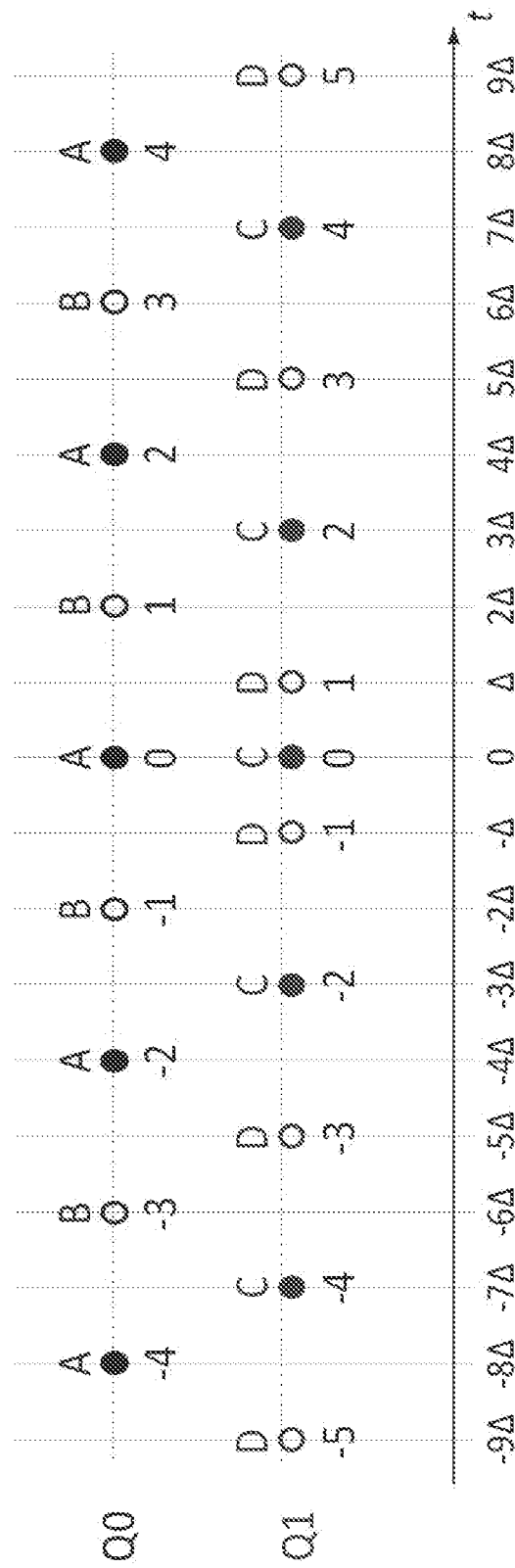
FIG. 1 is an illustration of the two scalar quantizers used in dependent quantization.

Section headings are used in the present disclosure for ease of understanding and do not limit the applicability of embodiments disclosed in each section only to that section. Furthermore, H.266 terminology is used in some description only for ease of understanding and not for limiting scope of the disclosed embodiments. As such, the embodiments described herein are applicable to other video codec protocols and designs also.

1. Introduction

This disclosure is related to video coding technologies. Specifically, it is related to initial quantization parameter (QP) and chroma QP table in video coding. It may be applied to the existing video coding standard like high efficiency video coding (HEVC), or the standard (e.g., versatile video coding (VVC)) to be finalized. It may be also applicable to future video coding standards or video codec.

2. Abbreviations

ALF Adaptive Loop Filter
APS Adaptation Parameter Set
AU Access Unit
AUD Access Unit Delimiter
AVC Advanced Video Coding
CCALF Cross-Component ALF
CLVS Coded Layer Video Sequence
CPB Coded Picture Buffer
CRA Clean Random Access
CTB Coding Tree Block
CTU Coding Tree Unit CU Coding Unit
CVS Coded Video Sequence
DPB Decoded Picture Buffer
DPS Decoding Parameter Set
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
ILRP Inter-Layer Reference Picture
JEM Joint Exploration Model
LMCS Luma Mapping with Chroma Scaling
MCTS Motion-Constrained Tile Sets
NAL Network Abstraction Layer
OLS Output Layer Set
PH Picture Header
PPS Picture Parameter Set
PTL Profile, Tier and Level
PU Picture Unit
QP Quantization Parameter
RB SP Raw Byte Sequence Payload
RPL Reference Picture List
SAO Sample Adaptive Offset
SBT Subblock Transform
SEI Supplemental Enhancement Information
SH Slice Header
SPS Sequence Parameter Set
SVC Scalable Video Coding
TU Transform Unit
VCL Video Coding Layer
VPS Video Parameter Set
VTM VVC Test Model
VUI Video Usability Information
VVC Versatile Video Coding

3. Video Coding Introduction

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting a 50% bitrate reduction compared to HEVC.

The latest version of VVC draft, i.e., Versatile Video Coding (Draft 8) can be found at:
http://phenix.int-evry.fr/jvet/doc_end_user/documents/17_Brussels/wg11/JVET-Q2001-v13.zip And the latest VVC test model software (VTM) can be found at:
https://vcgit.hhi.fraunhofer.de/jvet/VVCSoftware_VTM/-/archive/VTM-8.0/VVCSoftware_VTM-VTM-8.0.zip

3.1. Quantization Parameter Control

In VVC, Maximum QP was extended from 51 to 63, and the signalling of initial QP was changed accordingly. The initial value of SliceQpY is modified at the slice segment layer when a non-zero value of slice_qp_delta is coded. Specifically, the value of init_qp_minus26 is modified to be in the range of (−26+QpBdOffsetY) to +37. When the size of a transform block is not a power of 4, the transform coefficients are processed along with a modification to the QP or QP levelScale table rather than by multiplication by 181/256 (or 181/128), to compensate for an implicit scaling by the transform process. For transform skip block, minimum allowed Quantization Parameter (QP) is defined as 4 because quantization step size becomes 1 when QP is equal to 4.

In HEVC (and also in H.264), a fixed look-up table is used to convert the luma quantization parameter (QPY) to chroma quantization parameter (QPC). In VVC, a more flexible luma-to-chroma QP mapping is used. Instead of having a fixed table, the luma-to-chroma QP mapping relationship is signalled in the SPS using a flexible piecewise linear model, with the only constraint on the linear model being that the slope of each piece cannot be negative (i.e., as luma QP increases, chroma QP must stay flat or increase, but cannot decrease). The piecewise linear model is defined by: 1) the number of pieces in the model; 2) input (luma) and output (chroma) delta QPs for that piece. The input range of the piecewise linear model is [−QpBdOffsetY, 63] and the output range of the piecewise linear model is [−QpBdOffsetC, 63]. The QP mapping relationship can be signalled separately for Cb, Cr and joint Cb/Cr coding, or signalled jointly for all three types of residual coding.

Same as in HEVC, CU-level QP adaptation is allowed in VVC. Delta QP values for luma and chroma components can be signalled separately. For the chroma components, the allowed chroma QP offset values are signalled in the form of offset lists in the PPS in a similar manner as in HEVC. The lists are defined separately for Cb, Cr and joint Cb/Cr coding. Up to 6 offset values are allowed for each of Cb, Cr, and joint Cb/Cr lists. At the CU-level, an index is signalled to indicate which one of the offset values in the offset list is used to adjust the chroma QP for that CU. CU chroma QP offset signalling is also consistent with the virtual pipeline data unit (VPDU) CU QP delta availability, and for CU larger than 64×64, send the chroma QP offset with the first transform unit regardless of whether it has non-zero coded block flag (CBF) or not.

3.2. Dependent Quantization

In addition, the same HEVC scalar quantization is used with a new concept called dependent scalar quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization as used in HEVC, the admissible reconstruction vectors are packed denser in the N-dimensional vector space (N represents the number of transform coefficients in a transform block). That means, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

The two scalar quantizers used, denoted by Q0 and Q1, are illustrated in FIG. 1. The location of the available reconstruction levels is uniquely specified by a quantization step size A. The scalar quantizer used (Q0 or Q1) is not explicitly signalled in the bitstream. Instead, the quantizer used for a current transform coefficient is determined by the parities of the transform coefficient levels that precede the current transform coefficient in coding/reconstruction order.

Figure 2:
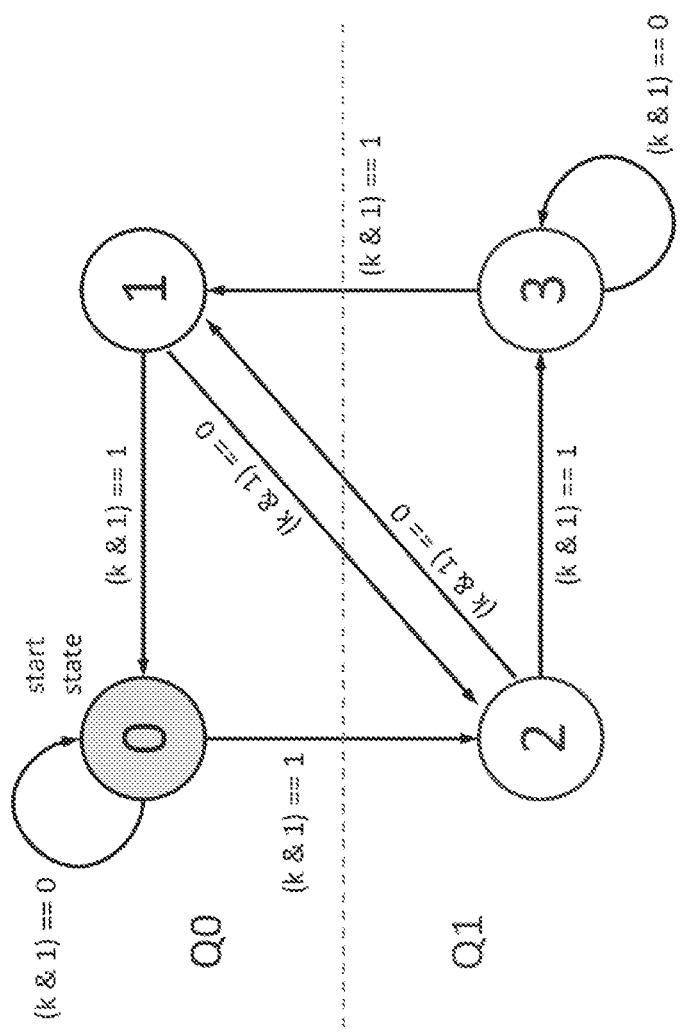
FIG. 2 shows an example of state transition and quantizer selection for dependent quantization.

As illustrated in FIG. 2, the switching between the two scalar quantizers (Q0 and Q1) is realized via a state machine with four states. The state can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 2, where k denotes the value of the transform coefficient level.

3.3. Scaling Matrices

VVC supports using the default scaling matrices or signal user-defined scaling matrices. The DEFAULT mode scaling matrices are all flat, with elements equal to 16 for all transform block (TB) sizes. Intra block copy (IBC) and intra coding modes currently share the same scaling matrices. Thus, for the case of USER_DEFINED matrices, the number of MatrixType and MatrixType_DC are updated as follows:
MatrixType: 30=2 (2 for intra&IBC/inter)×3 (Y/Cb/Cr components)×5 (square TB size: from 4×4 to 64×64 for luma, from 4×4 to 32×32 for chroma)
MatrixType_DC: 14=2 (2 for intra&IBC/inter×1 for Y component)×3 (TB size: 16×16, 32×32, 64×64)+4 (2 for intra&IBC/inter×2 for Cb/Cr components)×2 (TB size: 16×16, 32×32)

The DC values are separately coded for following scaling matrices: 16×16, 32×32, and 64×64. For TBs of size smaller than 8×8, all elements in one scaling matrix are signalled. If the TBs have size greater than or equal to 8×8, only 64 elements in one 8×8 scaling matrix are signalled as a base scaling matrix. For obtaining square matrices of size greater than 8×8, the 8×8 base scaling matrix is up-sampled (by duplication of elements) to the corresponding square size (i.e., 16×16, 32×32, 64×64). When the zeroing-out of the high frequency coefficients for 64-point transform is applied, corresponding high frequencies of the scaling matrices are also zeroed out. That is, if the width or height of the TB is greater than or equal to 32, only the left or top half of the coefficients is kept, and the remaining coefficients are assigned to zero. Moreover, the number of elements signalled for the 64×64 scaling matrix is also reduced from 8×8 to three 4×4 submatrices, since the bottom-right 4×4 elements are never used. In VVC, 2×2, 2×4, and 4×2 chroma intra coding blocks (CBs) do not exist, and the smallest intra block size is equal to 2×8 and 8×2, as well as the smallest chroma intra block copy (IBC) block size. Furthermore, inter-prediction is disabled for 4×4 luma CBs. Therefore, small 2×2 chroma blocks can be created only by applying a subblock transform (SBT). Considering these essences, 2×2 intra chroma quantization matrices (QMs) are removed from the default QM list, and user-defined intra QMs are not coded for this size.

In order to improve coding efficiency for user defined quantization matrixes (QM), following approaches are considered.
- Allow referencing a previously coded QM with the same base size as the current QM.
- Allow coding element-to-element differences between the current QM and the reference QM.
- Keep the original differential pulse code modulation (DPCM) coding of elements within the current QM.
- Use a single matrix identifier scalingListId which combines matrixId and sizeId.

3.4. Joint Coding of Chroma Residuals

VVC supports a mode where the chroma residuals are coded jointly, referred to as joint coding of chroma residuals (JCCR). The usage (activation) of a joint chroma coding mode is indicated by a TU-level flag tu_joint_cbcr_residual_flag and the selected mode is implicitly indicated by the chroma CBFs. The flag tu_joint_cbcr_residual_flag is present if either or both chroma CBFs for a TU are equal to 1. In the PPS and slice header, chroma QP offset values are signalled for the joint chroma residual coding mode to differentiate from the usual chroma QP offset values signalled for regular chroma residual coding mode. These chroma QP offset values are used to derive the chroma QP values for those blocks coded using the joint chroma residual coding mode. When a corresponding joint chroma coding mode (modes 2 in the following table) is active in a TU, this chroma QP offset is added to the applied luma-derived chroma QP during quantization and decoding of that TU. For the other modes (modes 1 and 3 in the following table), the chroma QPs are derived in the same way as for conventional Cb or Cr blocks. The reconstruction process of the chroma residuals (resCb and resCr) from the transmitted transform blocks is depicted in Table 1. When this mode is activated, one single joint chroma residual block (resJointC [x][y] in the following table) is signalled, and residual block for Cb (resCb) and residual block for Cr (resCr) are derived considering information such as tu_cbf_cb, tu_cbf_cr, and CSign, which is a sign value specified in the slice header. At the encoder side, the joint chroma components are derived as explained in the following. Depending on the mode (listed in the tables above), resJointC{1,2} are generated by the encoder as follows:

If mode is equal to 2 (single residual with reconstruction Cb=C, Cr=CSign*C), the joint residual is determined according to:

resJointC[x][y]=(resCb[x][y]+CSign*resCr[x][y])/2

Otherwise, if mode is equal to 1 (single residual with reconstruction Cb=C, Cr=(CSign*C)/2), the joint residual is determined according to:

resJointC[x][y]=(4*resCb[x][y]+2*CSign*resCr[x][y])/5

Otherwise (mode is equal to 3, i.e., single residual, reconstruction Cr=C, Cb=(CSign*C)/2), the joint residual is determined according to:

resJointC[x][y]=(4*resCr[x][y]+2*CSign*resCb[x][y])/5

TABLE 1

Reconstruction of chroma residuals. The value CSign is a sign value (+1 or −1), which is specified in the slice header, resJointC[ ][ ] is the transmitted residual.

| tu_cbf_cb | tu_cbf_cr | reconstruction of Cb and Cr residuals | mode |
|---|---|---|---|
| 1 | 0 | resCb[ x ][ y ] = resJointC[ x ][ y ]<br>resCr[ x ][ y ] =<br>( CSign * resJointC[ x ][ y ] ) << 1 | 1 |
| 1 | 1 | resCb[ x ][ y ] = resJointC[ x ][ y ]<br>resCr[ x ][ y ] = CSign * resJointC[ x ][ y ] | 2 |
| 0 | 1 | resCb[ x ][ y ] =<br>( CSign * resJointC[ x ][ y ] ) << 1<br>resCr[ x ][ y ] = resJointC[ x ][ y ] | 3 |

The three joint chroma coding modes described above are only supported in I slices. In P and B slices, only mode 2 is supported. Hence, in P and B slices, the syntax element tu_joint_cbcr_residual_flag is only present if both chroma cbfs are 1. Note that transform depth is removed in the context modeling of tu_cbf_luma and tu_cbf_cb.

3.5. Chroma QP Table in SPS

In clause 7.3.2.3 of JVET-Q2001-vC, the SPS includes a structure named chroma QP table, shown as follows:

|  | Descriptor |
|---|---|
| seq_parameter_set_rbsp( ) {<br>......<br>if( ChromaArrayType != 0 ) {<br>  sps_joint_cbcr_enabled_flag<br>  same_qp_table_for_chroma<br>  numQpTables = same_qp_table_for_chroma ? 1 : (<br>sps_joint_cbcr_enabled_flag ? 3 : 2 )<br>    for( i = 0; i < numQpTables; i++ ) {<br>      qp_table_start_minus26[ i ]<br>      num_points_in_qp_table_minus1[ i ]<br>      for( j = 0; j <= num_points_in_qp_table_minus1[ i ]; j++ ) {<br>        delta_qp_in_val_minus1[ i ][ j ]<br>        delta_qp_diff_val[ i ][ j ]<br>      }<br>    }<br>}<br>...... | <br><br><br>u(1)<br>u(1)<br><br><br><br>se(v)<br>ue(v)<br><br>ue(v)<br>ue(v) |

They are with the following semantics and QP table derivation:

sps_joint_cbcr_enabled_flag equal to 0 specifies that the joint coding of chroma residuals is disabled. sps_joint_cbcr_enabled_flag equal to 1 specifies that the joint coding of chroma residuals is enabled. When not present, the value of sps_joint_cbcr_enabled_flag is inferred to be equal to 0.

same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1. same_qp_table_for_chroma equal to 0 specifies that chroma QP mapping tables, two for Cb and Cr, and one additional for joint Cb-Cr when sps_joint_cbcr_enabled_flag is equal to 1, are signalled in the SPS. When same_qp_table_for_chroma is not present in the bitstream, the value of same_qp_table_for_chroma is inferred to be equal to 1.

qp_table_start_minus26[i] plus 26 specifies the starting luma and chroma QP used to describe the i-th chroma QP mapping table. The value of qp_table_start_minus26[i] shall be in the range of −26−QpBdOffset to 36 inclusive. When qp_table_start_minus26[i] is not present in the bitstream, the value of qp_table_start_minus26[i] is inferred to be equal to 0.

num_points_in_qp_table_minus1[i] plus 1 specifies the number of points used to describe the i-th chroma QP mapping table. The value of num_points_in_qp_table_minus1[i] shall be in the range of 0 to 63+QpBdOffset, inclusive. When num_points_in_qp_table_minus1[0] is not present in the bitstream, the value of num_points_in_qp_table_minus1[0] is inferred to be equal to 0.

delta_qp_in_val_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1[0][j] is inferred to be equal to 0.

delta_qp_diff_val[i][j] specifies a delta value used to derive the output coordinate of the j-th pivot point of the i-th chroma QP mapping table.

The i-th chroma QP mapping table ChromaQpTable[i] for i=0 . . . numQpTables−1 is derived as follows:

```
qpInVal[ i ][ 0 ] = qp_table_start_minus26[ i ] + 26
qpOutVal[ i ][ 0 ] = qpInVal[ i ][ 0 ]
for( j = 0; j <= num_points_in_qp_table_minus1[ i ]; j++ ) {
  qpInVal[ i ][ j + 1 ] = qpInVal[ i ][ j ] + delta_qp_in_val_minus1[
    i ][ j ] + 1
  qpOutVal[ i ][ j + 1 ] = qpOutVal[ i ][ j ] +
  ( delta_qp_in_val_minus1[ i ][ j ] ^ delta_qp_diff_val[ i ][ j ] )
}
```

-continued

```
ChromaQpTable[ i ][ qpInVal[ i ][ 0 ] ] = qpOutVal[ i ][ 0 ]
for( k = qpInVal[ i ][ 0 ] - 1; k >= -QpBdOffset; k - - )
  ChromaQpTable[ i ][ k ] = Clip3( -QpBdOffset, 63, ChromaQpTable[
    i ][ k + 1 ] - 1 )
for( j = 0; j <= num_points_in_qp_table_minus1[ i ]; j++ ) {
  sh = ( delta_qp_in_val_minus1[ i ][j + 1 ) >> 1
  for( k = qpInVal[ i ][ j ] + 1, m = 1; k <= qpInval[ i ][ j + 1 ];
  k++, m++ )
    ChromaQpTable[ i ][ k ] = ChromaQpTable[ i ][ qpInVal[ i ][ j ] ] +
      ( ( qpOutVal[ i ][j + 1] - qpOutVal[ i ][j ] ) * m + sh ) /
( delta_qp_in_val_minus1[ i ][j] + 1 )
}
for( k = qpInVal[ i ][ num_points_in_qp_table_minus1[ i ] + 1 ] + 1;
k <= 63; k++ )
  ChromaQpTable[ i ][ k ] = Clip3( -QpBdOffset, 63, ChromaQpTable[
    i ][ k - 1 ] + 1 )
```

When same_qp_table_for_chroma is equal to 1, ChromaQpTable[1][k] and ChromaQpTable[2][k] are set equal to ChromaQpTable[0][k] for k in the range of −QpBdOffset to 63, inclusive.
It is a requirement of bitstream conformance that the values of qpInVal[i][j] and qpOutVal[i][j] shall be in the range of −QpBdOffset to 63, inclusive for i in the range of 0 to numQpTables−1, inclusive, and j in the range of 0 to num_points_in_qp_table_minus1[i]+1, inclusive. In the above description, QpBdOffset is derived as:
bit_depth_minus8 specifies the bit depth of the samples of the luma and chroma arrays, BitDepth, and the value of the luma and chroma quantization parameter range offset, QpBdOffset, as follows:

BitDepth=8+bit_depth_minus8

$Qp$BdOffset=6*bit_depth_minus8 bit_depth_minus8 shall be in the range of 0 to 8, inclusive.

3.6. Initial QP in PPS

There is a syntax element, named init_qp_minus26, in PPS. The semantics is as follows:
init_qp_minus26 plus 26 specifies the initial value of SliceQp$_Y$ for each slice referring to the PPS. The initial value of SliceQp$_Y$ is modified at the picture level when a non-zero value of ph_qp_delta is decoded or at the slice level when a non-zero value of slice_qp_delta is decoded. The value of init_qp_minus26 shall be in the range of −(26+QpBdOffset) to +37, inclusive.
When qp_delta_info_in_ph_flag is equal to 1, the initial value of the Qp$_Y$ quantization parameter for all slices of the picture, SliceQp$_Y$, is derived as follows:

Slice$Qp_Y$=26+init_$qp$_minus26+$ph$_$qp$_delta

When qp_delta_info_inph_flag is equal to 0, the initial value of the Qp$_Y$ quantization parameter for the slice, SliceQp$_Y$, is derived as follows:

Slice$Qp_Y$=26+init_$qp$_minus26+slice_$qp$_delta

The value of SliceQp$_Y$ shall be in the range of −QpBdOffset to +63, inclusive.

4. Technical Problems Solved by Disclosed Technical Solutions and Embodiments 1. The signalling of the initial QP value (i.e., init_qp_minus26) may not be reasonable.
2. I and B/P pictures or slices may need different chroma QP tables, however, they share the same in the current VVC draft text.
3. Transform skip may need another chroma QP table.
4. Chroma QP table start point should cover the whole QP range which is not the case in the current design.
5. Chroma QP table may have a biased start point.
6. The number of points in a chroma QP table should be able to be 0, but this is disallowed in the current design since the num_points_in_qp_table_minus1 is coded and the minimum allowed value of the syntax element is equal to 0 and consequently the minimum number of points is 1.
7. Specifying a QP clipping in the derivation of chroma QP may be better than specifying a bitstream conformance constraint for limiting the derived chroma QP value, as the former would prevent a violation from happening.
8. In the latest VVC draft text, the SH syntax element slice_ts_residual_coding_disabled_flag is used to specify whether transform skip based residual coding (TSRC) or regular residual coding (RRC) is used for a transform bock. However, there might be higher-level (SPS/PPS) and/or lower-level (CU/TU) level control flags for whether the current block is using TSRC or RRC. Moreover, the interactions between different level control flags, and between the control flag and the transform skip flags would be further specified.
9. In current VVC, chroma ALF and CCALF are disabled implicitly when luma ALF is disabled at SPS/PH/SH. However, such a restriction is not applied at CTU level. When luma ALF is disabled for a CTU, the chroma ALF and CCALF may still be applied for the CTU. Such a design is conflicting with the intention of controlling chroma ALF/CCALF based on luma ALF at higher levels
10. Chroma QP tables may have a default set of values, dependent on color format.
11. In the sub-bitstream extraction process specified in clause C.6 of the latest VVC draft in JVET-Q2001-vE, one step is specified as follows:
    Remove from outBitstream all NAL units for which all of the following conditions are true:
        nal_unit_type is not equal to IDR_W_RADL, IDR_N_LP, or CRA_NUT.
        nuh_layer_id is equal to LayerIdInOls[targetOlsIdx][j] for a value of j in the range of 0 to NumLayersInOls[targetOlsIdx]−1 inclusive.
        TemporalId is greater than or equal to NumSubLayersInLayerInOLS[targetOlsIdx][j].
    However, that means parameter sets etc. non-VCL NAL units that satisfy the all the three conditions would also be removed. That is not desirable, and parameter sets, e.g., PPSs and APSs can be shared by pictures with different TemporalId values, and can be placed at the beginning of the bitstream.
12. The current spec allows 8 ALF APS, 8 SCALING APS, and 3 LMCS APS, respectively. However, the number of APS NAL units allowed for pictures may be not enough, e.g., a typical use case is that a picture contains 96 subpictures and each subpicture may require different ALF APS. In such case, current eight ALF APS NAL units are not sufficient to achieve a decent coding efficiency. Therefore, there is a need to support a larger number of APSs.
13. JVET-50071 proposes to add a shortcut for signalling of subpictures layout to the VVC design in JVET-R2001-vA/v10, as follows:

a. Add sps_subpic_same_res_flag, equal to 1 specifies that all subpictures have the same width and height, respectively.
b. When sps_subpic_same_res_flag is equal to 1, sps_subpic_width_minus1[i] and sps_subpic_height_minus1[i] are only signalled when i is equal to 0, and sps_subpic_ctu_top_left_x[i] and sps_subpic_ctu_top_left_y[i] are skipped for all i values.

However, the syntax design is somewhat messy, and when all subpictures have the same width and height, respectively, the number of subpictures can be derived thus should not be signalled.

5. Example Listing of Embodiments and Solutions

To solve the above problems, and others, methods as summarized below are disclosed. The items should be considered as examples to explain the general concepts and should not be interpreted in a narrow way. Furthermore, these items can be applied individually or combined in any manner.

In the following, floor(x) denotes a function that returns the greatest integer that is less than or equal to x.

1. The initial QP value syntax element, which is used to specify the initial QP values, e.g., currently denoted as init_qp_minus26 in JVET-Q2001-vC, in PPS may be moved to PH.
   a. Alternatively, the initial QP value syntax element may be repeated at PH.
   b. Alternatively, the initial QP value syntax element may be signalled in both PPS and PH, and the initial QP value syntax element signalled in PH may override or update (by adding the signalled delta) the initial QP value syntax element signalled in PPS.
   c. Alternatively, the initial QP value syntax element may be signalled in the SPS, possibly also signalled in one or more of the PPS, PH, and SH, and when present, the value at a lower level overrides or updates (by adding the signalled delta) the value signalled at a higher level. In the case of updating, the initial QP value signalled at the highest level is ue(v) coded, and the delta values signalled in the lower levels are se(v) coded.

2. Multiple syntax elements for indications of initial QP values may be signalled in SPS/PPS/PH/SH according to specific types.
   a. In one example, each of them may be corresponding to a specific type.
   b. In one example, the specific type may include a picture/slice type (e.g., I/P/B; Intra/Inter).
   c. In one example, the specific type may include a video content type (e.g., screen content or camera captured content).
   d. In one example, the specific type may include an index of a subpicture or other subpicture identification information, i.e., different subpictures may be associated with different syntax elements for initial QPs derivation.
   e. In one example, the specific type may include an index of a slice or other slice identification information, i.e., different slices may be associated with different syntax elements for initial QPs derivation.
   f. In one example, the specific type may include an index of a tile or other tile identification information, i.e., different tiles may be associated with different syntax elements for initial QPs derivation.
   g. In one example, the specific type may include a transform type. (e.g., transform skip mode or not transform skip mode).

3. The initial QP value syntax element (e.g., in SH/PH/PPS/SPS) may be offset by a number K not equal to 26.
   a. In one example, K is smaller than 26.
   b. In one example, the syntax element may be replaced by init_qp_minusK and/or the value of the syntax element shall be in the range of −(K+QpBdOffset) to (63−K), inclusive, where K is smaller than 26.
      i. In one example, K is equal to 20. Alternatively, furthermore, the syntax element may be replaced by init_qp_minus20 and/or the value of the syntax element shall be in the range of −(20+QpBdOffset) to 43 (i.e., 63-20), inclusive.
   c. In one example, K is larger than 26.
      i. In one example, the syntax element may be replaced by init_qp_minusK, and the value of the syntax element shall be in the range of −(K+QpBdOffset) to (63−K), inclusive, where K is a constant larger than 26.
      ii. In one example, K is equal to 32. Alternatively, furthermore, the syntax element may be replaced by init_qp_minus32 and the value of the syntax element shall be in the range of −(32+QpBdOffset) to 31 (i.e., 63−32), inclusive.
   d. Alternatively, K may be set to a function of the maximum allowed QP and/or the minimum allowed QP. For example, K may be set equal to (the maximum allowed QP−the minimum allowed QP)/2 or (the maximum allowed QP+1−the minimum allowed QP)/2.
   e. In the above example, K may be dependent on picture/slice/block types; and/or prediction modes and/or bitdepth.
      i. In one example, the value of K for a I slice/picture is no greater than that for a PB slices/pictures.

4. The initial QP value syntax element (e.g., in SH/PH/PPS) may be offset by a number dependent on the internal bit depth.
   a. In one example, the initial QP value syntax element may be offset by floor((−QpBdOffset+M)/2).
      i. Alternatively, furthermore, the value of the syntax element plus floor((−QpBdOffset+M)/2) shall be in the range of −QpBdOffset to 63, inclusive.
   b. In one example, the initial QP value syntax element may be offset by (floor((−QpBdOffset+M)/2)+K), where K is a constant number.
      i. Alternatively, furthermore, the value of the syntax element plus (floor((−QpBdOffset+M)/2)+K) shall be in the range of −QpBdOffset to N, inclusive.
   c. In the above examples, N may be set to the maximum allowed QP value (e.g., 63).
   d. In the above examples, M may be set to the maximum allowed QP value (e.g., 63) or maximum allowed QP value plus/minus 1.

5. Chroma QP tables may be determined according to picture/slice types.
   a. In one example, different picture/slice types may have different sets of chroma QP tables.
   b. In one example, I pictures/slices may have their own chroma QP tables.
   c. In one example, I and B and P pictures/slices may each have their own chroma QP tables.
   d. In one example, B and P pictures/slices may share the same set of chroma QP tables.

e. In one example, the picture/slice types may be classified to M cases (M=2 for I only, BP share; M=3 for I/B/P separate). The number of chroma QP tables to be signalled may be dependent on M.
  i. In one example, number of chroma QP tables to be signalled may be set to M*numQpTables wherein (numQpTables=same_qp_table_for_chroma ? 1:(sps_joint_cbcr_enabled_flag ? 3:2)) wherein M is greater than 1.
    1) Alternatively, furthermore, the semantics of same_qp_table_for_chroma may be further modified to 'same_qp_table_for_chroma equal to 1 specifies that only one chroma QP mapping table is signalled for a picture/slice type'.
  ii. In one example, furthermore, number of chroma QP tables to be signalled may be set to (same_qp_table_for_chroma ? 1:(M*(sps_joint_cbcr_enabled_flag ? 3:2))) wherein M is greater than 1.
  iii. In one example, for each category, an indication of whether all blocks share the same chroma QP tables is firstly signalled, and number of QP tables may be set to (same_qp_table_for_chroma ? 1:(sps_joint_cbcr_enabled_flag ? 3:2)), followed by detailed information of chroma QP tables.
    1) Alternatively, furthermore, for all categories, indications of the starting luma and chroma QP used to describe a chroma QP mapping table may be further signalled, such as using the actual value minus K (e.g., K=26).
    2) Alternatively, furthermore, indications of the starting luma and chroma QP used to describe a chroma QP mapping table may be further signalled, such as using the actual value minus K (e.g., K=1 for intra slices/pictures or K=32 for inter slices/pictures) and K depending on category index.
6. An indication, e.g., sps_non_intra_present_flag, may be added into SPS to indicate if the current sequence may contain B/P slices.
  a. In one example, when the flag is 1, it indicates that all slices in the current sequences are of intra slices.
  b. In one example, when the flag is 0, it indicates that there may be B/P slices in the current sequence.
7. Either one or two sets of chroma QP tables may be signalled in the SPS.
  a. A flag is added to the SPS, e.g., named sps_one_set_of_chroma_qp_tables_flag.
  b. sps_one_set_of_chroma_qp_tables_flag equal to 1 specifies the presence of one set of chroma QP tables in the SPS (i.e., as in the current VVC draft text), and this set of chroma QP tables only applies to intra coded entities (pictures, slices, CTUs, CUs, or coded blocks).
    i. In one example, the only set of chroma QP tables applies only to intra pictures (for which all slices are intra slices, i.e., I slices) in CLVSs referring to the SPS.
    ii. In one example, the only set of chroma QP tables applies only to intra slices in CLVSs referring to the SPS.
    iii. In one example, the only set of chroma QP tables applies only to intra CTUs in CLVSs referring to the SPS.
    iv. In one example, the only set of chroma QP tables applies only to intra CUs in CLVSs referring to the SPS.
    v. In one example, the only set of chroma QP tables applies only to intra coded blocks in CLVSs referring to the SPS.
  c. sps_one_set_of_chroma_qp_tables_flag equal to 1 specifies the presence of one set of chroma QP tables in the SPS (i.e., as in the current VVC draft text), and this set of chroma QP tables applies to both intra and inter coded entities (pictures, slices, CTUS, CUs, or coded blocks).
  d. sps_one_set_of_chroma_qp_tables_flag equal to 0 specifies the presence of two set of chroma QP tables in the SPS (i.e., adding one more set of chroma QP tables), the 0-th set of chroma QP tables only applies to intra coded entities (pictures, slices, CTUS, CUs, or coded blocks), and the 1-th set of chroma QP tables only applies to inter coded entities (pictures, slices, CTUs, CUs, or coded blocks).
    i. In one example, the 0-th set of chroma QP tables applies only to intra pictures (for which all slices are intra slices) in CLVSs referring to the SPS, and the 1-th set of chroma QP tables applies only to inter pictures (for which all slices are inter slices, i.e., B or P slices) in CLVSs referring to the SPS.
    ii. In one example, the 0-th set of chroma QP tables applies only to intra slices in CLVSs referring to the SPS, and the 1-th set of chroma QP tables applies only to inter slices in CLVSs referring to the SPS.
    iii. In one example, the 0-th set of chroma QP tables applies only to intra CTUs in CLVSs referring to the SPS, and the 1-th set of chroma QP tables applies only to inter CTUs in CLVSs referring to the SPS.
    iv. In one example, the 0-th set of chroma QP tables applies only to intra CUs in CLVSs referring to the SPS, and the 1-th set of chroma QP tables applies only to inter CUs in CLVSs referring to the SPS.
    v. In one example, the 0-th set of chroma QP tables applies only to intra coded blocks in CLVSs referring to the SPS, and the 1-th set of chroma QP tables applies only to inter coded blocks in CLVSs referring to the SPS.
  e. The flag may be sent only when ChromaArrayType is not equal to 0.
  f. An exemplary embodiment is shown in embodiment 4.
  g. Another exemplary embodiment is shown in embodiment 5.
8. Chroma QP tables may be determined according to prediction modes.
  a. In one example, intra CUs and other CUs may have a different set of chroma QP tables.
    i. In one example, it may only apply on dual tree and/or local dual tree.
  b. Alternatively, intra/palette CUs and other CUs may have a different set of chroma QP tables.
  c. Alternatively, intra/IBC/palette CUs and other CUs may have a different set of chroma QP tables.
  d. Alternatively, intra/IBC CUs and other CUs may have a different set of chroma QP table.
  e. In the above examples, the number of chroma QP tables to be signalled may be dependent on number of the classified sets of prediction modes.
  f. In the above examples, the prediction mode may mean the prediction mode of the luma CB.
9. Transform skip blocks may have a different set of chroma QP tables.

a. In one example, it may only apply to luma blocks coded in transform skip mode.
10. The maximum allowed value of the chroma QP table start point syntax element, i.e., currently denoted as qp_table_start_minus26 in JVET-Q2001-vC, may be 37.
11. The chroma QP table start point syntax element, i.e., currently denoted as qp_table_start_minus26 in JVET-Q2001-vC, may be offset by a number K smaller than 26.
   a. In one example, the syntax element may be replaced by qp_table_start_minusK and/or the value of the syntax element plus K shall be in the range of −(K+QpBdOffset) to (M−K), inclusive, where K is smaller than 26.
   b. In one example, the syntax element may be replaced by qp_table_start_minusK and/or the value of the syntax element shall be in the range of −(K+QpBdOffset) to (M−1−K), inclusive, where K is smaller than 26.
      i. In one example, K is equal to 20. Alternatively, furthermore, the syntax element may be replaced by init_qp_minus20 and/or the value of the syntax element plus 20 shall be in the range of −(20+QpBdOffset) to (M−20), inclusive.
      ii. In one example, K is equal to 20. Alternatively, furthermore, the syntax element may be replaced by init_qp_minus20 and/or the value of the syntax element plus 20 shall be in the range of −(20+QpBdOffset) to (M−1−20), inclusive.
   c. Alternatively, the initial QP value syntax element may be offset by a number K larger than 26.
      i. In one example, the syntax element may be replaced by init_qp_minusK, and the value of the syntax element plus K shall be in the range of −(K+QpBdOffset) to (M−K), inclusive, where K is a constant larger than 26.
      ii. In one example, the syntax element may be replaced by init_qp_minusK, and the value of the syntax element plus K shall be in the range of −(K+QpBdOffset) to (M−1−K), inclusive, where K is a constant larger than 26.
         1) In one example, K is equal to 32. Alternatively, furthermore, the syntax element may be replaced by init_qp_minus32 and the value of the syntax element plus 32 shall be in the range of −(32+QpBdOffset) to (M−32), inclusive.
         2) In one example, K is equal to 32. Alternatively, furthermore, the syntax element may be replaced by init_qp_minus32 and the value of the syntax element plus 32 shall be in the range of −(32+QpBdOffset) to (M−1−32), inclusive.
   d. In the above example, K may be dependent on picture/slice types; and/or prediction modes and/or bit depth.
      i. In one example, for Intra picture/slices, K is set to 1.
      ii. In one example, for PB picture/slices, K is set to 32.
   e. In the above example, M may be the maximum allowed QP value, e.g., 63.
   f. In one example, K is 0.
      i. Alternatively, furthermore, the syntax element may be binarized with uv(e) instead of sv(e).
12. The chroma QP table start point syntax element, i.e., currently denoted as qp_table_start_minus26 in JVET-Q2001-vC, may be offset by a value depend on if the current picture is intra only picture.
   a. Alternatively, the offset may depend on intra_only_constraint_flag.
13. The syntax element related to the number of pivot points in a chroma QP table, i.e., currently denoted as num_points_in_qp_table_minus1, should be able to present 0 number of points.
   a. In one example, the syntax element num_points_in_qp_table_minus1, may be replaced by num_points_in_qp_table that is used to specify the number of points in a chroma QP table and the value is a non-negative integer.
      i. In one example, the value of the syntax element that denotes the number of pivot points shall be in the range of 0 to (63+QpBdOffset).
   b. Alternatively, furthermore, when number of pivot points in a chroma QP table is zero, the i-th entry of a chroma QP table is set equal to the i-th entry of a luma QP table.
   c. Alternatively, furthermore, when number of pivot points in a chroma QP table is zero, the i-th entry of a chroma QP table is set equal to (the i-th entry of a luma QP table plus an offset).
      i. In one example, the offset may be dependent on the coded method (e.g., JCCR on or off)
14. Parsing of the chroma QP table start point syntax element, i.e., currently denoted as qp_table_start_minus26 in JVET-Q2001-vC, may be conditional on if the number of pivot points is 0 or not.
   a. In one example, when the number of pivot points is 0, parsing of the syntax element may be skipped.
15. In the derivation process of the chroma QP table, the XOR operator should be performed between (delta_qp_in_val_minus1[i][j]+1) and delta_qp_diff_val[i][j].
   a. An example is shown in embodiment 3.
16. A QP clipping may be always applied to the chroma QP table index.
   a. In one example, the clipping range is from −QpBdOffset to 63, inclusive.
17. A QP clipping may be always applied to the mapped chroma QPs in a chroma QP table.
   a. In one example, the clipping range is from −QpBdOffset to 63, inclusive.
18. Chroma QP tables may be signalled in both SPS and PPS.
   a. In one example, chroma QP table in PPS may overwrite the corresponding table in SPS.
19. Chroma QP tables may be signalled in PH or SH.
   a. In one example, chroma QP table in PH or SH may overwrite the corresponding table in SPS or PPS.
20. The default chroma QP tables may depend on ChromaArrayType.
   a. In one example, when ChromaArrayType is equal to 3 (i.e., 4:4:4 color format and separate colour plane flag is equal to 0), identity QP chroma QP tables (i.e., luma QP=chroma QP) may be set as default.
   b. In one example, when ChromaArrayType is equal to 2 (i.e., 4:2:2 color format), identity QP chroma QP tables (i.e., luma QP=chroma QP) may be set as default.
21. Regarding the control of RRC and TSRC for solving the eighth problem, one or more of the following approaches are disclosed, e.g., as in the seventh set of embodiments:
   a. In one example, whether to allow TSRC for a video unit (CLVS/group of pictures/picture/slice/tile/CTU row/CTU/CU/PU/TU) may be dependent on syntax elements (e.g., one or more flags) signalled in the SPS/PPS/PH/SH/block/CU/TU-level.
  i. For example, the TSRC enabling/disabling flag may be signalled either in the PH or the SH, but not both.
    1) Additionally, whether to signalled the TSRC enabling/disabling flag in the PH or the SH may be dependent on a syntax flag signalled in the PPS/SPS.
    2) Additionally, when the TSRC enabling/disabling flag is signalled in the PH, then the TSRC enabling/disabling flag in the SH is not signalled.
    3) Additionally, when the TSRC enabling/disabling flag in the SH is not present, it is inferred to be equal to the TSRC enabling/disabling flag in the PH.
  ii. Alternatively, the TSRC enabling/disabling flags may be signalled in both the PH and SH.
    1) Additionally, furthermore, the TSRC enabling/disabling flags in the SH may be not signalled when the TSRC enabling/disabling flags in the PH specifying that the TSRC is disabled for all slices referring to the PH.
  iii. For example, the block/CU/TU-level TSRC enabling/disabling flag is coded with context-adaptive arithmetic entropy-coded syntax element, such as ae(v) coding.
  iv. For example, the SPS/PPS/PH/SH-level TSRC enabling/disabling flag is coded with unsigned integer using n bits (e.g., u(1) coding), such as n=1.
b. Additionally, the signalling of the TSRC enabling/disabling flag for a video unit may be dependent on whether the transform skip is enabled/used for a video unit.
  i. For example, if the transform skip is disabled at the SPS-level (e.g., sps_transform_skip_enabled_flag is equal to 0), then the TSRC enabling/disabling flag in the PPS-level is required be equal to a certain value that specifying the TSRC is disabled for pictures referring to the current PPS.
  ii. Additionally, if the transform skip is disabled at a higher-level (e.g., sps_transform_skip_enabled_flag is equal to 0), then the TSRC enabling/disabling flags at the lower-level and/or same-layer (e.g., SPS/PH/SH/block/CU/TU-level) are not signalled.
  iii. Alternatively, furthermore, if the transform skip is enabled at a higher-level (e.g., SPS) but not used for a video unit (e.g., the TU-level transform_skip_flag is equal to 0), then the TSRC enabling/disabling flag of the current video unit (e.g., TU) is not signalled.
  iv. Additionally, when the TSRC enabling/disabling flag is not signalled at a video unit level, the value of the TSRC enabling/disabling flag is inferred to be a certain value that specifying the TSRC is disabled for the video unit.
c. Alternatively, furthermore, the signalling of the TSRC enabling/disabling flag at low-level may be dependent on the TSRC enabling/disabling flag at higher-level.
  i. For example, the signalling of the TSRC enabling/disabling flag at picture/slice level may be dependent on whether the TSRC is enabled at SPS/PPS-level.
  ii. Additionally, the signalling of the TSRC enabling/disabling flag at block/CU/TU level may be dependent on whether the TSRC is enabled at SPS/PPS/picture/slice-level.
    1) For example, when the TSRC is disabled at a higher-level (e.g., SPS/PPS/picture/slice-level), then the TSRC enabling/disabling flag at block/CU/TU level is not signalled.
    2) Additionally, furthermore, when the TSRC enabling/disabling flag is not present, it is inferred to a certain value (such as a value specifying the TSRC is disabled for the current video unit).
  iii. Additionally, the value of the TSRC enabling/disabling flag at PPS-level may be dependent on whether the TSRC is enabled at SPS-level.
    1) For example, when the SPS-level TSRC enabling/disabling flag specifies that the TSRC is disabled for the CLVS, then the value of the PPS-level TSRC enabling/disabling flag is required to be equal to a certain value that specifying the TSRC is disabled for pictures referring to the current PPS.

Regarding ALF and CCALF
22. it is proposed that indication of usage of chroma ALF/CCALF for a current CTU are not signalled when the luma ALF is disabled for the current CTU.
  a. Alternatively, furthermore, the usage is inferred to be false when luma ALF is disabled for a CTU. In other words, chroma ALF/CCALF are disabled when luma ALF is disabled in a CTU Regarding Sub-Bitstream Extraction
23. It is proposed that the information carried in the array NumSubLayersInLayerInOLS[ ][ ] may be used in the sub-bitstream extraction process in VVC only for removing of VCL NAL units.
  a. In one example, the following step in the sub-bitstream extraction process specified in clause C.6 of VVC:
    Remove from outBitstream all NAL units for which all of the following conditions are true:
      nal_unit_type is not equal to IDR_W_RADL, IDR_N_LP, or CRA_NUT.
      nuh_layer_id is equal to LayerIdInOls[targetOlsIdx][j] for a value of j in the range of 0 to NumLayersInOls[targetOlsIdx]−1 inclusive.
      TemporalId is greater than or equal to NumSubLayersInLayerInOLS[targetOlsIdx][j].
    is changed to be the following:
    Remove from outBitstream all VCL NAL units for which all of the following conditions are true:
      nal_unit_type is not equal to IDR_W_RADL, IDR_N_LP, or CRA_NUT.
      nuh_layer_id is equal to LayerIdInOls[targetOlsIdx][j] for a value of j in the range of 0 to NumLayersInOls[targetOlsIdx]−1 inclusive.
      TemporalId is greater than or equal to NumSubLayersInLayerInOLS[targetOlsIdx][j].

Regarding the Number of APSs
In the following discussion, "The maximum allowed number of filters" may refer to "the maximum allowed number of filters that can be signalled by one or multiple APSs for a sequence/picture/slice. "The maximum allowed number of APS NAL units" may refer to "the maximum allowed number of APS NAL units that can be signalled for a sequence/picture/slice. "The maximum allowed number of filter coefficients" may refer to "the maximum allowed number of filter coefficients that can be signalled by one or multiple APSs for a sequence/picture/slice.

24. Regarding the number of APS NAL units to solve the twelfth problem:
    a. The kinds of APS NAL units below may be one or more of ALF APS, LMCS APS, and SCALING APS.
    b. In one example, APS containing information related to different color components may be signalled separately.
        i. For example, an APS NAL unit may contain luma-related syntax elements (e.g., luma filters) only.
        ii. Additionally, an APS NAL unit may contain chroma (such as Cb and/or Cr)-related syntax elements (e.g., chroma filters) only.
            1) For example, an APS NAL unit may contain chroma ALF syntax elements only.
            2) For example, an APS NAL unit may contain CCALF syntax elements only.
            3) Alternatively, an APS NAL unit may contain CCALF Cb syntax elements only.
            4) Alternatively, an APS NAL unit may contain CCALF Cr syntax elements only.
        iii. For example, luma and chroma filters of ALF (and/or LMCS and/or Scaling list) may have different APS types (e.g., aps_params_type).
        iv. For example, one or multiple SEs are signalled in an APS to indicate which color component(s) is contained in the APS.
    c. In one example, the maximum allowed number of APS NAL units that can be signalled for a sequence/picture/slice may be dependent on a predefined value (such as a pre-defined memory size or a predefined number of filters).
    d. In one example, it is required that number of filters signalled in APSs for a sequence/picture/slice shall be no greater than a maximum allowed number of filters signalled in APSs.
    e. In one example, it is required that number of filter coefficients signalled in APSs for a sequence/picture/slice shall be no greater than a maximum allowed number of filter coefficients signalled in APSs.
        i. The maximum allowed number of filter coefficients signalled in APSs may be a predefined number.
        ii. The maximum allowed number of filter coefficients signalled in APSs may be different for different APS types.
        iii. The maximum allowed number of filter coefficients signalled in APSs may be signalled from the encoder to the decoder, such as in VPS/SPS/PPS/PH/SH/sequence header.
    f. In one example, it is required that number of filters signalled in APSs for a sequence/picture/slice shall be no greater than a maximum allowed number of filters signalled in APSs.
    g. In one example, the maximum allowed numbers of filters signalled in APSs for different color components may be different.
        i. In one example, the maximum allowed number of luma filters signalled in APSs and the maximum number of chroma filters signalled in APSs may be different.
        ii. For example, the maximum allowed number of luma filters signalled in APSs of a particular APS type (e.g., ALF/LMCS/SCALING) is equal to a first certain value.
        iii. Additionally, the maximum allowed number of chroma (such as Cb and/or Cr) filters signalled in APSs of a particular APS type (e.g., ALF/LMCS/SCALING) is equal to a second certain value.
        iv. For example, the maximum allowed number of luma filters signalled in APSs of all APS types (e.g., ALF/LMCS/SCALING) is equal to a first certain value.
        v. Additionally, the maximum allowed number of chroma (such as Cb and/or Cr) filters signalled in APSs of all APS types (e.g., ALF/LMCS/SCALING) is equal to a second certain value.
    h. In one example, the maximum allowed number of ALF luma filters, the maximum allowed number of ALF chroma filters and the maximum allowed number of CCALF filters may be different.
        i. For example, the maximum allowed number of ALF luma filters is equal $X1$ (e.g., $X1=25\times 8=200$).
        ii. For example, for an ALF APS unit, the maximum allowed number of ALF chroma filters is equal $X2$ (e.g., $X2=8\times 8=64$).
        iii. For example, for an ALF APS unit, the maximum allowed number of CCALF filters is equal $X3$ (e.g., $X3=4\times 8\times 2=64$).
            1) Alternatively, the maximum allowed number of CCALF Cb filters is $Y1$ (e.g., $Y1=4\times 8=32$).
            2) Additionally, the maximum allowed number of CCALF Cr filters is $Y2$ (e.g., $Y2=4\times 8=32$).
        iv. In one example, $X1$, $X2$, $X3$, $Y1$, $Y2$ are pre-defined values.
    i. In one example, each of the maximum allowed numbers of filters within an APS NAL unit is equal to $K\_i$, wherein K indicates a certain value, and i indicates the filter type (e.g., luma filter, chroma filter, CCALF filter, etc.).
        i. For example, $K\_i$ for ALF luma filters is equal to $25\times 8=200$.
        ii. For example, $K\_i$ for ALF chroma filters is equal to $8\times 8=64$.
        iii. For example, $K\_i$ for CCALF filters is equal to $4\times 8\times 2=64$.
            1) Alternatively, $K\_i$ for CCALF Cb filters is equal to $4\times 8=32$.
            2) Alternatively, $K\_i$ for CCALF Cr filters is equal to $4\times 8=32$.
    j. In one example, the maximum allowed numbers may be signalled from the encoder to the decoder, such as in the VPS/SPS/PPS/PH/SH/sequence header.
        i. For example, the "maximum allowed number" in this claim may refer to the maximum allowed number of APS NAL units, or the maximum allowed number of filters, or the maximum allowed number of filter coefficients.
        ii. For example, the maximum allowed numbers for a particular type of APS NAL unit (e.g., aps_params type equal to ALF APS) may be signalled.
            1) For example, the maximum allowed numbers may be signalled at SPS level.
            2) For example, the maximum allowed numbers may be signalled at PH/SH level.

iii. For example, the signalling of the maximum allowed numbers may be dependent on whether a coding tool (ALF/CCALF/LMCS/scaling list) is enabled or not.
1) In one example, when the ALF/CCALF is disabled, the maximum allowed numbers for ALF/CCALF APS may not be signalled.
a. Additionally, the number is inferred to be equal to a certain value (e.g., 0) when not present.
2) In one example, when the CCALF is disabled, the maximum allowed number for ALF APS having the APS ID (e.g., adaptation_parameter_set_id) equal to CCALF APS ID (e.g., ph_cc_alf_cb_aps_id, ph_cc_alf_cr_aps_id, slice_cc_alf_cb_aps_id, slice_cc_alf_cr_aps_id) may not be signalled.
a. Additionally, the number is inferred to be equal to a certain value (e.g., 0) when not present.
3) How to signal the maximum allowed number for a smaller video unit (e.g., picture, slice) may depend on the maximum allowed number for a higher level (e.g., SPS).
a. For example, the maximum allowed number of ALF luma APSs is dependent on the maximum allowed number of ALF APSs.
iv. For example, a variable derived from the maximum allowed numbers (denoted as N) (e.g., N−M or M−N, wherein M is a certain value smaller than N) may be signalled.
k. In one example, the maximum allowed numbers depend on chroma format.
i. For example, the maximum allowed number for luma/chroma may depend on whether the ChromaArrayType is equal to 0 (e.g., 4:0:0 and 4:0:0 with separate color plane coding) or not.
ii. For example, the maximum allowed number of ALF/SCALING/LMCS APSs depend on whether the ChromaArrayType is equal to 0 or not.
l. In one example, the maximum allowed numbers above may depend on whether a coding tool is enabled.
i. For example, the maximum allowed numbers above depend on whether the ALF is enabled, and/or whether CCALF is enabled at SPS/PPS/PH/SH level.
ii. For example, the maximum allowed number of ALF APSs depend on whether the ALF is enabled, and/or whether CCALF is enabled at SPS/PPS/PH/SH level.
iii. For example, the maximum allowed number of LMCS APSs depend on whether the LMCS is enabled, and/or whether chroma residual scaling (CRS) is enabled at SPS/PPS/PH/SH level.
iv. For example, the maximum allowed number of SCALING APSs depend on whether the explicit scaling list is enabled at SPS/PPS/PH/SH level.
m. In one example, how to code an APS ID may be dependent on a restricted number.
i. In one example, the APS ID may be ue(v) coded, in the range of 0 to K (e.g., 127, or 255), inclusive.
ii. Alternatively, the APS ID may be u(X) coded, such as X=7 or 8.
1) X may be signalled before APS ID is coded.
2) X may be derived before APS ID is coded.
3) X may be derived based on a maximum allowed number.
iii. Alternatively, the max number of APS ID is signalled.
1) For example, the max number of APS ID may be u(X) coded, such as X=7 or 8.
2) Additionally, the APS ID may be u(v) coded.
iv. For example, The APS ID mentioned above may be one or more of follows:
1) adaptation_parameter_set_id in the APS syntax structure.
2) ph_alf_aps_id_luma[i], ph_alf_aps_id_chroma, ph_cc_alf_cb_aps_id, ph_cc_alf_cr_aps_id in the PH syntax structure.
3) slice_alf_aps_id_luma[i], slice_alf_aps_id_chroma, slice_cc_alf_cb_aps_id, slice_cc_alf_cr_aps_id in the SH syntax structure.
4) ph_lmcs_aps_id in the PH syntax structure.
5) ph_scaling_list_aps_id in the PH syntax structure.
n. In one example, the constraints above may be represented by bitstream conformance, bitstream constraints, or explicitly signalling in the syntax table.
o. In one example, the limitations/restrictions/constraints above may depend on profile/level/general constraint flags, etc.
25. It is proposed that the signalling and/or the range and/or the inference of a syntax element specifying the number of points in QP table is dependent on other syntax elements.
a. It is proposed to set the maximum value of num_points_in_qp_table_minus1[i] to (max QP value—the starting luma and chroma QP used to describe the i-th chroma QP mapping table).
i. In one example, the maximum value is set to (63−(qp_table_start_minus26[i]+26)).
ii. In one example, the maximum value is set to (64−(qp_table_start_minus26[i]+26)).
26. It is proposed to disallow the maximum number of subblock merge candidate to be 0 (MaxNumSubblockMergeCand) when affine is enabled and SbTMVP is disabled.
a. In one example, the maximum number of subblock merge candidate is restricted to greater than 0 when affine is enabled and SbTMVP is disabled.
b. In one example, the range of sps_five_minus_max_num_subblock_merge_cand is from [0, 4] regardless the value of SPS SbTMVP enabling flag (e.g., sps_sbtmvp_enabled_flag).
c. A conformance bitstream shall satisfy that the value of MaxNumSubblockMergeCand shall be in the range of 1 to 5, inclusive, when affine is enabled.
i. Alternatively, furthermore, the value of MaxNumSubblockMergeCand shall be in the range of 0 to 1, inclusive, when affine is disabled.
d. Alternatively, furthermore, whether to signal merge_subblock_flag is dependent on whether affine is enabled, instead of checking the maximum number of subblock merge candidate.
27. It is proposed to add a first syntax element to indicate whether affine merge mode is allowed.
a. Alternatively, furthermore, the first syntax element may be conditionally signalled, e.g., according to SPS affine flag is enabled.
b. Alternatively, furthermore, indication of the maximum number of subblock merge candidate may be signalled when the first syntax element indicates affine merge mode is enabled.

28. To solve problem 13, the subpictures layout is signalled as follows:
   a. A flag, e.g., named sps_subpic_same_res_flag, is added to specify whether all subpictures referring to the SPS have the same width and height, respectively.
   b. When sps_subpic_same_res_flag is equal to 1, the common width and height for all subpictures are signalled, e.g., by the two new syntax elements sps_uniform_subpic_width_minus1 and sps_uniform_subpic_height_minus1, respectively, in units of CTUs.
      i. In one example, furthermore, the number of subpicture columns, denoted as numSubpicCols, is derived to be equal to (sps_pic_width_max_in_luma_samples/((sps_uniform_subpic_width_minus1+1)*CtbSizeY))), the number of subpicture row, denoted as numSubpicRows, is derived to be equal to (sps_pic height max in luma samples/((sps_uniform_subpic_height_minus1+1)*CtbSizeY))), and the number of subpictures, denoted as numSubpics, is derived to be equal to numSubpicCols*numSubpicRows.
      ii. In one example, furthermore, sps_num_subpics_minus1 is skipped, and the value is inferred to equal to numSubpics−1.
      iii. In one example, for each value of i in the range of 0 to sps_num_subpics_minus1, inclusive, the value of sps_subpic_ctu_top_left_x[i], sps_subpic_ctu_top_left_y[i], sps_subpic_width_minus1[i], and sps_subpic_height_minus1[i] are inferred to be equal to (sps_uniform_subpic_width_minus1+1)*(i % numSubpicCols), (sps_uniform_subpic_height_minus1+1)*(i/numSubpicCols), sps_uniform_subpic_width_minus1, and sps_uniform_subpic_height_minus1, respectively.
      iv. In one example, for each value of i in the range of 0 to sps_num_subpics_minus1, inclusive, when sps_independent_subpics_flag is equal to 0, sps_subpic_treated_aspic_flag[i] and sps_loop_filter_across_subpic_enabled_flag[i] are signalled.
   c. When sps_subpic_same_res_flag is equal to 0, the current subpictures layout signalling in JVET-R2001-vA/v10 applies.
   d. In one example, when spspic width max in luma samples is less than or equal to CtbSizeY, sps_uniform_subpic_width_minus1 is skipped and inferred to be equal to 0.
   e. In one example, when spspic height max in luma samples is less than or equal to CtbSizeY, sps_uniform_subpic_height_minus1 is skipped and inferred to be equal to 0.
   f. In one example, sps_uniform_subpic_width_minus1 and sps_uniform_subpic_height_minus1 are ue(v)-coded, and sps_subpic_ctu_top_left_x[i], sps_subpic_ctu_top_left_y[i], sps_subpic_width_minus1[i], and sps_subpic_height_minus1[i] are also ue(v)-coded.
   g. In one example, sps_uniform_subpic_width_minus1 and sps_uniform_subpic_height_minus1 are u(v)-coded, with the same length as sps_subpic_width_minus1[i] and sps_subpic_height_minus1[i], respectively, in JVET-R2001-vA/v10.
   h. In one example, the SPS syntax is changed as follows, where open and closed double braces indicate newly added text in between the double brace (e.g., {{a}} indicated that [[a]] is added) and where /\ indicates deleted text in between /\ (e.g., /*a*\ indicates that 'a' is deleted):

|  | Descriptor |
|---|---|
| seq_parameter_set_rbsp( ) { | |
| ... | |
| {{sps_subpic_same_res_flag | ue(v) |
| if( sps_subpic_same_res_flag ) { | |
|   if( sps_pic_width_max_in_luma_samples > CtbSizeY ) | |
|     sps_uniform_subpic_width_minus1 | u(v) |
|   if( sps_pic_height_max_in_luma_samples > CtbSizeY ) | |
|     sps_uniform_subpic_height_minus1 | u(v) |
| } else}} | |
|   sps_num_subpics_minus1 | ue(v) |
| if( sps_num_subpics_minus1 > 0 ) | |
|   sps_independent_subpics_flag | u(1) |
| for( i = 0; {{sps_subpic_same_res_flag &&}} sps_nmu_subpics_minus1 > 0 && | |
|   i <= sps_num_subpics_minus1; i++) { | |
|   if( i > 0 && sps_pic_width_max_in_luma_samples > CtbSizeY ) | |
|     sps_subpic_ctu_top_left_x[ i ] | u(v) |
|   if( i > 0 && sps_pic_height_max_in_luma_samples > CtbSizeY ) { | |
|     sps_subpic_ctu_top_left_y[ i ] | u(v) |
|   if( i < sps num subpics minus1 && | |
|     sps_pic_width_max_in_luma_samples > CtbSizeY ) | |
|     sps_subpic_width_minus1[ i ] | u(v) |
|   if( i < sps_num_subpics_minus1 && | |
|     sps_pic_height_max_in_luma_samples > CtbSizeY ) | |
|     sps_subpic_height_minus1[ i ] | u(v) |
| {{} | |
| for( i = 0; sps_num_subpics_minus1 > 0 && i <= sps_num_subpics_minus1; i++)}} | |
|   if( ! sps_independent_subpics_flag) { | |

|  | Descriptor |
|---|---|
| sps_subpic_treated_as_pic_flag[ i ] | u(1) |
| sps_loop_filter_across_subpic_enabled_flag[ i ] | u(1) |
| } |  |
| [[ }]]/* }[[]]]*\ |  |
| ... |  | i. In one example, the SPS syntax is changed as follows:

|  | Descriptor |
|---|---|
| seq_parameter_set_rbsp( ) { |  |
| ... |  |
| {{sps_subpic_same_res_flag | ue(v) |
| if( sps_subpic_same_res_flag ) { |  |
|     sps_uniform_subpic_width_minus1 | u(v) |
|     sps_uniform_subpic_height_minus1 | u(v) |
| } else}} |  |
| sps_num_subpics_minus1 | ue(v) |
| if( sps_num_subpics_minus1 > 0 ) |  |
|     sps_independent_subpics_flag | u(1) |
| for( i = 0; {{sps_subpic_same_res_flag &&}} sps_num_subpics_minus1 > 0 && |  |
|     i <= sps_num_subpics_minus1; i++ ) { |  |
|   if( i > 0 [[[]]/* && sps_pic_width_max_in_luma_samples > CtbSizeY[[]]]*\ ) |  |
|     sps_subpic_ctu_top_left_x[ i ] | ue(v) |
|   if( i > 0 [[[]]/*&& sps_pic_height_max_in_luma_samples > CtbSizeY[[]]]*\ ) { |  |
|     sps_subpic_ctu_top_left_y[ i ] | ue(v) |
|   if( i < sps_num_subpics_minus1 [[[[]]/*&& sps_pic_width_max_in_luma_samples > CtbSizeY [[]]]*\) |  |
|     sps_subpic_width_minus1[ i ] | ue(v) |
|   if( i < sps_num_subpics_minus1 [[[[]]/* && sps_pic_height_max_in_luma_samples > CtbSizeY [[]]]*\) |  |
|     sps_subpic_height_minus1[ i ] | ue(v) |
| {{} |  |
| for( i = 0; sps_num_subpics_minus1 > 0 && i <= sps_num_subpics_minus1; i++)}} |  |
|   if( ! sps_independent_subpics_flag) { |  |
|     sps_subpic_treated_as_pic_flag[ i ] | u(1) |
|     sps_loop_filter_across_subpic_enabled_flag[ i ] | u(1) |
| } |  |
| [[ }]]/* }[[]]]*\ |  |
| ... |  |

29. The following changes to the latest VVC spec text in NET-R2001-vA/v10 are proposed:

SPS Semantics:

. . .

sps_subpic_treated_as_pic_flag[i] equal to 1 specifies that the i-th subpicture of each coded picture in the CLVS is treated as a picture in the decoding process excluding in-loop filtering operations. sps_subpic_treated_aspic_flag [i] equal to 0 specifies that the i-th subpicture of each coded picture in the CLVS is not treated as a picture in the decoding process excluding in-loop filtering operations. When not present, the value of sps_subpic_treated_aspic_flag[i] is inferred to be equal to 1.

/*When sps_num_subpics_minus1 is greater than 0 and sps_subpic_treated_aspic_flag[i] is equal to 1, for each CLVS of a current layer referring to the SPS, let targetAuSet be all the AUs starting from the AU containing the first picture of the CLVS in decoding order, to the AU containing the last picture of the CLVS in decoding order, inclusive, it is a requirement of bitstream conformance that all of the following conditions are true for the targetLayerSet that consists of the current layer and all the layers that have the current layer as a reference layer:*\

/*— For each AU in targetAuSet, all pictures of the layers in targetLayerSet shall have the same value of pps_pic_width_in_luma_samples and the same value of pps_pic_height_in_luma_samples.*\

/*— All the SPSs referred to by the layers in targetLayerSet shall have the same value of sps_num_subpics_minus1 and shall have the same values of sps_subpic_ctu_top_left_x[j], sps_subpic_ctu_top_left_y[j], sps_subpic_width_minus1[j], sps_subpic_height_minus1[j], and sps_subpic_treated_aspic_flag[j], respectively, for each value of j in the range of 0 to sps_num_subpics_minus1, inclusive.*\

/*— For each AU in targetAuSet, all pictures of the layers in targetLayerSet shall have the same value of SubpicIdVal[j] for each value of j in the range of 0 to sps_num_subpics_minus1, inclusive.*\

Decoding Process for Reference Picture Lists Construction

. . .

/*When vps_independent_layer_flag[GeneralLayerIdx [nuh_layer_id]] is equal to 0 and sps_num_subpics_minus1 is greater than 0, either of the following two conditions (but not both) shall be true:}}
/*The picture referred to by each active entry in RefPicList[0] or RefPicList[1] has the same subpicture layout as the current picture (i.e., the SPSs referred to by that picture and the current picture have the same value of sps_num_subpics_minus1 and the same values of sps_subpic_ctu_top_left_x[j], sps_subpic_ctu_top_left_y[j], sps_subpic_width_minus1[j], and sps_subpic_height_minus1[j], respectively, for each value of j in the range of 0 to sps_num_subpics_minus1, inclusive).*\
{{The picture referred to by each active entry in RefPicList[0 ]or RefPicList[1] and the current picture have the same value for each of the following:
pps_pic_width_in_luma_samples
pps_pic_height_in_luma_samples
sps_num_subpics_minus1
sps_subpic_ctu_top_left_X[i  ], sps_subpic_ctu_top_left_y[i ],
sps_subpic_width_minus1[i  ], sps_subpic_height_minus1[i ],
sps_subpic_treated_as_pic_flag[i ], respectively, for each value of i in the
range of 0 to sps_num_subpics_minus1, inclusive}}
The picture referred to by each active entry in RefPicList[0] or RefPicList[1] is an ILRP for which the value of sps_num_subpics_minus1 is equal to 0.
30. The following changes to the previous item are proposed:
PPS semantics:
. . .
pps_subpic_id[i] specifies the subpicture ID of the i-th subpicture. The length of the pps_subpic_id[i] syntax element is pps_subpic_id_len_minus1+1 bits.
The variable SubpicIdVal[i], for each value of i in the range of 0 to sps_num_subpics_minus1, inclusive, is derived as follows:
for(i=0; i<=sps_num_subpics_minus1; i++)
    if(sps_subpic_id_mapping_explicitly_signalled_flag)
        SubpicIdVal[i]=pps_subpic_id_mapping_present_flag ? pps_subpic_id[i]:
sps_subpic_id[i]
    else
        SubpicIdVal[i]=i
It is a requirement of bitstream conformance that both of the following constraints apply:
For any two different values of i and j in the range of 0 to sps_num_subpics_minus1, inclusive, SubpicIdVal[i] shall not be equal to SubpicIdVal[j].

/*For each value of i in the range of 0 to sps_num_subpics_minus1, inclusive, when the value of SubpicIdVal[i] of a current picture, with nuh_layer_id equal to a particular value layerId, is not equal to the value of SubpicIdVal[i] of a reference picture that has nuh_layer_id equal to layerId, the active entries of the RPLs of the coded slices in the i-th subpicture of the current picture shall not include that reference picture.*\
. . .
Decoding Process for Reference Picture Lists Construction
. . .
When sps_num_subpics_minus1 is greater than 0 and the current subpicture with subpicture index subPicIdx has sps_subpic_treated_as_pic_flag[subPicIdx] equal to 1, either of the following two conditions (but not both) shall be true:
The picture referred to by each active entry in RefPicList[0] or RefPicList[1] and the current picture have the same value for each of the following:
pps_pic_width_in_luma_samples
pps_pic_height_in_luma_samples
sps_num_subpics_minus1
sps_subpic_ctu_top_left_x[i], sps_subpic_top_left_y[i], sps_subpic_width_minus1[i], sps_subpic_height_minus1[i], sps_subpic_treated_as_pic_flag[i], {{SubpicIdVal[i],}} respectively, for each value of i in the range of 0 to sps_num_subpics_minus1, inclusive
The picture referred to by each active entry in RefPicList[0] or RefPicList[1] is an ILRP for which the value of sps_num_subpics_minus1 is equal to 0.
31. When pps_pic_width_in_luma_samples is less than or equal to CtbSizeY, pps_tile_column_width_minus1[i] is required to be equal to PicWidthInCtbsY−1.
32. When pps_pic_height_in_luma_samples is less than or equal to CtbSizeY, pps_tile_row_height_minus1[i] is required to be equal to PicHeight−1.

6. Embodiments

6.1. Embodiment 1: Chroma QP Tables According to Slice Type

The changes, marked in open and closed double braces (e.g., {{a}} indicates that 'a' is added), are based on JVET-Q2001-vC. Also, /\ indicates deleted text in between /\ (e.g., /*a*\ indicates that 'a' is deleted)

7.3.2.3 Sequence Parameter Set RBSP Syntax

|  | Descriptor |
|---|---|
| seq_parameter_set_rbsp( ) { |  |
| ...... |  |
| {{sps_non_intra_present_flag | u(1)}}) |
| if( ChromaArrayType != 0 ) { |  |
| sps_joint_cbcr_enabled_flag | u(1) |
| {{intra }}same_qp_table_for_chroma | u(1) |
| numQpTables{{Intra}} = {{intra_}}same_qp_table_for_chroma ? 1 : ( sps_joint_cbcr_enabled_flag ? 3 : 2 ) |  |
| for( i = 0; i < numQpTables{{Intra}}; i++ ) { |  |
| {{intra_}}qp_table_start_minus26[ i ] | se(v) |
| {{intra_}}num_points_in_qp_table_minus1[ i ] | ue(v) |
| for( j = 0; j <= intra_num_points_in_qp_table_minus1[ i ];j++ ){ |  |
| {{intra_}}delta_qp_in_val_minus1[ i ][ j ] | ue(v) |
| {{intra_}}delta_qp_diff_val[ i ][ j ] | ue(v) |
| } |  |

|  | Descriptor |
|---|---|
| ```
    }
    if( sps_non_intra_present_flag ) {
        inter_same_qp_table_for_chroma
        numQpTablesInter = same_qp_table_for_chroma_inter ? 1 :
            ( sps_joint_cbcr_enabled_flag ? 3 : 2 )
        for(i = 0; i < numQpTablesInter; i++ ) {
            inter_qp_table_start_minus26[ i ]
            inter_num_points_in_qp_table_minus1[ i ]
            for( j = 0; j <= inter_num_points_in_qp_table_minus1[ i ]; j++) {
                inter_delta_qp_in_val_minus1[ i ][ j ]
                inter_delta_qp_diff_val[ i ][ j ]
            }
        }
    }
}
``` | <br><br>u(1)<br><br><br><br>se(v)<br>ue(v)<br><br>ue(v)<br>ue(v) |

7.3.2.3 Sequence Parameter Set RBSP Syntax

. . .

/*same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1. same_qp_table_for_chroma equal to 0 specifies that chroma QP mapping tables, two for Cb and Cr, and one additional for joint Cb-Cr when sps_joint_cbcr_enabled_flag is equal to 1, are signalled in the SPS. When same_qp_table_for_chroma is not present in the bitstream, the value of same_qp_table_for_chroma is inferred to be equal to 1.*\
/*qp_table_start_minus26[i] plus 26 specifies the starting luma and chroma QP used to describe the i-th chroma QP mapping table. The value of qp_table_start_minus26[i] shall be in the range of −26−QpBdOffset to 36 inclusive. When qp_table_start_minus26[i] is not present in the bitstream, the value of qp_table_start_minus26[i] is inferred to be equal to 0.*\

/*num_points_in_qp_table_minus1[i] plus 1 specifies the number of points used to describe the i-th chroma QP mapping table. The value of num_points_in_qp_table_minus1[i] shall be in the range of 0 to 63+QpBdOffset, inclusive. When num_points_in_qp_table_minus1[0] is not present in the bitstream, the value of num_points_in_qp_table_minus1[0] is inferred to be equal to 0.*\

/*delta_qp_in_val_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1[0][j] is inferred to be equal to 0.*\

/*delta_qp_diff_val[i][j] specifies a delta value used to derive the output coordinate of the j-th pivot point of the i-th chroma QP mapping table.*\

/*The i-th chroma QP mapping table ChromaQpTable[i] for i=0 . . . numQpTables−1 is derived as follows:*\

*sps_non_intra_present_flag equal to 0 specifies that all slices are of intra slice in the sequence.*
*sps_non_intra_present_flag equal to 1 specific that there may be non intra slices present in the sequence.*
*intra_same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1 for intra slices.*
*intra_same_qp_table_for_chroma equal to 0 specifies that chroma QP mapping tables, two for Cb and Cr, and one additional for joint Cb-Cr when sps_joint_cbcr_enabled_flag is equal to 1, When same_qp_table_for_ for intra slices are signalled in the SPS chroma is not present in the bitstream, chroma is inferred to be equal to 1. the value of intra_same_qp_table_for_*
*intra_qp_table_start_minus26[ i ] plus 26 specifies the starting luma and chroma QP used to table for intra slices. describe the i-th chroma QP mapping The value of*
*intra_qp_table_start_minus26[ i ] shall be in the range of 26 −QpBdOffset to 36 inclusive. not present in the bitstream, When intra_qp_table_start_minus26[ i ] is the value of*
*intra_qp_table_start_minus26[ ] is inferred to be equal to 0.*
*intra_num_points_in_qp_table_minus1[ i ] plus 1 specifies the number of points used to mapping table for intra slices. describe the i-th chroma QP The value of*
*intra_num_points_in_qp_table_minus1[ i ] shall be in the range of 0 to 63 + QpBdOffset, inclusive. When intra_num_points_in_qp_table_minus1[ 0 ] is not present in the bitstream, the value of intra_num_points_in_qp_table_minus1[ 0 ] is inferred to be equal to 0.*
*intra_delta_qp_in_val_minus1[ i ][ j ] specifies a delta value used to derive the input coordinate of the j-th pivot point of the i-th chroma QP mapping table for intra slices. When intra_delta_qp_in_val_minus1[ 0 ][ j ] is not present in the bitstream, the value of intra_delta_qp_in_val_minus1[ 0 ][ j ] is inferred to be equal to 0.*
*intra_delta_qp_diff_val[ i ][ j ] specifies a delta value used to derive the output coordinate of the j-th pivot point of the i-th chroma QP mapping table for intra slices.*
*inter_same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1 for B or P slices.*
*inter_same_qp_table_for_chroma equal to 0 specifies that chroma QP mapping tables, two for Cb and Cr, and one additional for joint Cb-Cr when sps_joint_cbcr_enabled_flag is equal to 1, for B or P slices are signalled in the SPS. When same_qp_table_for_chroma is not present in the bitstream, the value of inter_same_qp_table_for_chroma is inferred to be equal to 1.*

-continued

*inter_qp_table_start_minus26[ i ] plus 26 specifies the starting luma and chroma QP used to describe the i-th chroma QP mapping table for B or P slices. The value of intra_qp_talbe_start_minus26[ i ] shall be in the range of −26 − QpBdOffset to 36 inclusive. When inter_qp_table_start_minus26[ i ] is not present in the bitstream, the value of inter_qp_table_start_minus26[ i ] is inferred to be equal to 0.*
*inter_num_points_in_qp_table_minus1[ i ] plus 1 specifies the number of points used to describe the i-th chroma QP mapping table for B or P slices. The value of inter_num_points_in_qp_table_minus1[ i ] shall be in the range of 0 to 63 + QpBdOffset, inclusive. When inter_num_points_in_qp_table_minus1[ 0 ] is not present in the bitstream, the value of inter_num_points_in_qp_table_minus1[ 0 ] is inferred to be equal to 0.*
*inter_delta_qp_in_val_minus1[ i ][ j ] specifies a delta value used to derive the input coordinate of the j-th pivot point of the i-th chromaQP mapping table for B or P slices. When inter_delta_qp_in_val_minus1[ 0 ][ j ] is not present in the bitstream, the value of inter_delta_qp_in_val_minus1[ 0 ][ j ] is inferred to be equal to 0.*
*inter_delta_qp_diff_val[ i ][ j ] specifies a delta value used to derive the output coordinate of the j-th pivot point of the i-th chroma QPmapping table for B or P slices.*
*The i-th chroma QP mapping table IntraChromaQpTable[ i ] for i = 0..numQpTablesIntra − 1 and the i-th chroma QP mapping table InterChromaQPTable[ i ] for i = 0..numQpTablesInter − 1 are derived as follows:*
*When inta_same_qp_table_for_chroma is equal to 1, IntraChromaQpTable[ 1 ][ k ] and IntraChromaQpTable[ 2 ][ k ] are set equal to IntraChromaQpTable[ 0 ][ k ] for k in the range of −QpBdOffset to 63. inclusive.*
*When inter_same_qp_table_for_chroma is equal to 1, InterChromaQpTable[ 1 ][ k ] and InterChromaQpTable[ 2 ][ k ] are set equal to InterChromaQpTable[ 0 ][ k ] for k in the range of −QpBdOffset to 63. inclusive.*
*Let ChromaQpTable[ i ] denote the IntraChromaQpTable[ i ] for I-slices for i = 0..numQpTablesIntra − 1 and InterChromaQpTable[ i ] for B- or P-slices for i = 0..numQpTablesIntra − 1, the following applies*

```
  qpInVal[ i ][ 0 ] = qp_table_start_minus26[ i ] + 26
  qpOutVal[ i ][ 0 ] = qpInVal[ i ][ 0 ]
  for( j = 0; j <= num_points_in_qp_table_minus1[ i ]; j++ ) {
    qpInVal[ i ][ j + 1 ] = qpInVal[ i ][ j ] + delta_qp_in_val_minus1[ i ][ j ] + 1
    qpOutVal[ i ][ j + 1 ] = qpOutVal[ i ][ j ] +
   ( delta_qp_in_val_minus1[ i ][ j ] ^ delta_qp_diff_val[ i ][ j ] )
  }
  ChromaQpTable[ i ][ qpInVal[ i ][ 0 ] ] = qpOutVal[ i ][ 0 ]
  for( k = qpInVal[ i ][ 0 ] − 1; k >= −QpBdOffset; k − − )
    ChromaQpTable[ i ][ k ] = Clip3( −QpBdOffset, 63, ChromaQpTable[ i ][ k + 1 ] − 1 )
    (62)
  for( j = 0; j <= num_points_in_qp_table_minus1[ i ]; j++ ) {
    sh = ( delta_qp_in_val_minus1[ i ][j ] + 1 ) >> 1
    for( k = qpInVal[ i ][ j ] + 1, m = 1; k <= qpInval[ i ][ j + 1 ]; k++, m++ )
      ChromaQpTable[ i ][ k ] = ChromaQpTable[ i ][ qpInVal[ i ][ j ] ] +
        ( ( qpOutVal[ i ] [j + 1] − qpOutVal[ i ][j ] ) * m + sh ) /
    ( delta_qp_in_val_minus1[ i ][j] + 1 )
  }
  for( k = qpInVal[ i ][ num_points_in_qp_table_minus1[ i ] + 1 ] + 1; k <= 63; k++ )
```

Chroma$Qp$Table[$i$][$k$]=Clip3(−$QpBd$Offset,63,Chroma$Qp$Table[$i$][$k$−1]+1)

When same_qp_table_for_chroma is equal to 1, ChromaQpTable[1][k] and ChromaQpTable[2][k] are set equal to ChromaQpTable[0][k] for k in the range of −QpBdOffset to 63, inclusive.

It is a requirement of bitstream conformance that the values of qpInVal[i][j] and qpOutVal[i][j] shall be in the range of −QpBdOffset to 63, inclusive for i in the range of 0 to numQpTables−1 inclusive, and j in the range of 0 to num_points_in_qp_table_minus1[i]+1, inclusive.

. . .

8.7.1 Derivation Process for Quantization Parameters

. . .

{{When the current slice is an I slice, ChromaQpTable[i] is set equal to ChromaQpTableSet0[i] for i=0..2. When the current slices is a B or P slice, ChromaQpTable[i] is set equal to ChromaQpTableSet1[i ]for i=0..2 when sps_one_set_of_chroma_qp_tables_flag is equal to 0, otherwise (when sps_one_set_of_chroma_qp_tables_flag is equal to 1), ChromaQpTable[i] is set equal to ChromaQpTableSet0[i] for i=0..2.}}

When ChromaArrayType is not equal to 0 and treeType is equal to SINGLE_TREE or DUAL_TREE_CHROMA, the following applies:

When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).

The variables $qP_{Cb}$, $qP_{Cr}$ and $qP_{CbCr}$ are derived as follows:

$$qP_{Chroma} = \text{Clip3}(-QpBd\text{Offset}, 63, Qp_Y) \quad (1143)$$

$$qP_{Cb} = \text{Chroma}Qp\text{Table}[0][qP_{Chroma}] \quad (1144)$$

$$qP_{Cr} = \text{Chroma}Qp\text{Table}[1][qP_{Chroma}] \quad (1145)$$

$$qP_{CbCr} = \text{Chroma}Qp\text{Table}[2][qP_{Chroma}] \quad (1146)$$

. . .

6.2. Embodiment 2: Number of Pivot Points and Clipping of Mapped Chroma QP

The changes, marked in open and closed double braces (e.g., {{a}} indicates that 'a' is added), are based on JVET- Q2001-vC. Also, /\ indicates deleted text in between /\ (e.g., /*a*\ indicates that 'a' is deleted).

7.3.2.3 Sequence Parameter Set RBSP Syntax

| | Descriptor |
|---|---|
| seq_parameter_set_rbsp( ) { | |
| ...... | |
|   if( ChromaArrayType != 0 ) { | |
|     sps_joint_cbcr_enabled_flag | u(1) |
|     same_qp_table_for_chroma | u(1) |
|     numQpTables = same_qp_table_for_chroma ? 1 : ( sps_joint_cbcr_enabled_flag ? 3 : 2 ) | |
|     for( i = 0; i < numQpTables; i++ ) { | |
|       [/*qp_table_start_minus26[ i ]]*\ | [/*se(v)]*\ |
|       num_points_in_qp_table[/*_minus1]*\[ i ] | ue(v) |
|       if( num_points_in_qp_table ) | |
|         {{qp_table_start_minus26[ i ] | se(v)}} |
|       for( j = 0; j <[/*=]*\ num_points_in_qp_table[/*_minus1]*\[ i ]; j++ ) { | |
|         delta_qp_in_val_minus1[ i ][ j ] | ue(v) |
|         delta_qp_diff_val[ i ][ j ] | ue(v) |
|       } | |
|     } | |
|   } | |

-continued

| | Descriptor |
|---|---|
| } | |
| ...... | | num_points_in_qp_table/*_minus*\[i] /*plus 1*\ specifies the number of points used to describe the i-th chroma QP mapping table. The value of num_points_in_qp_table/*_minus1*\[i] shall be in the range of 0 to 63+QpBdOffset, inclusive. /*When num_points_in_qp_table_minus1[0] is not present in the bitstream, the value of num_points_in_qp_table_minus1[0] is inferred to be equal to 0.*\ delta_qp_in_val_minus1[i][j] specifies a delta value used to derive the input coordinate of the j-th pivot point of the i-th chroma QP mapping table. When delta_qp_in_val_minus1 [0][j] is not present in the bitstream, the value of delta_qp_in_val_minus1[0][j] is inferred to be equal to 0.

delta_qp_diff_val[i][j] specifies a delta value used to derive the output coordinate of the j-th pivot point of the i-th chroma QP mapping table.

The i-th chroma QP mapping table ChromaQpTable[i] for i=0 . . . numQpTables−1 is derived as follows:

When same_qp_table_for_chroma is equal to 1, ChromaQpTable[ 1 ][ k ] and ChromaQpTable[ 2 ][ k ] are set equal to ChromaQpTable[ 0 ][ k ] for k in the range of −QpBdOffset to 63, inclusive.
  [[qpInVal[ i ][ 0 ] = qp_table_start_minus26[ i ] + 26
  qpOutVal[ i ][ 0 ] = qpInVal[ i ][ 0 ]
  for( j = 0; j <= num_points_in_qp_table_minus1[ i ]; j++ ) {
    qpInVal[ i ][ j + 1 ] = qpInVal[ i ][ j ] + delta_qp_in_val_minus1[ i ][ j ] + 1
    qpOutVal[ i ][ j + 1 ] = qpOutVal[ i ][ j ] +
  ( delta_qp_in_val_minus1[ i ][ j ] ^ delta_qp_diff_val[ i ][ j ] )
  }
  ChromaQpTable[ i ][ qpInVal[ i ][ 0 ] ] = qpOutVal[ i ][ 0 ]
  for( k = qpInVal[ i ][ 0 ] − 1 63; k >= −QpBdOffset; k − − )
    ChromaQpTable[ i ][ k ] = Clip3( −QpBdOffset, 63, ChromaQpTable[ i ][ k + 1 ] − 1 )
  for( j = 0; j <= num_points_in_qp_table_minus1[ i ]; j++ ) {
    sh = ( delta_qp_in_val_minus1[ i ][j ] + 1 ) >> 1
    for( k = qpInVal[ i ][ j ] + 1, m = 1; k <= qpInval[ i ][ j + 1 ]; k++, m++ )
      ChromaQpTable[ i ][ k ] = ChromaQpTable[ i ][ qpInVal[ i ][ j ] ] +
        ( ( qpOutVal[ i ][j + 1] − qpOutVal[ i ][j ] ) * m + sh ) /
  ( delta_qp_in_val_minus1[ i ][j] + 1 )
  }
  for( k = qpInVal[ i ][ num_points_in_qp_table_minus1[ i ] + 1 ] + 1; k <= 63; k++ )
    ChromaQpTable[ i ][ k ] = Clip3( −QpBdOffset, 63, ChromaQpTable[ i ][ k − 1 ] + 1)]]
  *for( k = 63; k >= −QpBdOffset; k − − )*
    *ChromaQpTable[ i ][ k ] = Clip3( −QpBdOffset, 63, ChromaQpTable[ i ][ k + 1 ] − 1 )*
  *if( num_points_in_qp_table[ i ] > 0 ) {*
    *qpInVal[ i ][ 0 ] = qp_table_start_minus26[ i ] + 26*
    *qpOutVal[ i ][ 0 ] = qpInVal[ i ][ 0 ]*
  *}*
  *for( j = 0; j < num_points_in_qp_table[ i ]; j++ ) {*
    *qpInVal[ i ][ j + 1 ] = qpInVal[ i ][ j ]* +$_{delta\_qp\_in\_val\_minus1[ i ][ j ] + 1}$
    *qpOutVal[ i ][ j + 1 ] = qpOutVal[ i ][ j ] +*
  *( delta_qp_in_val_minus1[ i ][ j ] ^ delta_qp_diff_val[ i ][ j ] )sh =*
  *( delta_qp_in_val_minus1[ i ][ j ] + 1 ) >> 1*
    *for( k = qpInVal[ i ][ j ] + 1, m = 1;*$_{k\ <=\ qpInval[\ i\ ][\ j\ +\ 1\ ];\ k++,\ m++}$ *)*
      *ChromaQpTable[ i ][ k ] = Clip3( −QpBdOffset, 63,*
  *ChromaQpTable[ i ][ qpInVal[ i ][ j ] ] +*
    *( ( qpOutVal[ i ][ j + 1] − qpOutVal[ i ][ j ] ) * m + sh ) /*
  *( delta_qp_in_val_minus1[ i ][ j ] + 1 ))*
  *}*
  *if( num_points_in_qp_table[ i ] > 0 )*
    *for( k = qpInVal[ i ][ num_points_in*$_{qp\_table[\ i\ ]}$ *] + 1; k <= 63; k++ )*
      *ChromaQpTable[ i ][ k ] = Clip3*
*( −QpBdOffset, 63, ChromaQpTable[ i ][ k − 1 ] +*
*1 )*

It is a requirement of bitstream conformance that the values of qpInVal[i][j] /*and qpOutVal[i][j*\] shall be in the range of −QpBdOffset to 63, inclusive for i in the range of 0 to numQpTables−1 inclusive, and j in the range of 0 to num_points_in_qp_table_minus1[i]+1, inclusive.

6.3. Embodiment 3

The changes, marked in open and closed double braces (e.g., {{a}} indicates that 'a' is added), are based on JVET-Q2001-vC. Also, /\ indicates deleted text in between /\ (e.g., /*a*\ indicates that 'a' is deleted).
The i-th chroma QP mapping table ChromaQpTable[i] for i=0 . . . numQpTables−1 is derived as follows:

```
qpInVal[ i ][ 0 ] = qp_table_start_minus26[ i ] + 26
qpOutVal[ i ][ 0 ] = qpInVal[ i ][ 0 ]
for( j = 0; j <= num_points_in_qp_table_minus1[ i ]; j++ ) {
    qpInVal[ i ][ j + 1 ] = qpInVal[ i ][ j ] + delta_qp_in_val_minus1[ i ][ j ] + 1
    qpOutVal[ i ][ j + 1 ] = qpOutVal[ i ][ j ] + (( delta_qp_in_val_minus4[ i ][ j ] + 1)
        ^ delta_qp_diff_val[ i ][ j ] )
}
ChromaQpTable[ i ][ qpInVal[ i ][ 0 ] ] = qpOutVal[ i ][ 0 ]
for( k = qpInVal[ i ][ 0 ] − 1; k >= −QpBdOffset; k − − )
    ChromaQpTable[ i ][ k ] = Clip3( −QpBdOffset, 63, ChromaQpTable[ i ][ k + 1 ] − 1 )
for( j = 0; j <= num_points_in_qp_table_minus1[ i ]; j++ ) {
    sh = ( delta_qp_in_val_minus1[ i ][j] + 1 ) >> 1
    for( k = qpInVal[ i ][ j ] + 1, m = 1; k <= qpInval[ i ][ j + 1 ]; k++, m++ )
        ChromaQpTable[ i ][ k ] = ChromaQpTable[ i ][ qpInVal[ i ][ j ] ] +
            ( ( qpOutVal[ i ][j + 1] − qpOutVal[ i ][j] ) * m + sh ) /
( delta_qp_in_val_minus1[ i ][j] + 1 )
}
for( k = qpInVal[ i ][ num_points_in_qp_table_minus1[ i ] + 1 ] + 1; k <= 63; k++ )
```

ChromaQpTable[i][k]=Clip3(−QpBdOffset,63,ChromaQpTable[i][k−1]+1)

When same_qp_table_for_chroma is equal to 1, ChromaQpTable[1][k] and ChromaQpTable[2][k] are set equal to ChromaQpTable[0][k] for k in the range of −QpBdOffset to 63, inclusive.

It is a requirement of bitstream conformance that the values of qpInVal[i][j] and qpOutVal[i][j] shall be in the range of −QpBdOffset to 63, inclusive for i in the range of 0 to numQpTables−1 inclusive, and j in the range of 0 to num_points_in_qp_table_minus1[i]+1, inclusive.

6.4. Embodiment 4

The newly added text is marked in open and closed double braces (e.g., {{a}} indicates that 'a' is added), /\ indicates deleted text in between /\ (e.g., /*a*\ indicates that 'a' is deleted). It is based on JVET-Q2001-vE.

7.3.2.3 Sequence Parameter Set RBSP Syntax

| | Descriptor |
|---|---|
| seq_parameter_set_rbsp( ) { | |
| ... | |
| if( ChromaArrayType != 0 ) { | |
| {{sps_one_set_of_chroma_qp_tables_flag | u(1)}} |
| sps_joint_cbcr_enabled_flag | u(1) |
| same_qp_table_for_chroma{{ set0}} | u(1) |
| numQpTablesSet{{Set0}} = same_qp_table_for_chroma{{ set0}} ? 1 : ( sps_joint_cbcr_enabled_flag ? 3 : 2 ) | |
| for( i = 0; i < numQpTables; i++ ) { | |
| [/*qp_table_start_minus26[ i ]]*\ | [/*se(v)]*\ |
| num_points_in_qp_table[/*_minus1]*\{{ set0}}[ i ] | ue(v) |
| {{if( num_points_in_qp_table_set0[ i ] ) | |
| qp_table_set0[ i ] | ue(v)}} |
| for( j = 0; j <[/*=]*\ | |
| num_points_in_qp_table[[_minus1]]_set0[ i ]; j++ ) { | |
| delta_qp_in_val_minus1{{ set0}}[ i ][ j ] | ue(v) |
| delta_qp_diff_val{{ set0}}[ i ][ j ] | ue(v) |
| } | |
| } | |
| {{if( !sps_one_set_of_chroma_qp_tables_flag ) { | |
| same_qp_table_for_chroma_set1 | u(1) |
| numQpTablesSet1 = same_qp_table_for_chroma_set1 ? 1 : ( sps_joint_cbr_enabled_flag ? 3 : 2 ) | |
| for( i = 0; i < numQpTablesSet1; i++ ) { | |

|  | Descriptor |
|---|---|
| num_points_in_qp_table_set1[ i ] | ue(v) |
| if( num_points_in_qp_table_set1[ i ] ) | |
| qp_table_start_set1[ i ] | ue(v) |
| for( j = 0; j < num_points_in_qp_table_set1[ i ]; j++ ) { | |
| delta_qp_in_val_minus1_set1[ i ][ j ] | ue(v) |
| delta_qp_diff_val_et1[ i ][ j ] | ue(v) |
| } | |
| } | |
| }}} | |
| } | |
| ... | |

7.4.3.3 Sequence Parameter Set RBSP Semantics

. . .

{{sps_one_set_of_chroma_qp_tables_flag equal to 0 specifies that there are two sets of chroma QP mapping tables. sps_one_set_of_chroma_qp_tables_flag equal to 1 specifies that there are just one set of chroma QP mapping tables.}} same_qp_table_for_chroma_{{_set0}} equal to 1 specifies that only one chroma QP mapping table is signalled and this table applies to Cb and Cr residuals and additionally to joint Cb-Cr residuals when sps_joint_cbcr_enabled_flag is equal to 1 {{for the $1^{st}$ set of chroma QP mapping tables}}. same_qp_table_for_chroma_{_set0}} equal to 0 specifies that chroma QP mapping tables, two for Cb and Cr, and one additional for joint Cb-Cr when sps_joint_cbcr_enabled_flag is equal to 1, {{for the $1^{st}$ set of chroma QP mapping tables}}, are signalled in the SPS. When same_qp_table_for_chroma_{{_set0}} is not present in the bitstream, the value of same_qp_table_for_chroma_{{_set0}} is inferred to be equal to 1.
num_points_in_qp_table_minus1{{_set0}}[i] plus 1 specifies the number of points used to describe the i-th chroma QP mapping table {{for the $1^{st}$ set of chroma QP mapping tables}}. The value of num_points_in_qp_table_minus1_{{_set0}}[i] shall be in the range of 0 to 63+QpBdOffset, inclusive. When num_points_in_qp_table_minus1_{{_set0}}[0] is not present in the bitstream, the value of num_points_in_qp_table_minus1_{{_set0}}[0] is inferred to be equal to 0.
qp_table_star/*_minus26*\_{{_set0}}[i]/*plus 26*\ specifies the starting luma and chroma QP used to describe the i-th chroma QP mapping table {{for the $1^{st}$ set of chroma QP mapping tables}}.The value of qp_table_start/*_minus26*\_{{_set0}}[i] shall be in the range of /*–26*\–QpBdOffset to /*36*\ {{62}} inclusive. When qp_table_start/*minus26*\_{{_set0}}[i] is not present in the bitstream, the value of qp_table_start/*minus26*\_{{_set0}}[i] is inferred to be equal to 0.
delta_qp_in_val_minus1{{_set0}}[i][j] specifies a delta value used to derive the input coordinate of the j-th pivot point of the i-th chroma QP mapping table {{for the $1^{st}$ set of chroma QP mapping tables}}. When delta_qp_in_val_minus1{{_set0}}[0][j] is not present in the bitstream, the value of delta_qp_in_val_minus1{{_set0}}[0][j] is inferred to be equal to 0.
delta_qp_diff_val{{_set0}}[i][j] specifies a delta value used to derive the output coordinate of the j-th pivot point of the i-th chroma QP mapping table {{for the $1^{st}$ set of chroma QP mapping tables.

same_qp_table_for_chroma_set1 equal to 1 specifies that only one chroma QP mapping table is signalled and this table applies to Cb and Cr residuals and additionally to joint Cb-Cr residuals when sps_joint_cbcr_enabled_flag is equal to 1 for the $2^{nd}$ set of chroma QP mapping tables. same_qp_table_for_chroma_set1 equal to 0 specifies that chroma QP mapping tables, two for Cb and Cr, and one additional for joint Cb-Cr when sps_joint_cbcr_enabled_flag is equal to 1, for the $2^{nd}$ set of chroma QP mapping tables, are signalled in the SPS. When same_qp_table_for_chroma_set1 is not present in the bitstream, the value of same_qp_table_for_chroma_set1 is inferred to be equal to 1.
num_points_in_qp_table_minus1_set1[i] plus 1 specifies the number of points used to describe the i-th chroma QP mapping table for the $2^{nd}$ set of chroma QP mapping tables. The value of num_points_in_qp_table_minus1_set1[i] shall be in the range of 0 to 63+QpBdOffset, inclusive. When num_points_in_qp_table_minus1_set1[0] is not present in the bitstream, the value of num_points_in_qp_table_minus1_set1[0]is inferred to be equal to 0. qp_table_start_set1[i] specifies the starting luma and chroma QP used to describe the i-th chroma QP mapping table for the $2^{nd}$ set of chroma QP mapping tables. The value of qp_table_start_set1[i] shall be in the range of –QpBdOffset to 62 inclusive. When qp_table_start_set1[i] is not present in the bitstream, the value of qp_table_start_set1[i] is inferred to be equal to 0.

delta_qp_in_val_minusl_set1[i][j] specifies a delta value used to derive the input coordinate of the j-th pivot point of the i-th chroma QP mapping table for the $2^{nd}$ set of chroma QP mapping tables. When delta_qp_in_val_minus1_set1[0][j ] is not present in the bitstream, the value of delta_qp_in_val_minus1_set1[0][j] is inferred to be equal to 0.

delta_qp_diff_val_set1[i][j] specifies a delta value used to derive the output coordinate of the j-th pivot point of the i-th chroma QP mapping table for the $2^{nd}$ set of chroma QP mapping tables.

The i-th chroma QP mapping table ChromaQpTableSet0[i] for i=0..numQpTablesSet0–1 and the i-th chroma QP mapping table ChromaQpTableSet1[i] for i=0..numQpTablesSet1–1 are derived as follows:

Let ChromaQpTable[i] denotes the ChromaQpTableSetX[i], qp_table_start[i] denotes the qp_table_start_setX[i], delta_qp_in_val_minus1[i] denotes delta_qp_in_val_minus1_setX[i], delta_qp_diff_val[i] denotes delta_qp_diff_val_setX[i] for X being 0 and 1 respectively, the following applies:}_}

```
qpInVal[ i ][ 0 ] = qp_table_start[[_minus26]][ i ] [[+ 26]]
qpOutVal[ i ][ 0 ] = qpInVal[ i ][ 0 ]
for( j = 0; j <[[=]] num_points_in_qp_table[[_minus1]][ i ]; j++ ) {
   qpInVal[ i ][ j + 1 ] = qpInVal[ i ][ j ] + delta_qp_in_val_minus1[ i ][ j ] + 1
   qpOutVal[ i ][ j + 1 ] = qpOutVal[ i ][ j ] +
( delta_qp_in_val_minus1[ i ][ j ] ^ delta_qp_diff_val[ i ][ j ] )
}
ChromaQpTable[ i ][ qpInVal[ i ][ 0 ] ] = qpOutVal[ i ][ 0 ]
for( k = qpInVal[ i ][ 0 ] - 1; k >= -QpBdOffset; k - - )
   ChromaQpTable[ i ][ k ] = Clip3( -QpBdOffset, 63, ChromaQpTable[ i ][ k + 1 ] - 1 )
   (62)
for( j = 0; j <[[=]] num_points_in_qp_table[[_minus1]][ i ]; j++ ) {
   sh = ( delta_qp_in_val_minus1[ i ][j ] + 1 ) >> 1
   for( k = qpInVal[ i ][ j ] + 1, m = 1; k <= qpInval[ i ][ j + 1 ]; k++, m++ )
      ChromaQpTable[ i ][ k ] = ChromaQpTable[ i ][ qpInVal[ i ][ j ] ] +
         ( ( qpOutVal[ i ] [j + 1] - qpOutVal[ i ][j] ) * m + sh ) /
( delta_qp_in_val_minus1[ i ][j] + 1 )
}
```
*if( num_points_in_qp_table[ i ] == 0 )*
　　*for( k = qpInVal[ i ][ 0 ] + 1; k <= 63; k ++ )*
　　　　*ChromaQpTable[ i ][ k ] = Clip3( -QpBdOffset, 63,*
*ChromaQpTable[ i ][ k - 1 ] + 1 )*
*else*
```
   for( k = qpInVal[ i ][ num_points_in_qp_table[[_minus1]][ i ] [[+ 1]] ] + 1; k <= 63;
k++ )
      ChromaQpTable[ i ][ k ] = Clip3( -QpBdOffset, 63, ChromaQpTable[ i ][ k - 1 ] +
1 )
```

When same_qp_table_for_chroma{{X}} is equal to 1, ChromaQpTable{{X}}[1][k] and ChromaQpTable{{X}}[2][k] are set equal to ChromaQpTable{{X}}[0][k] {{for X being 0 and 1 and}} for k in the range of –QpBdOffset to 63, inclusive.

It is a requirement of bitstream conformance that the values of qpInVal[i][j] and qpOutVal[i][j] shall be in the range of –QpBdOffset to 63, inclusive for i in the range of 0 to numQpTables–1 inclusive, and j in the range of 0 to num_points_in_qp_table_minus1[i]+1, inclusive.

. . .

8.7.1 Derivation Process for Quantization Parameters

. . .

{{When the current slice is an I slice, ChromaQpTable[i] is set equal to ChromaQpTableSet0[i ] for i=0..2. When the current slices is a B or P slice, ChromaQpTable[i] is set equal to ChromaQpTableSet1[i] for i=0..2 when sps_one_set_of_chroma_qp_tables_flag is equal to 0, otherwise (when sps_one_set_of_chroma_qp_tables_flag is equal to 1), ChromaQpTable[i] is set equal to ChromaQpTableSet0[i] for i=0..2.}}

When ChromaArrayType is not equal to 0 and treeType is equal to SINGLE_TREE or DUAL_TREE_CHROMA, the following applies:

When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).

The variables $qP_{Cb}$, $qP_{Cr}$ and $qP_{CbCr}$ are derived as follows:

$$qP_{Chroma}=\text{Clip3}(-QpBd\text{Offset},63,Qp_Y) \quad (1143)$$

$$qP_{Cb}=Chroma QpTable[0][qP_{Chroma}] \quad (1144)$$

$$qP_{Cr}=Chroma QpTable[1][qP_{Chroma}] \quad (1145)$$

$$qP_{CbCr}=Chroma QpTable[2][qP_{Chroma}] \quad (1146)$$

6.5. Embodiment 5

The newly added text is marked in open and closed double braces (e.g., {{a}} indicates that 'a' is added), and /\ indicates deleted text in between /\ (e.g., /*a*\ indicates that 'a' is deleted). It is based on JVET-Q2001-vE.

7.3.2.3 Sequence Parameter Set RBSP Syntax

|  | Descriptor |
|---|---|
| seq_parameter_set_rbsp( ) { |  |
| ... |  |
| if( ChromaArrayType != 0 ) { |  |
| {{ sps_one_set_of_chroma_qp_tables_flag | u(1) }} |
| sps_joint_cbcr_enabled_flag | u(1) |
| {{numTables = sps_one_set_of_chroma_qp_tables_flag ? 1 : 2 |  |
| for(1 = 0; 1 <= numTables; 1++) { }} |  |
| same_qp_table_for_chroma{{[ 1 ]}} | u(1) |
| numQpTables{{[ 1 ]}} = same_qp_table_for_chroma{{[ 1 ]}} ? 1 : ( sps_joint_cbcr_enabled_flag ? 3 : 2 ) |  |
| for( i = 0; i < numQpTables{{[ 1 ]}}; i++ ) { |  |
| qp_table_start_minus26{{[ 1 ]}}[ i ] | se(v) |
| num_points_in_qp_table_minus1{{[ 1 ]}}[ i ] | ue(v) |
| for( j = 0; j <= num_points_in_qp_table_minus1{{[ 1 ]}}[ i ]; j++ ) { |  |
| delta_qp_in_val_minus1{{[ 1 ]}}[ i ][ j ] | ue(v) |
| delta_qp_diff_val{{[ 1 ]}}[ i ][ j ] | ue(v) |

-continued

| Descriptor |
|---|
| }<br>   {{ } }}<br>  }<br>}<br>... |

7.4.3.3 Sequence Parameter Set RBSP Semantics

. . .

{{sps_one_set_of_chroma_qp_tables_flag equal to O specifies that there are two sets of chroma QP mapping tables. sps_one_set_of_chroma_qp_tables_flag equal to 1 specifies that there are just one set of chroma QP mapping tables. When not present, the value of sps_one_set_of_chroma_qp_tables_flag is inferred to be equal to 1.}}
same_qp_table_for_chroma {{[1]}} equal to 1 specifies that only one chroma QP mapping table is signalled and this table applies to Cb and Cr residuals and additionally to joint Cb-Cr residuals when sps_joint_cbcr_enabled_flag is equal to 1 {{for the 1-th set of chroma QP mapping tables}}.
same_qp_table_for_chroma{{[1]}} equal to 0 specifies that chroma QP mapping tables, two for Cb and Cr, and one additional for joint Cb-Cr when sps_joint_cbcr_enabled_flag is equal to 1, {{for the 1-th st of chroma QP mapping tables}}, are signalled in the SPS. When same_qp_table_for_chroma{{[1]}} is not present in the bitstream, the value of same_qp_table_for_chroma{{[1]}} is inferred to be equal to 1.

qp_table_start_minus26{{[1]}}[i] plus 26 specifies the starting luma and chroma QP used to describe the i-th chroma QP mapping table {{for the 1-th set of chroma QP mapping tables}}. The value of qp_table_start_minus26{{[1]}}[i] shall be in the range of −26−QpBdOffset to 36 inclusive.
When qp_table_start_minus26{{[1]}}[i] is not present in the bitstream, the value of qp_table_start_minus26{{[1]}}[i] is inferred to be equal to 0.
num_points_in_qp_table_minus1{{[1]}}[i] plus 1 specifies the number of points used to describe the i-th chroma QP mapping table {{for the 1-th set of chroma QP mapping tables}}. The value of num_points_in_qp_table_minus1{{[1]}}[i] shall be in the range of 0 to 63+QpBdOffset, inclusive. When num_points_in_qp_table_minus1{{[1]}}[0] is not present in the bitstream, the value of num_points_in_qp_table_minus1{{[1]}}[0] is inferred to be equal to 0.

delta_qp_in_val_minus1{{[1]}}[j] specifies a delta value used to derive the input coordinate of the j-th pivot point of the i-th chroma QP mapping table {{for the 1-th set of chroma QP mapping tables}}. When delta_qp_in_val_minus1{{[1]}}[0][j] is not present in the bitstream, the value of delta_qp_in_val_minus1{{[1]}}[0][j] is inferred to be equal to 0.

delta_qp_diff_val{{[1]}}[i][j] specifies a delta value used to derive the output coordinate of the j-th pivot point of the i-th chroma QP mapping table {{for the 1-th set of chroma QP mapping tables.

The 1-th chroma QP mapping table ChromaQpTable[1][i] for 1=0.. sps_one_set_of_chroma_qp_tables_flag?1:2 and i=O..numQpTables[1]−1 are derived as follows:}}

```
qpInVal[1][ i ][ 0 ] = qp_table_start_minus26[1][ i ] + 26
qpOutVal[1][ i ][ 0 ] = qpInVal[1][ i ][ 0 ]
for( j = 0; j <= num_points_in_qp_table_minus1[1][ i ]; j++ ) {
    qpInVal[1][ i ][ j + 1 ] = qpInVal[1][ i ][ j ] + delta_qp_in_val_minus1[1][ i ][ j ] + 1
    qpOutVal[1][ i ][ j + 1 ] = qpOutVal[1][ i ][ j ] +
        ( delta_qp_in_val_minus1[1][ i ][ j ] ^ delta_qp_diff_val[1][ i ][ j ] )
}
ChromaQpTable[1][ i ][ qpInVal[1][ i ][ 0 ] ] = qpOutVal[1][ i ][ 0 ]
for( k = qpInVal[1][ i ][ 0 ] − 1; k >= −QpBdOffset; k − − )
    ChromaQpTable[1][ i ][ k ] = Clip3( −QpBdOffset, 63,
ChromaQpTable[1][ i ][ k + 1 ] − 1 )                                    (62)
for( j = 0; j <= num_points_in_qp_table_minus1[1][ i ]; j++ ) {
    sh = ( delta_qp_in_val_minus1[1][ i ][j] + 1 ) >> 1
    for( k = qpInVal[1][ i ][ j ] + 1, m = 1; k <= qpInval[1][ i ][ j + 1 ]; k++, m++ )
        ChromaQpTable[1][ i ][ k ] = ChromaQpTable[1][ i ][ qpInVal[1][ i ][ j ] ] +
            (( qpOutVal[1][ i ][j + 1] − qpOutVal[1][ i ][j] ) * m + sh ) /
            ( delta_qp_in_val_minus1[1][ i ] [j] + 1 )
}
for( k = qpInVal[1][ i ][ num_points_in_qp_table_minus1[1][ i ] + 1 ] + 1; k <= 63; k++ )
    ChromaQpTable[1][ i ][ k ] = Clip3( −QpBdOffset, 63, ChromaQpTable[1][ i ][ k − 1 ]
+ 1 )
```

When same_qp_table_for_chroma{{[1]}} is equal to 1, ChromaQpTable{{[1]}}[1][k] and ChromaQpTable{{[1]}}[2][k] are set equal to ChromaQpTable{{[1]}}[0][k] for k in the range of −QpBdOffset to 63, inclusive.
It is a requirement of bitstream conformance that the values of qpInVal{{[1]}}[i][j] and qpOutVal{{[1]}}[i][j] shall be in the range of −QpBdOffset to 63, inclusive for i in the range of 0 to numQpTables{{[1]}}−1 inclusive, and j in the range of 0 to num_points_in_qp_table_minus1{{[1]}}[i]+1, inclusive.

. . .

8.7.1 Derivation Process for Quantization Parameters

. . .

{{When the current slice is an I slice, chromaQpTable[i] is set equal to ChromaQpTable[0][i ] for i=0..2. When the current slices is a B or P slice, chromaQpTable[i] is set equal to ChromaQpTable[1][i] for i=0..2 when sps_one_set_of_chroma_qp_tables_flag is equal to 0, otherwise (when sps_one_set_of_chroma_qp_tables_flag is equal to 1), chromaQpTable[i] is set equal to ChromaQpTable[0][i] for i=0..2.}}

When ChromaArrayType is not equal to 0 and treeType is equal to SINGLE_TREE or DUAL_TREE_CHROMA, the following applies:
- When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).
- The variables $qP_{Cb}$, $qP_{Cr}$ and $qP_{CbCr}$ are derived as follows:

$qP_{Chroma}$=Clip3(−$Qp$BdOffset,63,$Qp_Y$)  (1143)

$qP_{Cb}$=/*C*\chroma$Qp$Table[0][$qP_{Chroma}$]  (1144)

$qP_{Cr}$=/*C*\chroma$Qp$Table[1][$qP_{Chroma}$]  (1145)

$qP_{CbCr}$=/*C*\chroma$Qp$Table[2][$qP_{Chroma}$]  (1146)

6.6. Embodiment 6

The suggested specification changes on top of NET-Q2001-vE is described as follows. Deleted texts are marked in /\ that indicates deleted text in between /\ (e.g., /*a*\ indicates that 'a' is deleted) and newly added text is highlighted in open and closed double braces(e.g., {{a}} indicates that 'a' is added).

7.3.10.2 Coding Tree Unit Syntax

|  | Descriptor |
|---|---|
| coding_tree_unit( ) { |  |
|   xCtb = CtbAddrX << CtbLog2SizeY |  |
|   yCtb = CtbAddrY << CtbLog2SizeY |  |
|   if( slice_sao_luma_flag \|\| slice_sao_chroma_flag ) |  |
|     sao( CtbAddrX, CtbAddrY ) |  |
|   if( slice_alf_enabled_flag ){ |  |
|     alf_ctb_flag[ 0 ][ CtbAddrX ][ CtbAddrY ] | ae(v) |
|     if( alf_ctb_flag[ 0 ][ CtbAddrX ][ CtbAddrY ] ) { |  |
|       if( slice_num_alf_aps_ids_luma > 0 ) |  |
|         alf_use_aps_flag | ae(v) |
|       if( alf_use_aps_flag ) { |  |
|         if( slice_num_alf_aps_ids_luma > 1 ) |  |
|           alf_luma_prev_filter_idx | ae(v) |
|       } else |  |
|         alf_luma_fixed_filter_idx | ae(v) |
|   [{}]] |  |
|       if( slice_alf_chroma_idc = = 1 \|\| slice_alf_chroma_idc = = 3 ) { |  |
|         alf_ctb_flag[ 1 ][ CtbAddrX ][ CtbAddrY ] | ae(v) |
|         if( alf_ctb_flag[ 1 ][ CtbAddrX ][ CtbAddrY ] |  |
|           && alf_chroma_num_alt_filters_minus1 > 0 ) |  |
|           alf_ctb_filter_alt_idx[ 0 ][ CtbAddrX ][ CtbAddrY ] | ae(v) |
|       } |  |
|       if( slice_alf_chroma_idc = = 2 \|\| slice_alf_chroma_idc = = 3 ) { |  |
|         alf_ctb_flag[ 2 ][ CtbAddrX ][ CtbAddrY ] | ae(v) |
|         if( alf_ctb_flag[ 2 ][ CtbAddrX ][ CtbAddrY ] |  |
|           && alf_chroma_num_alt_filters_minus1 > 0 ) |  |
|           alf_ctb_filter_alt_idx[ 1 ][ CtbAddrX ][ CtbAddrY ] | ae(v) |
|       } |  |
|   [/*}]*\ |  |
|     if( slice_cc_alf_cb_enabled_flag ) |  |
|       alf_ctb_cc_cb_idc[ CtbAddrX ][ CtbAddrY ] | ae(v) |
|     if( slice_cc_alf_cr_enabled_flag ) |  |
|       alf_ctb_cc_cr_idc[ CtbAddrX ][ CtbAddrY ] | ae(v) |
|   {{ }}} |  |
|   {{ }}} |  |
|   if( slice_type = = 1 && qtbtt_dual_tree_intra_flag ) |  |
|     dual_tree_implicit_qt_split( xCtb, yCtb, CtbSizeY, 0 ) |  |
|   else |  |
|     coding_tree( xCtb, yCtb, CtbSizeY, CtbSizeY, 1, 1, 0, 0, 0, 0, 0, |  |
|             SINGLE_TREE, MODE_TYPE_ALL ) |  |
| } |  |

6.7. Seventh Set of Embodiments

This is a set of embodiments for items 20 summarized above in Section 5.

The changed texts are based on the latest VVC text in JVET-Q2001-vE. Most relevant parts that have been added or modified are highlighted in open and closed double braces (e.g., {{a}} indicates that 'a' is added), and some of the deleted texts are marked in /\ that indicates deleted text in between /\ (e.g., /*a*\ indicates that 'a' is deleted).

6.7.1. An Example Embodiment

In one example, the SPS syntax structure may be changed as follows:

| | Descriptor |
|---|---|
| seq_parameter_set_rbsp( ) { | u(4) |
| ... | |
| sps_transform_skip_enabled_flag | u(1) |
| if( sps_transform_skip_enabled_flag ) { | |
| {{ sps_ts_residual_coding_enabled_flag | u(1) }} |
| log2_transform_skip_max_size_minus2 | ue(v) |
| sps_bdpcm_enabled_flag | u(1) |
| } | |
| ... | |

{{sps_ts_residual_coding_enabled_flag equal to 1 specifies that slice_ts_residual_coding_disabled_flag may be present in the CLVS. sps_ts_residual_coding_enabled_flag equal to 0 specifies that slice_ts_residual_coding_disabled_flag is not present in the CLVS. When not present, the value of sps_ts_residual_coding_enabled_flag is inferred to be equal to 0.}}

In one example, the PPS syntax structure may be changed as follows:

| | Descriptor |
|---|---|
| pic_parameter_set_rbsp( ) { | |
| ... | |
| cabac_init_present_flag | u(1) |
| {{pps_ts_residual_coding_enabled_flag | u(1) |
| if( pps_ts_residual_coding_enabled_flag) | |
| ts_residual_coding_flag_in_ph | u(1) }} |

{{pps_ts_residual_coding_enabled_flag equal to 1 specifies that ph/slice_ts_residual_coding_enabled_flag may be present in pictures/ slices referring to the PPS. pps_ts_residual_coding_enabled_flag equal to 0 specifies that ph/slice_ts_residual_coding_enabled_flag is not present in the pictures/ slices referring to the PPS.

It is required that, when sps_ts_residual_coding_enabled_flag is equal to 0, the value of pps_ts_residual_coding_enabled_flag shall be equal to 0.

It is required that, when sps_transform_skip_enabled_flag is equal to 0, the value of pps_ts_residual_coding_enabled_flag shall be equal to 0.

ts_residual_coding_flag_in_ph equal to 1 specifies that ph_ts_residual_coding_disabled_flag may be present in the PH. pps_ts_residual_coding_enabled_flag equal to 0 specifies that slice_ts_residual_coding_disabled_flag may be present in the SH.}}

In one example, the PH syntax structure may be changed as follows:

| | Descriptor |
|---|---|
| picture_header_structure( ) { | |
| ... | |
| if( output_flag_present_flag ) | |
| pic_output_flag | u(1) |
| {{ if( pps_ts_residual_coding_enabled_flag && ts_residual_coding_flag_in_ph ) | |
| ph_ts_residual_coding_enabled_flag | u(1) }} |
| ... | |

{{ph_ts_residual_coding_enabled_flag equal to 0 specifies that the residual_coding( ) syntax structure is used to parse the residual samples of a transform skip block for all slices of the current picture. ph_ts_residual_coding_enabled_flag equal to 1 specifies that the residual_ts_coding( ) syntax structure may be used to parse the residual samples of a transform skip block for all slices of the current picture. When ph_ts_residual_coding_enabled_flag is not present, it is infered to be equal to 0.}}

In one example, the PH syntax structure may be changed as follows:

| | Descriptor |
|---|---|
| slice_header( ) { | |
| ... | |
| {{ if( pps_ts_residual_coding_enabled_flag && !ts_residual_coding_flag_in_ph )}} | |
| slice_ts_residual_coding_[/*disabled]*\enabled_flag | u(1) | slice_ts_residual_coding_/*disabled*\{{enabled}} flag equal to /*1*\ 0 specifies that the residual_coding( ) syntax structure is used to parse the residual samples of a transform skip block for the current slice. slice_ts_residual_coding_/*disabled*{{enabled}} flag equal to /*0*\{{1}} specifies that the residual_ts_coding( ) syntax structure is used to parse the residual samples of a transform skip block for the current slice. When slice_ts_residual_coding_/*disabled*\{{enabled}} flag is not present, it is inferred to be equal to /*0*\{{ph_ts_residual_coding_enabled_flag}}.

In one example, the transform unit( ) syntax structure may be changed as follows:

| | Descriptor |
|---|---|
| transform_unit( x0, y0, tbWidth, tbHeight, treeType, subTuIndex, chType ) { | |
| ... | |
| if( tu_y_coded_flag[ x0 ][ y0 ] && treeType != DUAL_TREE_CHROMA ) { | |
| if( sps_transform_skip_enabled_flag && !BdpcmFlag[ x0 ][ y0 ][ 0 ] && | |
| tbWidth <= MaxTsSize && tbHeight <= MaxTsSize && | |
| ( IntraSubPartitionsSplitType == ISP_NO_SPLIT ) && !cu_sbt_flag ) | |
| transform_skip_flag[ x0 ][ y0 ][ 0 ] | ae(v) |
| {{ if( slice_ts_residual_coding_enabled_flag && | |

| | Descriptor |
|---|---|
| transform_skip_flag[ x0 ][ y0 ][ 0 ]<br>    tu_ts_residual_coding_flag<br>  if( !transform_skip_flag[ x0 ][ y0 ][ 0 ]<br>  if( !transform_skip_flag[ x0 ][ y0 ][ 0 ]\|\|<br>{{ !tu_ts_residual_coding_flag[ x0 ][ y0 ][ 0 ]}} [/* slice_ts_residual_coding_<br>disabled_flag]*\ )<br>    residual_coding( x0, y0, Log2( tbWidth ), Log2( tbHeight ), 0 )<br>  else<br>    residual_ts_coding( x0, y0, Log2( tbWidth ), Log2( tbHeight ), 0 )<br>}<br>if( tu_cb_coded_flag[ xC ][ yC ] && treeType != DUAL_TREE_LUMA ) {<br>  if( sps_transform_skip_enabled_flag && !BdpcmFlag[ x0 ][ y0 ][ 1 ] &&<br>    wC <= MaxTsSize && hC <= MaxTsSize && !cu_sbt_flag )<br>    transform_skip_flag[ xC ][ yC ][ 1 ]<br>  {{ if(slice_ts_residual_coding_enabled_flag &&<br>transform_skip_flag[ xC ][ yC ][ 1 ]<br>    tu_ts_residual_coding_flag<br>  if( !transform_skip_flag[ xC ][ yC ][ 1 ]<br>{{ !tu_ts_residual_coding_flag[ xC ][ yC ][ 1 ] }}[/*slice_ts_residual_coding_<br>disabled_flag]*\ )<br>    residual_coding( xC, yC, Log2( wC ), Log2( hC ), 1 )<br>  else<br>    residual_ts_coding( xC, yC, Log2( wC ), Log2( hC ), 1 )<br>}<br>if( tu_cr_coded_flag[ xC ][ yC ] && treeType != DUAL_TREE_LUMA &&<br>  !(tu_cb_coded_flag[ xC ][ yC ] &&<br>tu_joint_cbcr_residual_flag[ xC ][ yC ] ) ) {<br>  if(sps_transform_skip_enabled_flag && !BdpcmFlag[ x0 ][ y0 ][ 2 ] &&<br>    wC <= MaxTsSize && hC <= MaxTsSize && !cu_sbt_flag )<br>    transform_skip_flag[ xC ][ yC ][ 2 ]<br>  {{ if(slice_ts_residual_coding_enabled_flag &&<br>transform_skip_flag[ xC ][ yC ][ 2 ] )<br>    tu_ts_residual_coding_flag[ xC ][ yC ][ 2 ]<br>  if( !transform_skip_flag[ xC ][ yC ][ 2 ] \|\|<br>{{ !tu_ts_residual_coding_flag[ xC ][ yC ][ 2 ] }}[/*slice_ts_residual_coding_<br>disabled_flag]*\ )<br>    residual_coding( xC, yC, Log2( wC ), Log2( hC ), 2 )<br>  else<br>    residual_ts_coding( xC, yC, Log2( wC ), Log2( hC ), 2 )<br>  }<br>} | ae(v)}}<br><br><br><br><br><br><br><br><br>ae(v)<br><br><br>ae(v)}}<br><br><br><br><br><br><br><br><br>ae(v)<br><br><br>ae(v)}} |

{{tu_ts_residual_coding_flag[x0][y0][cIdX] equal to 1 specifies that for the current coding unit, when slice_ts_residual_coding_enabled_flag and transform_skip_flag[x0][y0][cIdX] are equal to 1, then transform skip residual coding is used.

tu_ts_residual_coding_flag[x0][y0][cIdX] equal to 0 specifies that for the current coding unit, when slice_ts_residual_coding_enabled_flag and transform_skip_flag[x0][y0][cIdX ] are equal to 1, the transform residual coding is used. When tu_ts_residual_coding_flag[x0][y0][cIdX] is not signalled, it is inferred to be equal to 0.}}

6.7.2. Another Example Embodiment

Alternatively, the PPS, PH, SH syntax may be changed as follows:

| | Descriptor |
|---|---|
| pic_parameter_set_rbsp( ) {<br>...<br>  cabac_init_present_flag<br>  {{pps_ts_residual_coding_enabled_flag | <br><br>u(1)<br>u(1)}} |

{{pps_ts_residual_coding_enabled_flag equal to 1 specifies that ph/slice_ts_residual_coding_enabled_flag may be present in pictures/slices referring to the PPS.

pps_ts_residual_coding_enabled_flag equal to 0 specifies that ph/slice_ts_residual_coding_enabled_flag is not present in the pictures/slices referring to the PPS.

It is required that, when sps_ts_residual_coding_enabled_flag is equal to 0, the value of pps_ts_residual_coding_enabled_flag shall be equal to 0.

It is required that, when sps_transform_skip_enabled_flag is equal to 0, the value of pps_ts_residual_coding_enabled_flag shall be equal to 0.}}

| | Descriptor |
|---|---|
| picture_header_structure( ) {<br>...<br>  if( output_flag_present_flag )<br>    pic_output_flag<br>  {{ if( pps_ts_residual_coding_enabled_flag )<br>    ph_ts_residual_coding_enabled_flag<br>... | <br><br><br>u(1)<br><br>u(1)}} |

{{ph_ts_residual_coding_enabled_flag equal to 0 specifies that the residual_coding( ) syntaX structure is used to parse the residual samples of a transform skip block for all slices of the current picture. ph_ts_residual_coding_enabled_flag equal to 1 specifies that the residual_ts_coding( ) syntax structure may be used to parse the residual samples of a transform skip block for all slices of the current picture. When ph_ts_residual_coding_enabled_flag is not present, it is infered to be equal to 0.}}

| Descriptor |
|---|
| slice_header( ) { <br> ... <br> {{ if(ph_ts_residual_coding_enabled_flag ) }} <br>    slice_ts_residual_coding_[/*disabled]*\enabled_flag  u(1) | slice_ts_residual_coding_/*disabled*\{{enabled}} flag equal to /*1*\0 specifies that the residual_coding( ) syntax structure is used to parse the residual samples of a transform skip block for the current slice. slice_ts_residual_coding_/*disabled*\{{enabled}} flag equal to /*0*\1 specifies that the residual_ts_coding( ) syntax structure is used to parse the residual samples of a transform skip block for the current slice. When slice_ts_residual_coding_/*disabled*\{{enabled}} flag is not present, it is inferred to be equal to 0.

6.7.3. Another Example Embodiment

Alternatively, the PPS, SH syntax may be changed as follows:

| | Descriptor |
|---|---|
| pic_parameter_set_rbsp( ) { <br> ... <br>   cabac_init_present_flag <br>   {{pps_ts_residual_coding_enabled_flag | <br><br><br>u(1)<br>u(1)}} |

{{pps_ts_residual_coding_enabled_flag equal to 1 specifies that ph/slice_ts_residual_coding_enabled_flag may be present in pictures/slices referring to the PPS.

pps_ts_residual_coding_enabled_flag equal to 0 specifies that ph/slice_ts_residual_coding_enabled_flag is not present in the pictures/slices referring to the PPS.

It is required that, when sps_ts_residual_coding_enabled_flag is equal to 0, the value of pps_ts_residual_coding_enabled_flag shall be equal to 0.

It is required that, when sps_transform_skip_enabled_flag is equal to 0, the value of pps_ts_residual_coding_enabled_flag shall be equal to 0.}}

| Descriptor |
|---|
| slice_header( ) { <br> ... <br> {{if( pps_ts_residual_coding_enabled_flag )}} <br>    slice_ts_residual_coding_[/*disabled]*\enabled_flag  u(1) | slice_ts_residual_coding_/*disabled*\{{enabled}} flag equal to /*1*\0 specifies that the residual_coding( ) syntax structure is used to parse the residual samples of a transform skip block for the current slice. slice_ts_residual_coding_/*disabled*\{{enabled}} flag equal to /*0*\1 specifies that the residual_ts_coding( ) syntax structure is used to parse the residual samples of a transform skip block for the current slice. When slice_ts_residual_coding_/*disabled*\{{enabled}} flag is not present, it is inferred to be equal to 0.

6.7.4. Another Example Embodiment

Alternatively, the SH syntax may be changed as follows:

| | Descriptor |
|---|---|
| slice_header( ) { <br> ... <br> {{if(sps_transform_skip_enabled_flag )}} <br>    slice_ts_residual_coding_[/*disabled*\]{{enabled}}_flag | <br><br><br>u(1) | slice_ts_residual_coding_/*disabled*\{{enabled}} flag equal to /*1*\0 specifies that the residual_coding( ) syntax structure is used to parse the residual samples of a transform skip block for the current slice. slice_ts_residual_coding_/*disabled*\{{enabled}} flag equal to /*0*\ 1 1 specifies that the residual_ts_coding( ) syntax structure is used to parse the residual samples of a transform skip block for the current slice. When slice_ts_residual_coding_/*disabled*\{{enabled}} flag is not present, it is inferred to be equal to 0.

Figure 3:
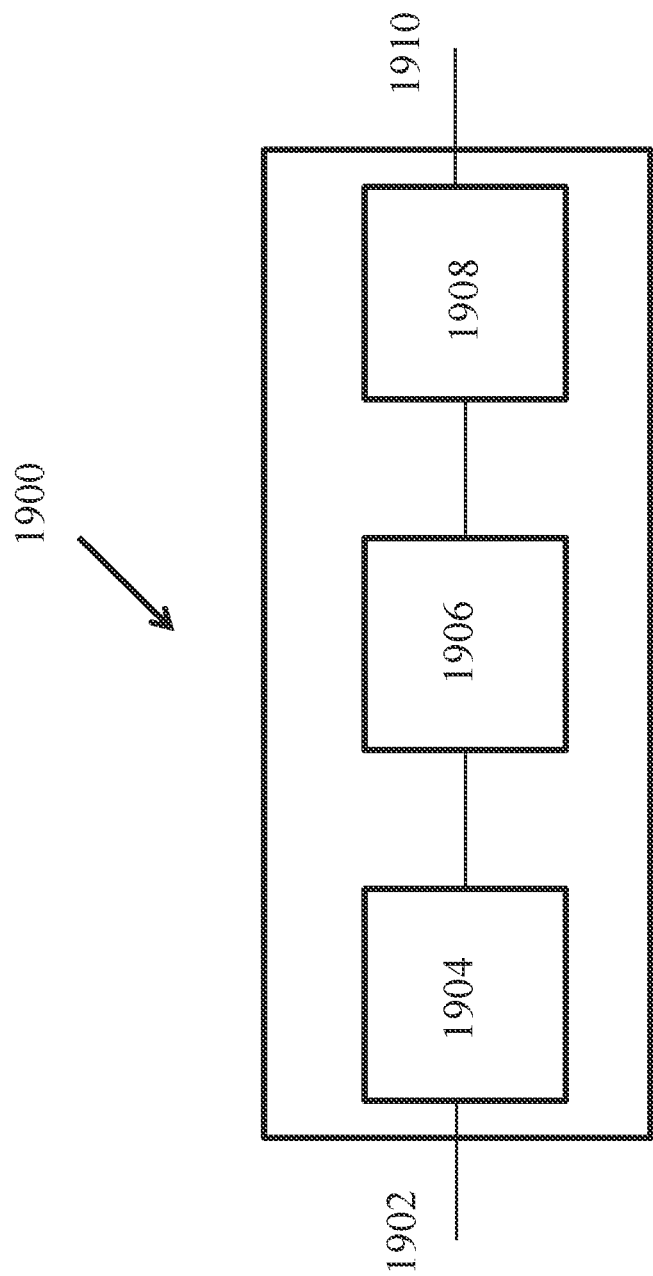
FIG. 3 is a block diagram of an example video processing system.

FIG. 3 is a block diagram showing an example video processing system 1900 in which various embodiments disclosed herein may be implemented. Various embodiments may include some or all of the components of the system 1900. The system 1900 may include input 1902 for receiving video content. The video content may be received in a raw or uncompressed format, e.g., 8- or 10-bit multi-component pixel values, or may be in a compressed or encoded format. The input 1902 may represent a network interface, a peripheral bus interface, or a storage interface. Examples of network interface include wired interfaces such as Ethernet, passive optical network (PON), etc., and wireless interfaces such as Wi-Fi or cellular interfaces.

The system 1900 may include a coding component 1904 that may implement the various coding or encoding methods described in the present disclosure. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The embodiments described in the present disclosure may be embodied in various electronic devices such as mobile phones, laptops, smartphones or other devices that are capable of performing digital data processing and/or video display.

Figure 4:
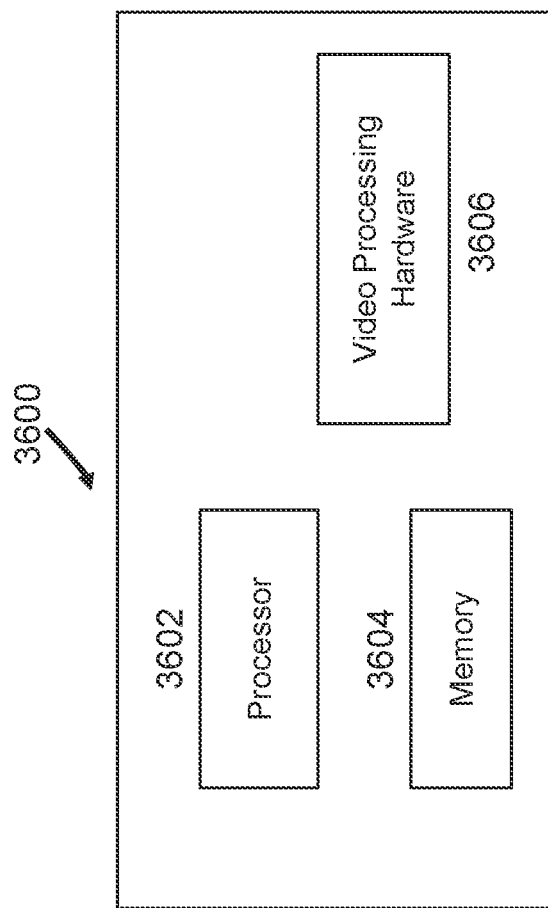
FIG. 4 is a block diagram of a video processing apparatus.

FIG. 4 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present disclosure. The memory (memories) 3604 may be used for storing data and code used for implementing the methods and embodiments described herein. The video processing hardware 3606 may be used to implement, in hardware circuitry, some embodiments described in the present disclosure.

Figure 6:
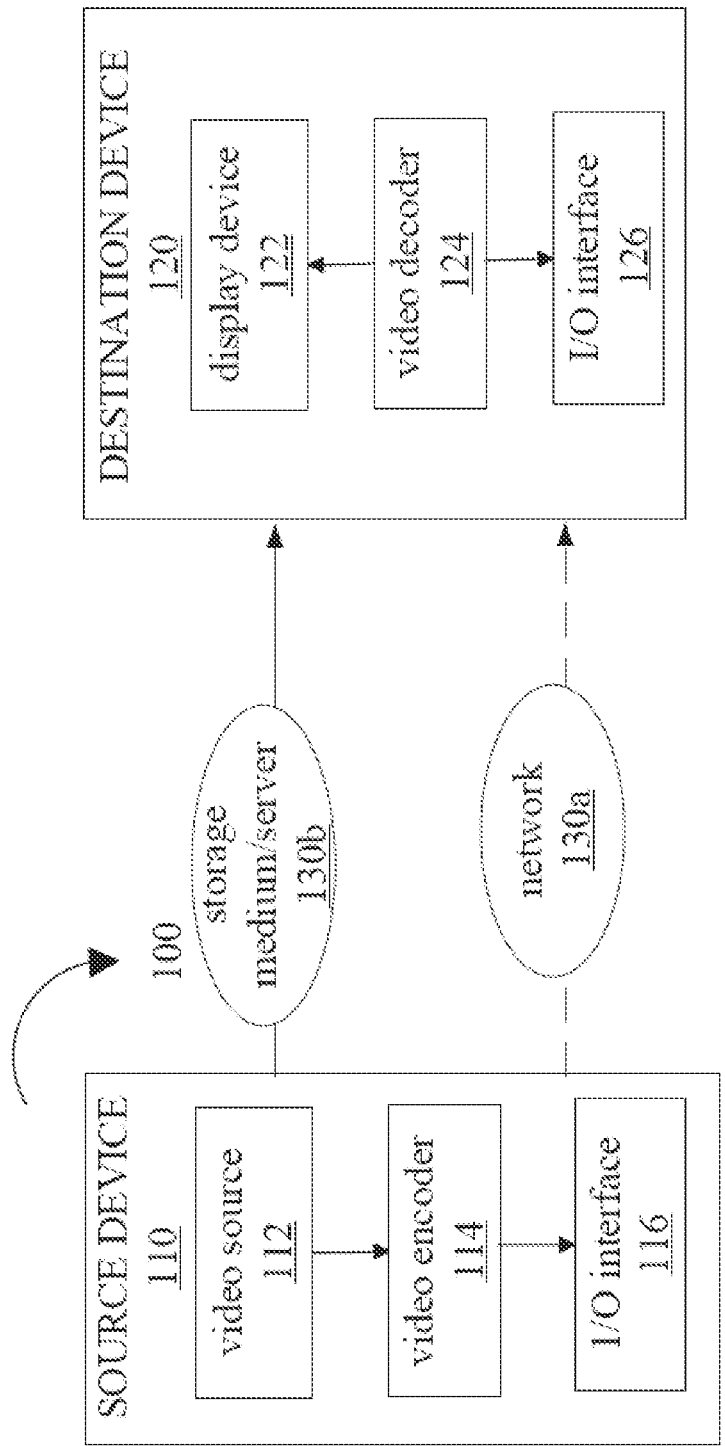
FIG. 6 is a block diagram that illustrates a video coding system in accordance with some embodiments of the present disclosure.

FIG. 6 is a block diagram that illustrates an example video coding system 100 that may utilize the embodiments of this disclosure.

As shown in FIG. 6, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 7:
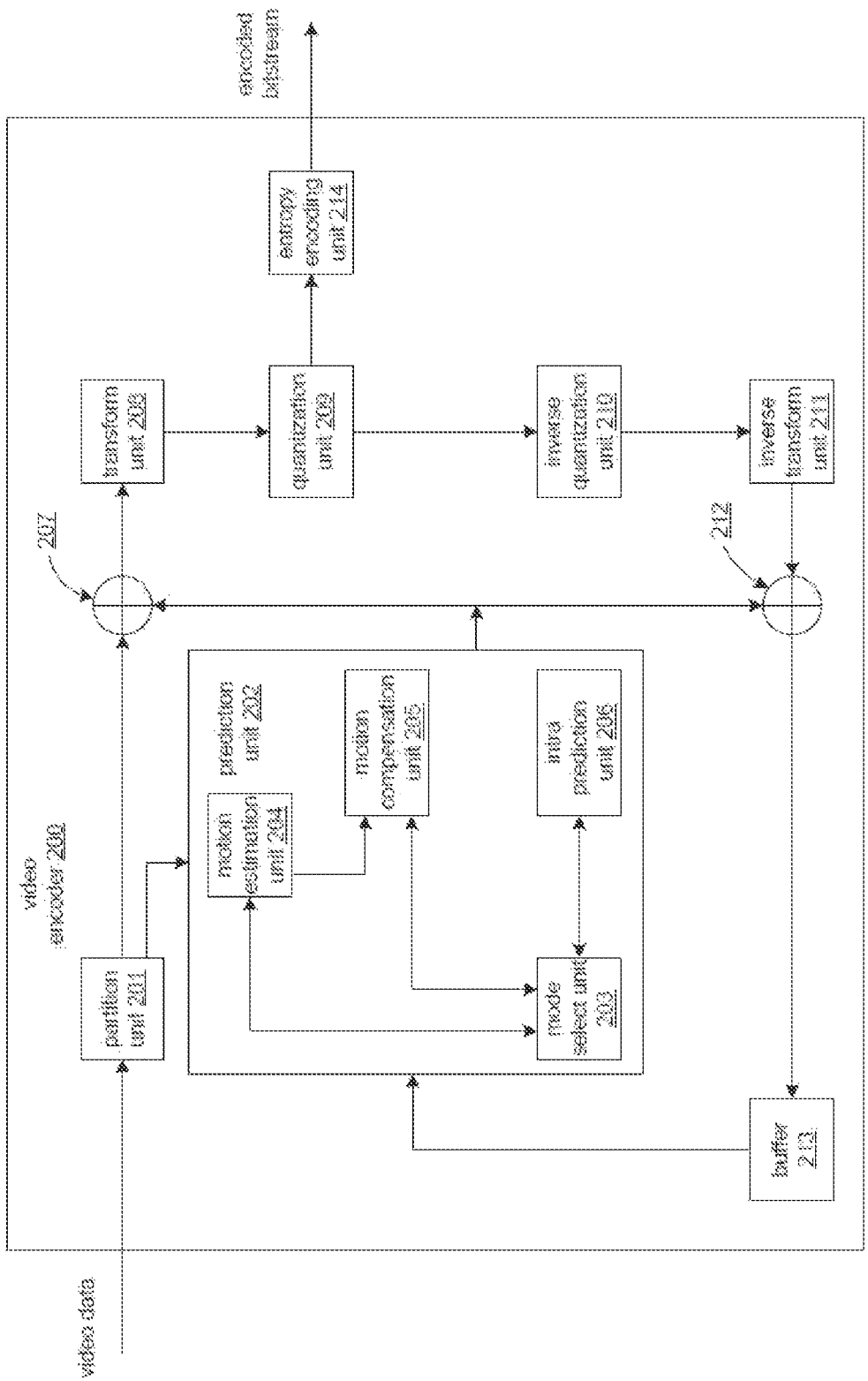
FIG. 7 is a block diagram that illustrates an encoder in accordance with some embodiments of the present disclosure.

FIG. 7 is a block diagram illustrating an example of video encoder 200, which may be video encoder 114 in the system 100 illustrated in FIG. 6.

Video encoder 200 may be configured to perform any or all of the embodiments of this disclosure. In the example of FIG. 7, video encoder 200 includes a plurality of functional components. The embodiments described in this disclosure may be shared among the various components of video encoder 200. In some examples, a processor may be configured to perform any or all of the embodiments described in this disclosure.

The functional components of video encoder 200 may include a partition unit 201, a prediction unit 202 which may include a mode select unit 203, a motion estimation unit 204, a motion compensation unit 205, and an intra prediction unit 206; a residual generation unit 207; a transform unit 208; a quantization unit 209; an inverse quantization unit 210; an inverse transform unit 211; a reconstruction unit 212; a buffer 213; and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 7 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector prediction (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Some embodiments of the present disclosure include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream (or the bitstream representation) of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream of the video to the block of video will be performed using the video processing tool or mode that was enabled based on the decision or determination.

Figure 8:
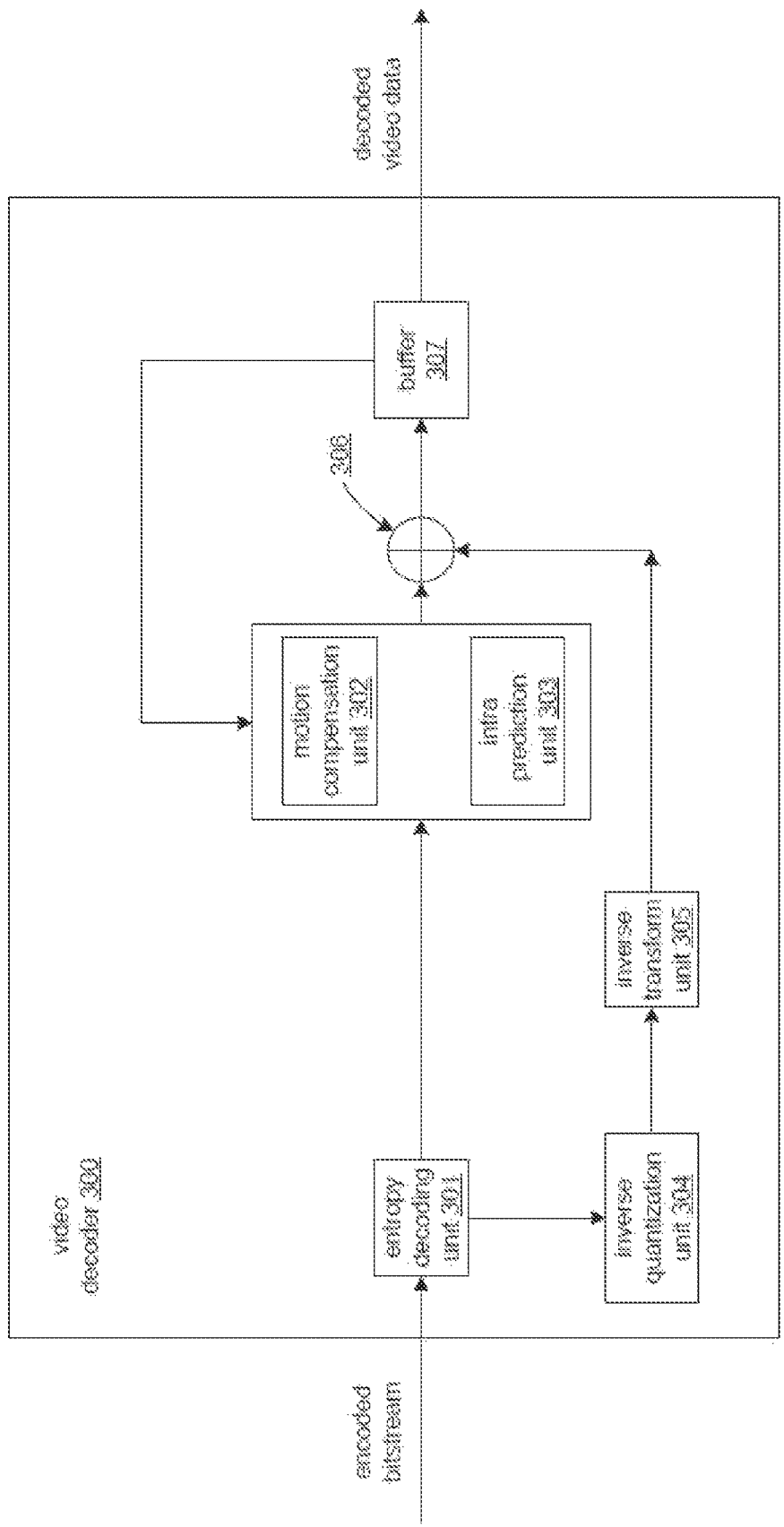
FIG. 8 is a block diagram that illustrates a decoder in accordance with some embodiments of the present disclosure.

FIG. 8 is a block diagram illustrating an example of video decoder 300 which may be video decoder 124 in the system 100 illustrated in FIG. 6.

The video decoder 300 may be configured to perform any or all of the embodiments of this disclosure. In the example of FIG. 8, the video decoder 300 includes a plurality of functional components. The embodiments described in this disclosure may be shared among the various components of the video decoder 300. In some examples, a processor may be configured to perform any or all of the embodiments described in this disclosure.

In the example of FIG. 8, video decoder 300 includes an entropy decoding unit 301, a motion compensation unit 302, an intra prediction unit 303, an inverse quantization unit 304, an inverse transformation unit 305, a reconstruction unit 306, and a buffer 307. Video decoder 300 may, in some examples, perform a decoding pass generally reciprocal to the encoding pass described with respect to video encoder 200 (FIG. 7).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transformation unit 305 applies an inverse transform.

Reconstruction unit 306 may sum the residual blocks with the corresponding prediction blocks generated by motion compensation unit 302 or intra prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show examples of embodiments discussed in the previous section (e.g., item 1).

Figure 5:
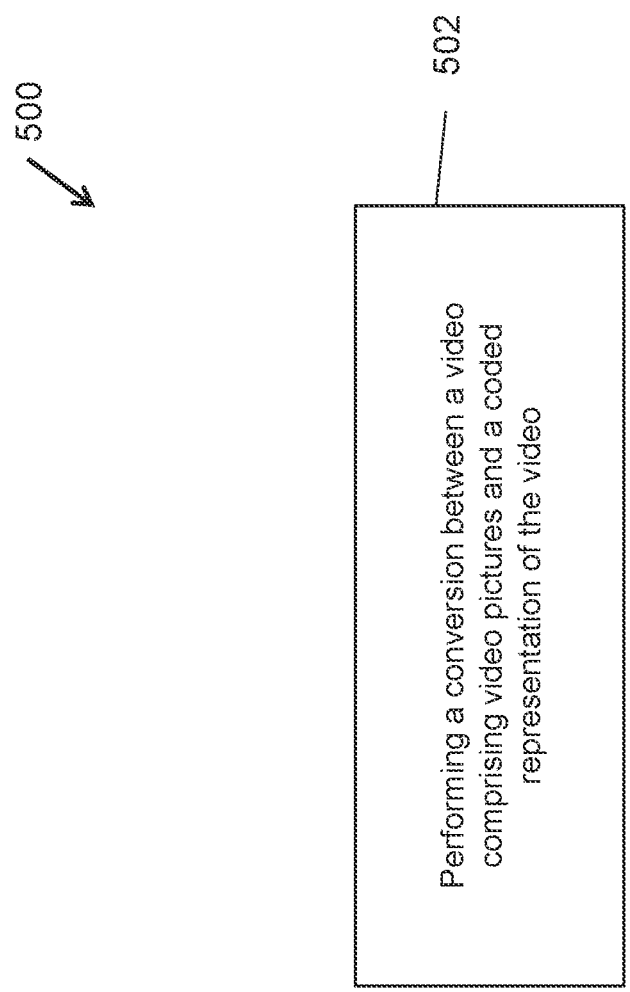
FIG. 5 is a flowchart for an example method of video processing.

1. A method of video processing (e.g., method 500 in FIG. 5), comprising: performing (502) a conversion between a video comprising video pictures and a coded representation of the video, wherein the coded representation conforms to a format rule, wherein the format rule specifies whether and where one or more syntax elements indicative of one or more initial quantization parameter (QP) values used during the conversion are included in the coded representation.
2. The method of solution 1, wherein the format rule specifies that a syntax element indicating the one or more QP values is included in a picture header without including the syntax element in a picture parameter set.
3. The method of solution 1, wherein the format rule specifies that a syntax element indicating the one or more QP values is included in a picture parameter set and repeated in one or more picture headers.
4. The method of solution 1, wherein the format rule specifies that the one or more syntax elements are included in the coded representation at multiple levels comprising two or more of a sequence parameter set, a picture parameter set, a picture header, and a sequence header according to a rule.
5. The method of solution 4, wherein the rule is based on a video picture type of a video picture.

The following solutions show examples of embodiments discussed in the previous section (e.g., items 2-3).

6. A method of video processing, comprising: determining to use, for a conversion between a video block of a video and a coded representation of the video, an initial quantization parameter (QP) value; and performing a conversion based on the determining, wherein a syntax element in the coded representation is indicative of the initial QP value using a offset relationship comprising an offset value K that is (a) between 1 and 25, or (b) greater than 26, or (c) a function of maximum allowed QP value for the conversion, or (d) a function of bit depth used for the conversion.
7. The method of solution 6, wherein K is a function of a type of the video block or a type of a video picture or a video slice containing the video block.

The following solutions show examples of embodiments discussed in the previous section (e.g., items 4-5).

8. A video processing method, comprising: determining, for a conversion between a chroma block of a video and a coded representation of the video, one or more quantization parameter (QP) tables based on a type of a picture or a slice that contains the chroma block according to a rule; and performing the conversion based on the determining.
9. The method of solution 8, wherein the rule specifies that the one or more QP tables are different form I, B, and P video pictures.
10. The method of solution 8, wherein the rule specifies that the one or more QP tables form I coded video pictures are different from the one or more QP tables for B and P coded video pictures.
11. The method of any of solutions 8-10, wherein the rule is based on a classification of a picture type and a slice type to which the chroma block belongs, wherein a number M represents an index to the classification, where M is an integer greater than 1.

The following solutions show examples of embodiments discussed in the previous section (e.g., items 6-8).

12. A video processing method, comprising: determining, for a conversion between a chroma block of a video and a coded representation of the video, one or more quantization parameter (QP) tables; and performing the conversion based on the determining; wherein the conversion conforms to a first rule that specifies one or more syntax elements corresponding to the one or more QP tables or a second rule that specifies a relationship between the one or more QP tables and a coding characteristic of the chroma block.
13. The method of solution 12, wherein the first rule specifies that the one or more syntax elements are included in a sequence parameter set associated with the coded representation.

14. The method of any of solutions 12-13, wherein the second rule specifies that the one or more QP tables are based on a prediction mode used for the conversion.
15. The method of solution 13, wherein the second rule specifies that the one or more QP tables for intra coded chroma blocks are different from chroma blocks that use other prediction modes.

The following solutions show examples of embodiments discussed in the previous section (e.g., item 9-14).

16. A video processing method, comprising: performing a conversion between a chroma block of a video and a coded representation of the video; wherein the coded representation conforms to a format rule, wherein the format rule specifies a characteristic of a syntax element associated with one or more chroma quantization parameter (QP) tables used for the conversion.
17. The method of solution 16, wherein the format rule specifies a maximum value of a start point syntax element for the one or more chroma QP tables.
18. The method of solution 16, wherein the format rule specifies that the start point syntax element has a value offset by a number K smaller than 26.
19. The method of solution 16, wherein the format rule specifies that the start point syntax element is offset by a value that is dependent on whether a current picture of the chroma block is an intra-only picture.
20. The method of any of solutions 16-19, wherein the format rule specifies that a number of pivot points in the one or more chroma QP tables is zero.
21. The method of any of solutions 16-20, due to the number of pivot points being zero, an ith entry the one or more chroma QP tables is set equal to an ith entry in a corresponding luma QP table.
22. The method of any of solutions 16-21, wherein the syntax element is included in both a sequence parameter set and a picture parameter set in the coded representation.
23. The method of any of solutions 16-22, wherein the syntax element is included in either a picture header or a sequence header.

The following solutions show examples of embodiments discussed in the previous section (e.g., item 25).

24. A video processing method, comprising: determining, a signalling scheme used for signalling a quantization parameter table in a coded representation of a video based on a format rule related to one or more syntax elements in the coded representation, and performing, based on the determining, a conversion between the video and the coded representation.
25. The method of solution 24, wherein the signalling scheme comprises indication of a number of points in the quantization parameter table.

The following solutions show examples of embodiments discussed in the previous section (e.g., item 26).

26. A video processing method, comprising: performing a conversion between a video block of a video and a coded representation of the video according to a rule, wherein the rule specifies a number N that, in case that use of affine coding is enabled and use of subblock based temporal motion vector prediction disabled, is used to limit a maximum number of subblock merge candidates.
27. The method of solution 26, wherein N=0.

The following solutions show examples of embodiments discussed in the previous section (e.g., item 27-29).

28. A video processing method, comprising: performing a conversion between a video comprising one or more video pictures comprising one or more video subpictures and a coded representation of the video, wherein the coded representation conforms to a format rule, wherein the format rule specifies to include or omit one or more of the following subpicture related syntax elements: a first syntax element indicating whether all subpictures referring to a same sequence parameter set have a same dimension, a second syntax element that signals a common width and a common height of all subpictures having the same dimension, or a third syntax element according to a second format rule.
29. The method of solution 28, wherein the second format rule specifies to omit syntax elements indicative of sample width under certain conditions.
30. The method of any of solutions 1-29, wherein the conversion comprises encoding the video into the coded representation.
31. The method of any of solutions 1-29, wherein the conversion comprises decoding the coded representation to generate pixel values of the video.
32. A video decoding apparatus comprising a processor configured to implement a method recited in one or more of solutions 1 to 31.
33. A video encoding apparatus comprising a processor configured to implement a method recited in one or more of solutions 1 to 31.
34. A computer program product having computer code stored thereon, the code, when executed by a processor, causes the processor to implement a method recited in any of solutions 1 to 31.

Figure 9:
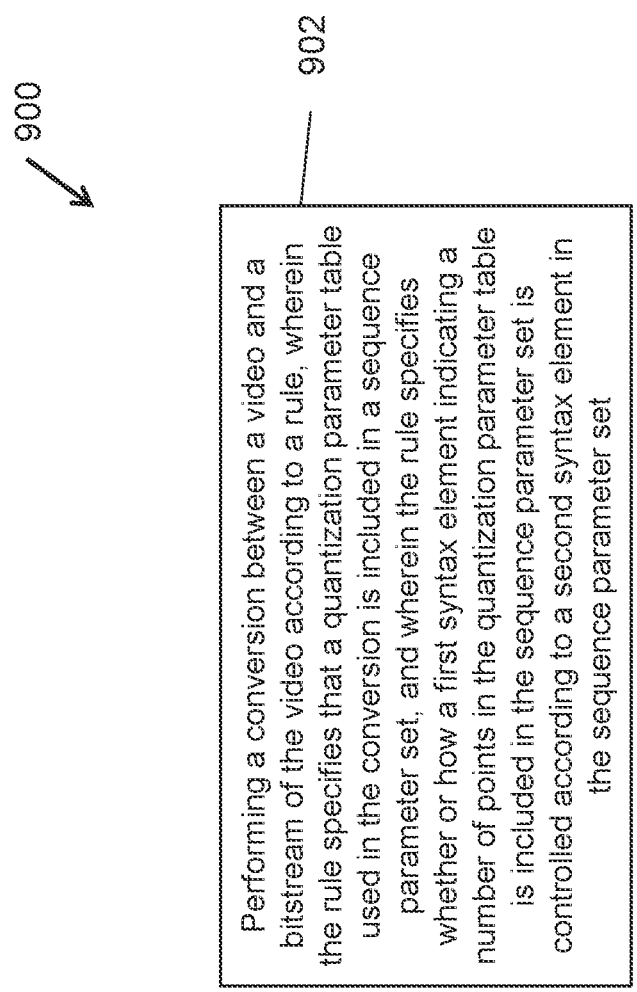

FIG. 9 is a flowchart for an example method 900 of video processing. Operation 902 includes performing a conversion between a video and a bitstream of the video according to a rule, wherein the rule specifies that a quantization parameter table used in the conversion is included in a sequence parameter set, and wherein the rule specifies whether or how a first syntax element indicating a number of points in the quantization parameter table is included in the sequence parameter set is controlled according to a second syntax element in the sequence parameter set.

In some embodiments of method 900, the quantization parameter table is a chroma quantization parameter mapping table. In some embodiments of method 900, a value of the first syntax element plus 1 is equal to the number of points in the quantization parameter table. In some embodiments of method 900, a value of the second syntax element indicates a starting luma and chroma quantization parameter used to describe the quantization parameter table. In some embodiments of method 900, a maximum value of the number of points in the quantization parameter table is based on the value of the second syntax element. In some embodiments of method 900, the rule specifies that a maximum value of the number of points in the quantization parameter table minus 1 is a difference between a maximum quantization parameter value and a starting luma and chroma quantization parameter used to describe an i-th chroma quantization parameter mapping table.

In some embodiments of method 900, the maximum value is set to (63−(qp_table_start_minus26[i]+26)). In some embodiments of method 900, the maximum value is set to (64−(qp_table_start_minus26[i]+26)).

FIG. 10 is a flowchart for an example method 1000 of video processing. Operation 1002 includes performing a conversion between a video and a bitstream of the video according to a rule, wherein the rule specifies that one of the following two conditions is true when a number of subpictures minus 1 indicated in a sequence parameter set is greater than zero and when a syntax element in the sequence parameter set indicates that an i-th subpicture of a first video picture of the video in a coded layer video sequence is treated as a second video picture of the video in a decoding process that excludes an in-loop filtering operation: (1) the second video picture referred to by each active entry in a first reference picture list or a second reference picture list of the first video picture and the first video picture have a same value for each of the following: a picture width in units of luma samples, a picture height in units of luma samples, the number of subpictures minus 1, and a horizontal position of a top-left coding tree unit of the i-th subpicture, a vertical position of the top-left CTU of the i-th subpicture, a width of the i-th subpicture minus 1, a height of the i-th subpicture minus 1, the syntax element for the i-th subpicture, respectively, for each value of i in a range of 0 to the number of subpictures minus 1, inclusive; and (2) the second video picture referred to by each active entry in the first reference picture list or the second reference picture list is an inter-layer reference picture for which a value of the number of subpictures minus 1 is equal to zero.

Figure 11:
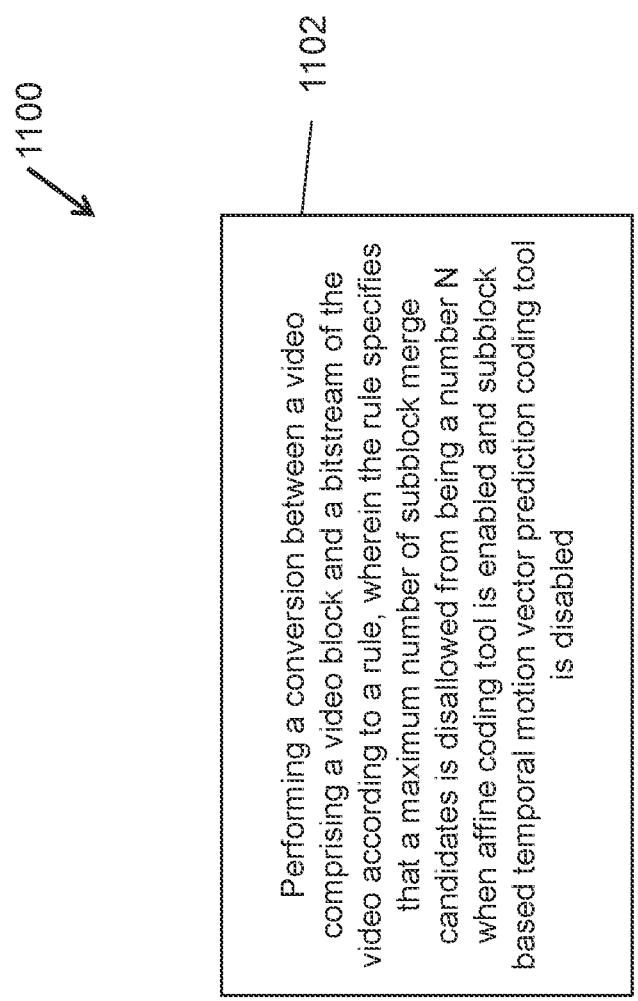

FIG. 11 is a flowchart for an example method 1100 of video processing. Operation 1102 includes performing a conversion between a video comprising a video block and a bitstream of the video according to a rule, wherein the rule specifies that a maximum number of subblock merge candidates is disallowed from being a number N when affine coding tool is enabled and subblock based temporal motion vector prediction coding tool is disabled.

In some embodiments of method 1100, N=0. In some embodiments of method 1100, N is greater than 0. In some embodiments of method 1100, a range of a maximum number of subblock-based merging motion vector prediction candidates supported in a sequence parameter set minus five is from [0, 4] regardless of a value of a syntax element in the sequence parameter set that indicates whether the SbTMVP coding tool is enabled or disabled. In some embodiments of method 1100, the bitstream is a conformance bitstream that includes a value of a maximum number of subblock-based merging motion vector prediction candidates from within a range of 1 to 5, inclusive, when the affine coding tool is enabled. In some embodiments of method 1100, the bitstream is a conformance bitstream that includes a value of a maximum number of subblock-based merging motion vector prediction candidates from within a range of 0 to 1, inclusive, when the affine coding tool is disabled. In some embodiments of method 1100, whether the bitstream includes a syntax element that indicates whether a merge subblock operation is enabled is based on whether the affine coding tool is enabled and is not based on the maximum number of subblock merge candidates.

Figure 12:
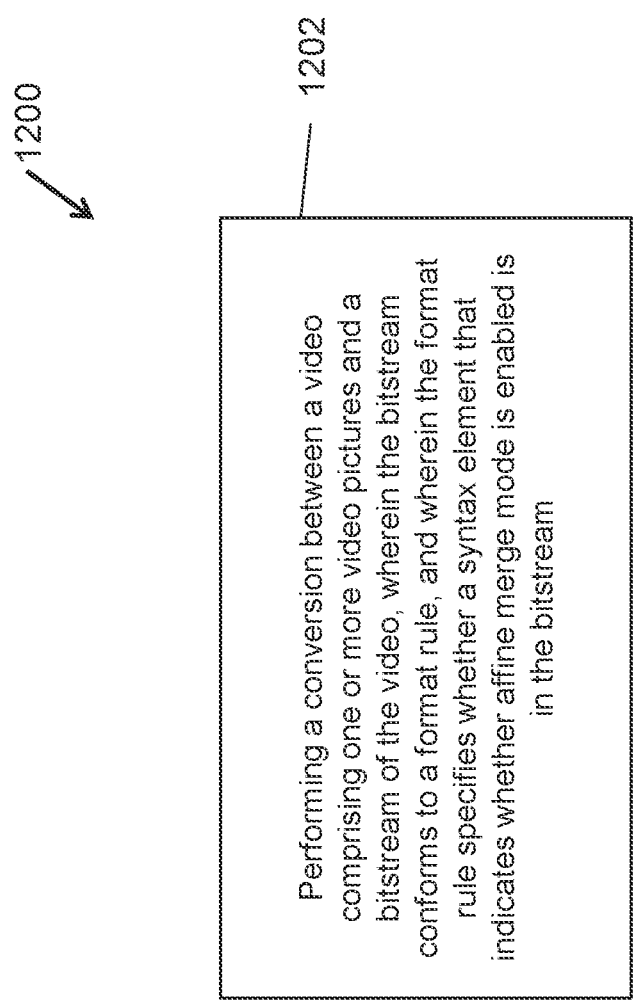

FIG. 12 is a flowchart for an example method 1200 of video processing. Operation 1202 includes performing a conversion between a video comprising one or more video pictures and a bitstream of the video, wherein the bitstream conforms to a format rule, and wherein the format rule specifies whether a syntax element that indicates whether affine merge mode is enabled is in the bitstream.

In some embodiments of method 1200, the format rule specifies that the syntax element is selectively indicated in the bitstream based on whether the affine merge mode is enabled in a sequence parameter set. In some embodiments of method 1200, the format rule specifies that a maximum number of subblock merge candidates is indicated in the bitstream when the syntax element indicates that the affine merge mode is enabled.

Figure 13:
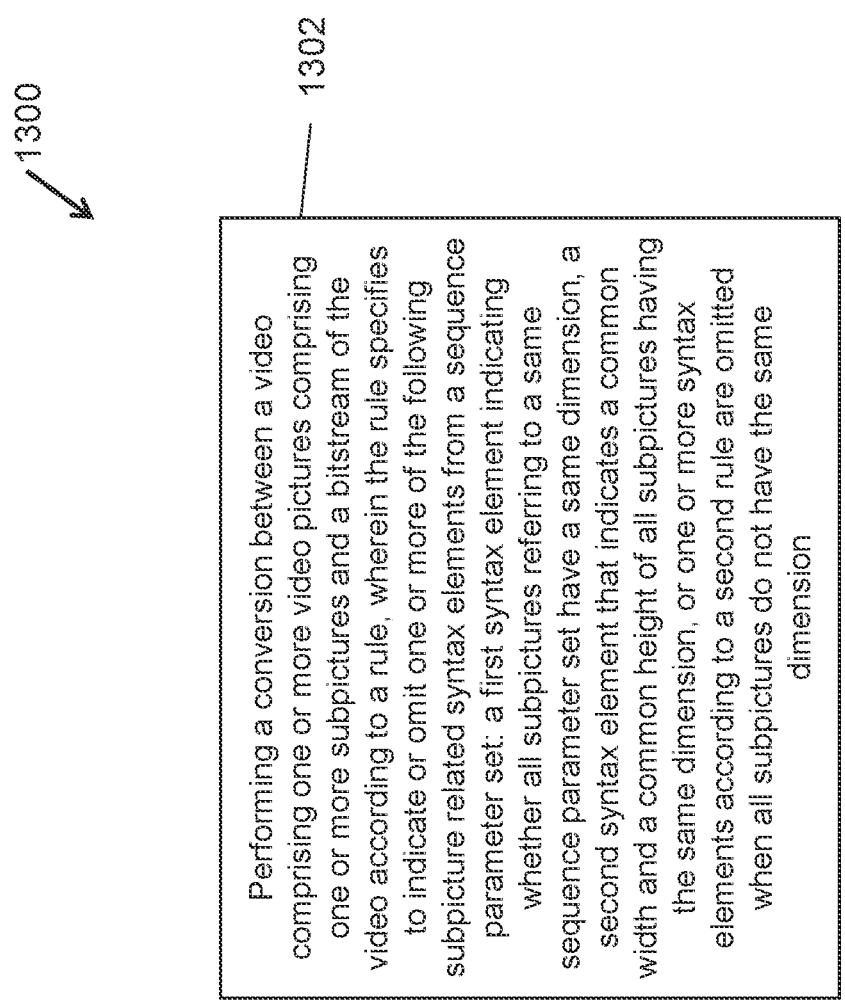

FIG. 13 is a flowchart for an example method 1300 of video processing. Operation 1302 includes performing a conversion between a video comprising one or more video pictures comprising one or more subpictures and a bitstream of the video according to a rule, wherein the rule specifies to indicate or omit one or more of the following subpicture related syntax elements from a sequence parameter set: a first syntax element indicating whether all subpictures referring to a same sequence parameter set have a same dimension, a second syntax element that indicates a common width and a common height of all subpictures having the same dimension, or one or more syntax elements according to a second rule are omitted when all subpictures do not have the same dimension.

In some embodiments of method 1300, the rule specifies that: a number of subpicture columns, denoted as numSubpicCols, is derived to be equal to (spspic width max in luma samples/((sps_uniform_subpic_width_minus1+1)*CtbSizeY))), a number of subpicture row, denoted as numSubpicRows, is derived to be equal to (spspic height max in luma samples/((sps_uniform_subpic_height_minus1+1)*CtbSizeY))), and wherein a number of subpictures, denoted as numSubpics, is derived to be equal to numSubpicCols*numSubpicRows. In some embodiments of method 1300, the rule specifies that sps_num_subpics_minus1 is excluded from the sequence parameter set, and wherein a value of the sps_num_subpics_minus1 is inferred to equal to numSubpics−1 In some embodiments of method 1300, the rule specifies that for each value of i in a range of 0 to sps_num_subpics_minus1, inclusive, values for sps_subpic_ctu_top_left_x[i], sps_subpic_ctu_top_left_y[i], sps_subpic_width_minus1[i], and sps_subpic_height_minus1[i] are inferred to be equal to (sps_uniform_subpic_width_minus1+1)*(i % numSubpicCols), (sps_uniform_subpic_height_minus1+1)*(i/numSubpicCols), sps_uniform_subpic_width_minus1, and sps_uniform_subpic_height_minus1, respectively In some embodiments of method 1300, the rule specifies that for each value of i in a range of 0 to sps_num_subpics_minus1, inclusive, when sps_independent_subpics_flag is equal to 0, sps_subpic_treated_aspic_flag[i] and sps_loop_filter_across_subpic_enabled_flag[i] are indicated in the sequence parameter set. In some embodiments of method 1300, the second rule specifies to use a current subpictures layer signalling. In some embodiments of method 1300, the rule specifies that when spspic width max in luma samples is less than or equal to CtbSizeY, sps_uniform_subpic_width_minus1 is excluded from the sequence parameter set and is inferred to be equal to 0. In some embodiments of method 1300, the rule specifies that when spspic height max in luma samples is less than or equal to CtbSizeY, sps_uniform_subpic_height_minus1 is excluded from the sequence parameter set and is inferred to be equal to 0.

Figure 14:
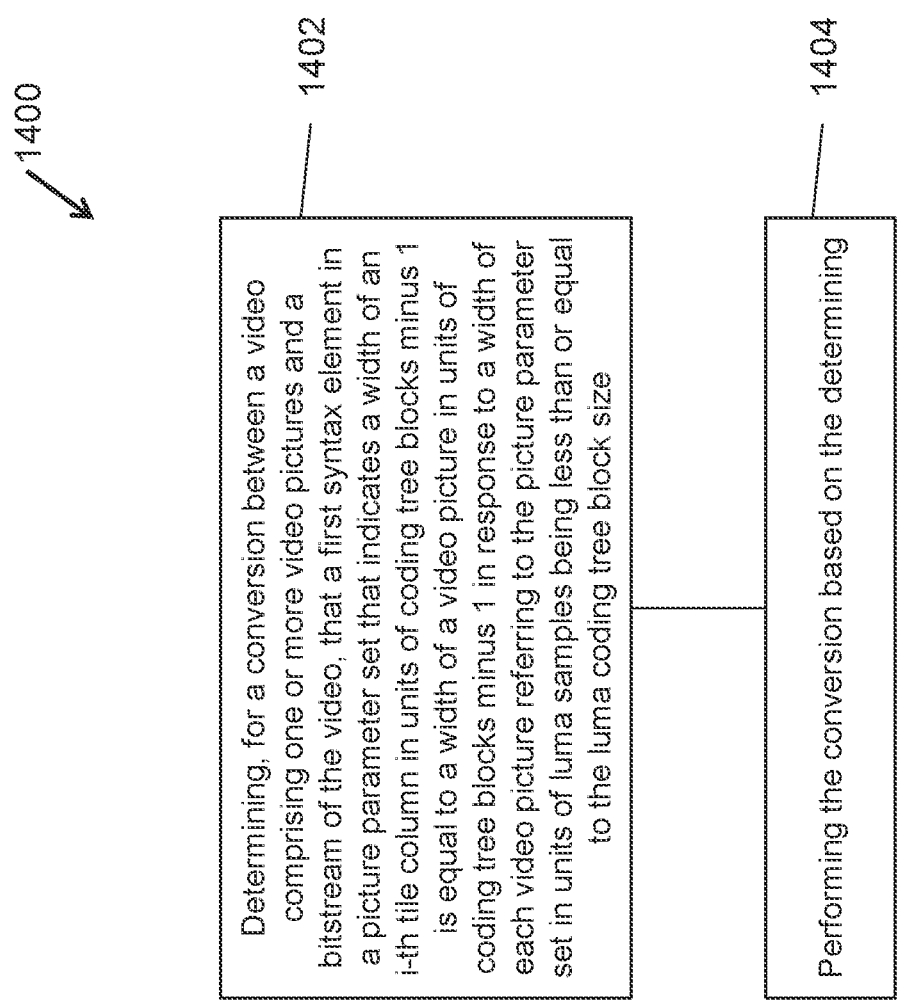

In some embodiments of method 1300, the rule specifies that sps_uniform_subpic_width_minus1, sps_uniform_subpic_height_minus1, sps_subpic_ctu_top_left_x[i], sps_subpic_ctu_top_left_y[i], sps_subpic_width_minus1[i], and sps_subpic_height_minus1[i] are ue(v)-coded. In some embodiments of method 1300, the rule specifies that sps_uniform_subpic_width_minus1 and sps_uniform_subpic_height_minus1 are u(v)-coded with a same length as sps_subpic_width_minus1[i] and sps_subpic_height_minus1[i], respectively. In some embodiments of method 1300, the sequence parameter set includes: a first syntax element that indicates whether all subpictures of the video have the same width and height, respectively, a second syntax element that indicates a common width for all subpictures, and a third syntax element that indicates a common height for all subpictures. In some embodiments of method 1300, the rule specifies that one of the following two conditions is true when a number of subpictures minus 1 indicated in a sequence parameter set is greater than zero and when a syntax element in the sequence parameter set indicates that an i-th subpicture of a first video picture of the video in a coded layer video sequence is treated as a second video picture of the video in a decoding process that excludes an in-loop filtering operation: (1) the second video picture referred to by each active entry in a first reference picture list or a second reference picture list of the first video picture and the first video picture have a same value for each of the following: a picture width in units of luma samples, a picture height in units of luma samples, the number of subpictures minus 1, and a horizontal position of a top-left coding tree unit of the i-th subpicture, a vertical position of the top-left CTU of the i-th subpicture, a width of the i-th subpicture minus 1, a height of the i-th subpicture minus 1, the syntax element for the i-th subpicture, and an identifier value for the i-th subpicture respectively, for each value of i in a range of 0 to the number of subpictures minus 1, inclusive; and (2) the second video picture referred to by each active entry in the first reference picture list or the second reference picture list is an inter-layer reference picture for which a value of the number of subpictures minus 1 is equal to zero FIG. 14 is a flowchart for an example method 1400 of video processing. Operation 1402 includes determining, for a conversion between a video comprising one or more video pictures and a bitstream of the video, that a first syntax element in a picture parameter set that indicates a width of an i-th tile column in units of coding tree blocks minus 1 is equal to a width of a video picture in units of coding tree blocks minus 1 in response to a width of each video picture referring to the picture parameter set in units of luma samples being less than or equal to the luma coding tree block size. Operation 1404 includes performing the conversion based on the determining.

Figure 15:
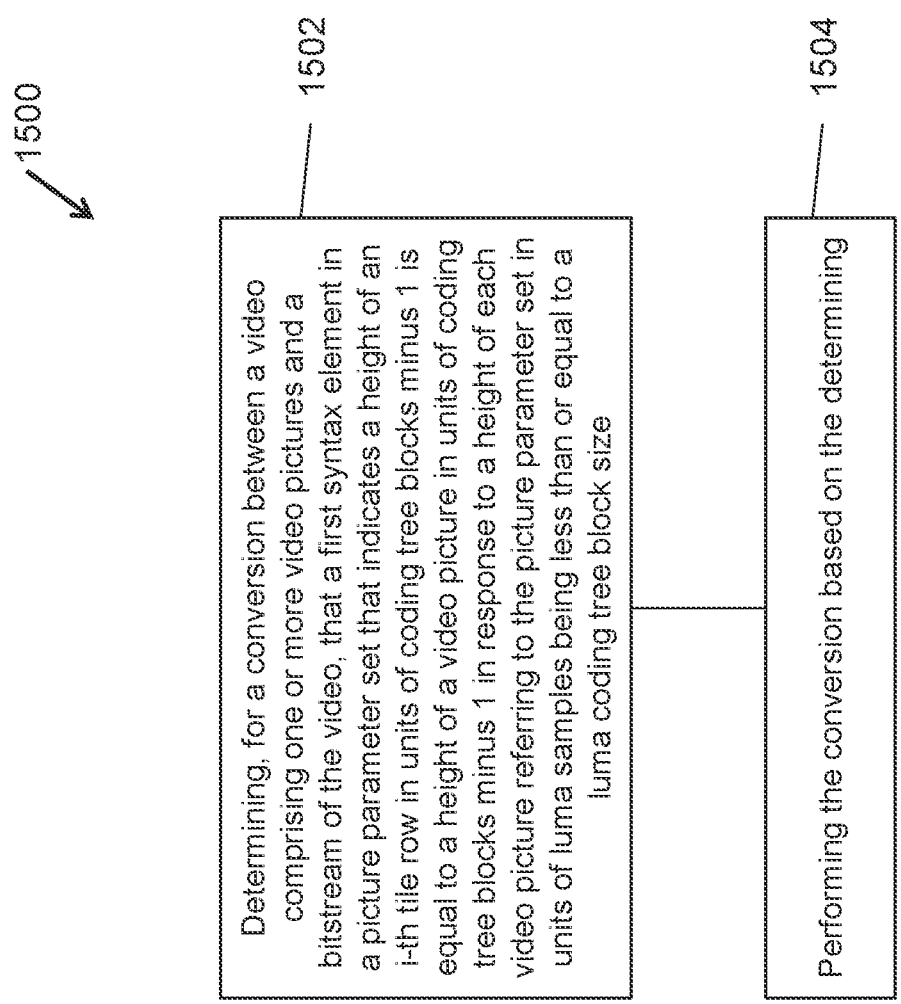

FIG. 15 is a flowchart for an example method 1500 of video processing. Operation 1502 includes determining, for a conversion between a video comprising one or more video pictures and a bitstream of the video, that a first syntax element in a picture parameter set that indicates a height of an i-th tile row in units of coding tree blocks minus 1 is equal to a height of a video picture in units of coding tree blocks minus 1 in response to a height of each video picture referring to the picture parameter set in units of luma samples being less than or equal to a luma coding tree block size. Operation 1504 includes performing the conversion based on the determining.

In some embodiments of method(s) 900-1500, the performing the conversion comprising encoding the video into the bitstream. In some embodiments of method(s) 900-1500, the performing the conversion comprises generating the bitstream from the video, and the method further comprises storing the bitstream in a non-transitory computer-readable recording medium. In some embodiments of method(s) 900-1500, the performing the conversion comprises decoding the video from the bitstream.

In some embodiments, a video decoding apparatus comprising a processor configured to implement a method recited in one or more embodiments of method(s) 900-1500. In some embodiments, a video encoding apparatus comprising a processor configured to implement a method recited in one or more embodiments of method(s) 900-1500. In some embodiments, a computer program product having computer instructions stored thereon, the instructions, when executed by a processor, causes the processor to implement a method recited in one or more embodiments of method(s) 900-1500. In some embodiments, a non-transitory computer-readable storage medium that stores a bitstream generated according to a method recited in one or more embodiments of method(s) 900-1500. In some embodiments, a non-transitory computer-readable storage medium storing instructions that cause a processor to implement a method recited in one or more embodiments of method(s) 900-1500. In some embodiments, a method of bitstream generation, comprising: generating a bitstream of a video according to a method recited in one or more embodiments of method(s) 900-1500, and storing the bitstream on a computer-readable program medium. In some embodiments, a method, an apparatus, a bitstream generated according to a disclosed method or a system described in the present disclosure.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

While the present disclosure contains many specifics, these should not be construed as limitations on the scope of any subject matter or of what may be claimed, but rather as descriptions of features that may be specific to particular embodiments of the present disclosure. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few embodiments and examples are described and other embodiments, enhancements and variations can be made based on what is described and illustrated in the present disclosure.

What is claimed is:

1. A method of processing video data, comprising:
performing a conversion between a video and a bitstream of the video according to a rule,
wherein the rule specifies that only one of the following two conditions is true when a number of subpictures minus 1 indicated by a first syntax element in a sequence parameter set for a first video picture of the video is greater than zero and when a current subpicture with a subpicture index subpicIdx of the first video picture has a second syntax element in the sequence parameter set indicates that a subpicture with the subpicture index subpicIdx of each video picture of the video in a coded layer video sequence is treated as a video picture in a decoding process that excludes an in-loop filtering operation:
(1) a second video picture referred to by each active entry in a first reference picture list or a second reference picture list of the first video picture and the first video picture have a same value for each of multiple syntax elements related to dimension information, wherein the multiple syntax elements related to dimension information comprise:
the first syntax element indicating the number of subpictures minus 1,
a third syntax element included in a picture parameter set indicating a picture width in units of luma samples,
a fourth syntax element included in the picture parameter set indicating a picture height in units of luma samples,
a fifth syntax element included in the sequence parameter set indicating a horizontal position of a top-left coding tree unit (CTU) of an i-th subpicture,
a sixth syntax element included in the sequence parameter set indicating a vertical position of the top-left CTU of the i-th subpicture,
a seventh syntax element included in the sequence parameter set indicating a width of the i-th subpicture minus 1, and
an eighth syntax element included in the sequence parameter set indicating a height of the i-th subpicture minus 1, the second syntax element for the i-th subpicture, respectively, for each value of i in a range of 0 to the number of subpictures minus 1, inclusive; or
(2) a second video picture referred to by each active entry in a first reference picture list or a second reference picture list is an inter-layer reference picture entry for which a value of the first syntax element indicating the number of subpictures minus 1 is equal to zero.

2. The method of claim 1, wherein the rule specifies that a ninth syntax element plus 1 indicating a number of points used to describe an quantization parameter table used in the conversion is included in the sequence parameter set, and a value of the ninth syntax element is controlled according to a tenth syntax element in the sequence parameter set, and wherein a value of the tenth syntax element indicates a starting luma and chroma quantization parameter used to describe the quantization parameter table.

3. The method of claim 2, wherein the quantization parameter table is a chroma quantization parameter mapping table.

4. The method of claim 2, wherein a maximum value of the ninth syntax element is based on a difference between an integer and the value of the tenth syntax element.

5. The method of claim 1, wherein the performing the conversion comprising encoding the video into the bitstream.

6. The method of claim 1, wherein the performing the conversion comprises decoding the video from the bitstream.

7. An apparatus for processing video data comprising a processor and a non-transitory memory with instructions thereon, wherein the instructions upon execution by the processor, cause the processor to:
perform a conversion between a video and a bitstream of the video according to a rule,
wherein the rule specifies that only one of the following two conditions is true when a number of subpictures minus 1 indicated by a first syntax element in a sequence parameter set for a first video picture of the video is greater than zero and when a current subpicture with a subpicture index subpicIdx of the first video picture has a second syntax element in the sequence parameter set indicates that a subpicture with the subpicture index subpicIdx of each video picture of the video in a coded layer video sequence is treated as a video picture in a decoding process that excludes an in-loop filtering operation:
(1) a second video picture referred to by each active entry in a first reference picture list or a second reference picture list of the first video picture and the first video picture have a same value for each of multiple syntax elements related to dimension information, wherein the multiple syntax elements related to dimension information comprise:
the first syntax element indicating the number of subpictures minus 1,
a third syntax element included in a picture parameter set indicating a picture width in units of luma samples,
a fourth syntax element included in the picture parameter set indicating a picture height in units of luma samples,
a fifth syntax element included in the sequence parameter set indicating a horizontal position of a top-left coding tree unit (CTU) of an i-th subpicture,
a sixth syntax element included in the sequence parameter set indicating a vertical position of the top-left CTU of the i-th subpicture,
a seventh syntax element included in the sequence parameter set indicating a width of the i-th subpicture minus 1, and
an eighth syntax element included in the sequence parameter set indicating a height of the i-th subpicture minus 1, the second syntax element for the i-th subpicture, respectively, for each value of i in a range of 0 to the number of subpictures minus 1, inclusive; or
(2) a second video picture referred to by each active entry in a first reference picture list or a second reference picture list is an inter-layer reference picture entry for which a value of the first syntax element indicating the number of subpictures minus 1 is equal to zero.

8. The apparatus of claim 7, wherein the rule specifies that a ninth syntax element plus 1 indicating a number of points used to describe an quantization parameter table used in the conversion is included in the sequence parameter set, and a value of the ninth syntax element is controlled according to a tenth syntax element in the sequence parameter set, and wherein a value of the tenth syntax element indicates a starting luma and chroma quantization parameter used to describe the quantization parameter table.

9. The apparatus of claim 8, wherein the quantization parameter table is a chroma quantization parameter mapping table.

10. The apparatus of claim 8, wherein a maximum value of the ninth syntax element is based on a difference between an integer and the value of the tenth syntax element.

11. A non-transitory computer-readable storage medium storing instructions that cause a processor to:
perform a conversion between a video and a bitstream of the video according to a rule,
wherein the rule specifies that only one of the following two conditions is true when a number of subpictures minus 1 indicated by a first syntax element in a sequence parameter set for a first video picture of the video is greater than zero and when a current subpicture with a subpicture index subpicIdx of the first video picture has a second syntax element in the sequence parameter set indicates that a subpicture with the subpicture index subpicIdx of each video picture of the video in a coded layer video sequence is treated as a video picture in a decoding process that excludes an in-loop filtering operation:
(1) a second video picture referred to by each active entry in a first reference picture list or a second reference picture list of the first video picture and the first video picture have a same value for each of multiple syntax elements related to dimension information, wherein the multiple syntax elements related to dimension information comprise:
the first syntax element indicating the number of subpictures minus 1,
a third syntax element included in a picture parameter set indicating a picture width in units of luma samples,
a fourth syntax element included in the picture parameter set indicating a picture height in units of luma samples,
a fifth syntax element included in the sequence parameter set indicating a horizontal position of a top-left coding tree unit (CTU) of an i-th subpicture,
a sixth syntax element included in the sequence parameter set indicating a vertical position of the top-left CTU of the i-th subpicture,
a seventh syntax element included in the sequence parameter set indicating a width of the i-th subpicture minus 1, and
an eighth syntax element included in the sequence parameter set indicating a height of the i-th subpicture minus 1, the second syntax element for the i-th subpicture, respectively, for each value of i in a range of 0 to the number of subpictures minus 1, inclusive; or
(2) a second video picture referred to by each active entry in a first reference picture list or a second reference picture list is an inter-layer reference picture entry for which a value of the first syntax element indicating the number of subpictures minus 1 is equal to zero.

12. The non-transitory computer-readable storage medium of claim 11, wherein the rule specifies that a ninth syntax element plus 1 indicating a number of points used to describe an quantization parameter table used in the conversion is included in the sequence parameter set, and a value of the ninth syntax element is controlled according to a tenth syntax element in the sequence parameter set, and wherein a value of the tenth syntax element indicates a starting luma and chroma quantization parameter used to describe the quantization parameter table, wherein the quantization parameter table is a chroma quantization parameter mapping table.

13. The non-transitory computer-readable storage medium of claim 12, wherein a maximum value of the ninth syntax element is based on a difference between an integer and the value of the tenth syntax element.

14. A non-transitory computer-readable recording medium storing a bitstream of a video which is generated by a method performed by a video processing apparatus, wherein the method comprises:
generating the bitstream of the video according to a rule, wherein the rule specifies that only one of the following two conditions is true when a number of subpictures minus 1 indicated by a first syntax element in a sequence parameter set for a first video picture of the video is greater than zero and when a current subpicture with a subpicture index subpicIdx of the first video picture has a second syntax element in the sequence parameter set indicates that a subpicture with the subpicture index subpicIdx of each video picture of the video in a coded layer video sequence is treated as a video picture in a decoding process that excludes an in-loop filtering operation:
(1) a second video picture referred to by each active entry in a first reference picture list or a second reference picture list of the first video picture and the first video picture have a same value for each of multiple syntax elements related to dimension information, wherein the multiple syntax elements related to dimension information comprise:
the first syntax element indicating the number of subpictures minus 1,
a third syntax element included in a picture parameter set indicating a picture width in units of luma samples,
a fourth syntax element included in the picture parameter set indicating a picture height in units of luma samples,
a fifth syntax element included in the sequence parameter set indicating a horizontal position of a top-left coding tree unit (CTU) of an i-th subpicture,
a sixth syntax element included in the sequence parameter set indicating a vertical position of the top-left CTU of the i-th subpicture,
a seventh syntax element included in the sequence parameter set indicating a width of the i-th subpicture minus 1, and
an eighth syntax element included in the sequence parameter set indicating a height of the i-th subpicture minus 1, the second syntax element for the i-th subpicture, respectively, for each value of i in a range of 0 to the number of subpictures minus 1, inclusive; or
(2) a second video picture referred to by each active entry in a first reference picture list or a second reference picture list is an inter-layer reference picture entry for which a value of the first syntax element indicating the number of subpictures minus 1 is equal to zero.

15. The non-transitory computer-readable recording medium of claim 14, wherein the rule specifies that a ninth syntax element plus 1 indicating a number of points used to describe an quantization parameter table used to generate the bitstream is included in the sequence parameter set, and a value of the ninth syntax element is controlled according to a tenth syntax element in the sequence parameter set, and wherein a value of the tenth syntax element indicates a starting luma and chroma quantization parameter used to describe the quantization parameter table, wherein the quantization parameter table is a chroma quantization parameter mapping table.

16. The non-transitory computer-readable recording medium of claim 15, wherein a maximum value of the ninth syntax element is based on a difference between an integer and the value of the tenth syntax element.

* * * * *